(12) United States Patent
Wu et al.

(10) Patent No.: US 12,432,731 B2
(45) Date of Patent: Sep. 30, 2025

(54) RESOURCE ALLOCATION AND A POWER CONTROL METHOD FOR SIDELINK COMMUNICATION SYSTEM

(71) Applicant: Samsung Electronics Co., Ltd., Gyeonggi-do (KR)

(72) Inventors: Min Wu, Beijing (CN); Miao Zhou, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 208 days.

(21) Appl. No.: 17/762,524

(22) PCT Filed: Sep. 25, 2020

(86) PCT No.: PCT/KR2020/013141
§ 371 (c)(1),
(2) Date: Mar. 22, 2022

(87) PCT Pub. No.: WO2021/060936
PCT Pub. Date: Apr. 1, 2021

(65) Prior Publication Data
US 2022/0346118 A1    Oct. 27, 2022

(30) Foreign Application Priority Data

Sep. 26, 2019 (CN) .......................... 201910918973.6
Nov. 7, 2019 (CN) .......................... 201911084314.3
Nov. 22, 2019 (CN) .......................... 201911157710.4

(51) Int. Cl.
*H04W 72/20* (2023.01)
*H04W 72/566* (2023.01)

(52) U.S. Cl.
CPC ......... *H04W 72/20* (2023.01); *H04W 72/566* (2023.01)

(58) Field of Classification Search
CPC ........................... H04W 72/20; H04W 72/566
See application file for complete search history.

(56) References Cited

U.S. PATENT DOCUMENTS 10,931,426 B2 *   2/2021   Desai ................... H04L 1/1861
2016/0066337 A1   3/2016   Sartori et al.
(Continued)

FOREIGN PATENT DOCUMENTS

CN        107484254        12/2017
CN        107889161         4/2018
(Continued)

OTHER PUBLICATIONS

NPL1 (Vivo: "Discussion on mode 2 resource allocation mechanism", 3GPP Draft, R1-1904074, 3rd Generation Partnership Project (3GPP), Mobile Competence Centre, 650, Route Des Lucioles, F-06921 Sophia-Antipolis Cedex, France, Apr. 2, 2019 (Apr. 2, 2019), pp. 1-11, XP051707097; hereinafter NPL1) (Year: 2019).*
(Continued)

*Primary Examiner* — Michael A Keller
(74) *Attorney, Agent, or Firm* — The Farrell Law Firm, P.C.

(57) ABSTRACT

The present disclosure provides a method for sidelink transmission, the method comprising: determining by a User equipment (UE) a parameter configuration for the slot aggregation transmission; determining by the UE an resource for slot aggregation based on the parameter configuration; and performing by the UE the Physical Sidelink Shared Channel (PSSCH) transmission and the associated Physical Sidelink Control Channel (PSCCH) transmission on the resource for slot aggregation.

16 Claims, 12 Drawing Sheets

(56) References Cited

U.S. PATENT DOCUMENTS

| | | | |
|---|---|---|---|
| 2016/0073408 A1 | 3/2016 | Sartori et al. | |
| 2018/0049220 A1 | 2/2018 | Patil et al. | |
| 2019/0110177 A1 | 4/2019 | Lee et al. | |
| 2019/0200389 A1 | 6/2019 | Li et al. | |
| 2019/0230687 A1 | 7/2019 | Parkvall et al. | |
| 2019/0246249 A1 | 8/2019 | Lee et al. | |
| 2019/0289615 A1 | 9/2019 | Lee et al. | |
| 2019/0306835 A1* | 10/2019 | Hoang | H04W 72/53 |
| 2020/0351872 A1 | 11/2020 | Cai | |
| 2021/0045088 A1 | 2/2021 | Cai et al. | |
| 2022/0053496 A1* | 2/2022 | Yu | H04W 72/20 |
| 2022/0190984 A1* | 6/2022 | Lee | H04L 1/0026 |

FOREIGN PATENT DOCUMENTS

| | | |
|---|---|---|
| CN | 108024230 | 5/2018 |
| CN | 108400843 | 8/2018 |
| CN | 108632781 | 10/2018 |
| CN | 109121214 | 1/2019 |
| CN | 109478991 | 3/2019 |
| CN | 109565791 | 4/2019 |
| CN | 110167072 | 8/2019 |
| CN | 110351687 | 10/2019 |
| WO | WO 2018/145502 | 8/2018 |
| WO | WO 2019/089033 | 5/2019 |

OTHER PUBLICATIONS

PCT/ISA/210 Search Report issued on PCT/KR2020/013141, Jan. 12, 2021, pp. 5.

PCT/ISA/237 Written Opinion issued on PCT/KR2020/013141, Jan. 12, 2021, pp. 5.

Qualcomm Incorporated, 'Sidelink Resource Allocation Mechanism for NR V2X', R1-1909254, 3GPP TSG RAN WG1 #98, Prague, Czech Republic, Aug. 17, 2019, pp. 19.

Vivo, 'Discussion on mode 2 resource allocation mechanism', R1-1904074, 3GPP TSG RAN WG1 #96bis, Xi'an, China, Apr. 2, 2019, pp. 13.

ZTE et al., 'NR sidelink physical layer structure', R1-908894, 3GPP TSG RAN WG1 #98, Prague, CZ, Aug. 17, 2019, pp. 21.

Xiaomi Communications, "On Mode 2 Resource Allocation of V2x Communications", R1-1906572, 3GPP TSG RAN WG1 #97, May 13-17, 2019, 2 pages.

European Search Report dated Sep. 23, 2022 issued in counterpart application No. 20869468.7-1215, 11 pages.

Indian Examination Report dated Jan. 4, 2024 issued in counterpart application No. 202217016723, 8 pages.

Vivo, "Discussion on Mode 2 Resource Allocation Mechanism", R1-1911420, 3GPP TSG RAN WG1 #98bis Meeting, Oct. 14-20, 2019, 14 pages.

CATT, "Discussion on Resource Allocation Mechanism for Sidelink Mode 2 in NR V2X", R1-1910329, 3GPP TSG RAN WG1 Meeting #98bis, Oct. 14-20, 2019, 13 pages.

Xiaomi Communications, "On Mode 2 Resource Allocation of V2X Communications", R1-1911289, 3GPP TSG RAN WG1 #98bis, Oct. 14-20, 2019, 3 pages.

Yanping Liu et al., "Energy Efficiency Resource Reuse for Device-to-Device Communication", Journal of Southwest Jiaotong University, vol. 51, No. 4, Aug. 2016, 7 pages.

Intel Corporation, "Remaining Sensing and Resource Selection Issues for Sidelink V2V", R1-1611921, 3GPP TSG RAN WG1 Meeting #87, Nov. 14-18, 2016, 6 pages.

Spreadtrum Communications, "Discussion on NR Sidelink Mode 2 Resource Allocation", R1-1910007, 3GPP TSG RAN WG1 #98bis, Oct. 14-20, 2019, 5 pages.

Rafael Molina-Masegosa et al., "Configuration of the C-V2X Mode 4 Sidelink PC5 Interface for Vehicular Communications", 14th International Conference on Mobile Ad-Hoc and Sensor Networks (MSN), Apr. 2019, 6 pages.

Chinese Office Action dated May 8, 2024 issued in counterpart application No. 201911084314.3, 14 pages.

Qualcomm Incorporated, "Sidelink Resource Allocation Mechanism for NR V2X", R1-1911106, 3GPP TSG-RAN WG1 #98bis, Oct. 14-20, 2019, 10 pages.

Chinese Office Action dated Nov. 23, 2024 issued in counterpart application No. 201911084314.3, 7 pages.

European Search Report dated May 14, 2025 issued in counterpart application No. 20869468.7-1206, 8 pages.

* cited by examiner

[Fig. 1]
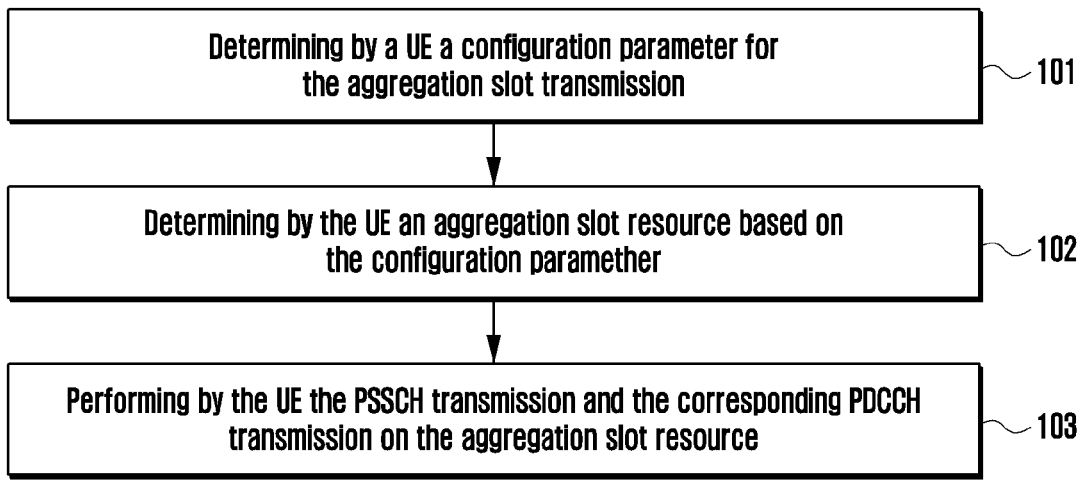
[Fig. 2]
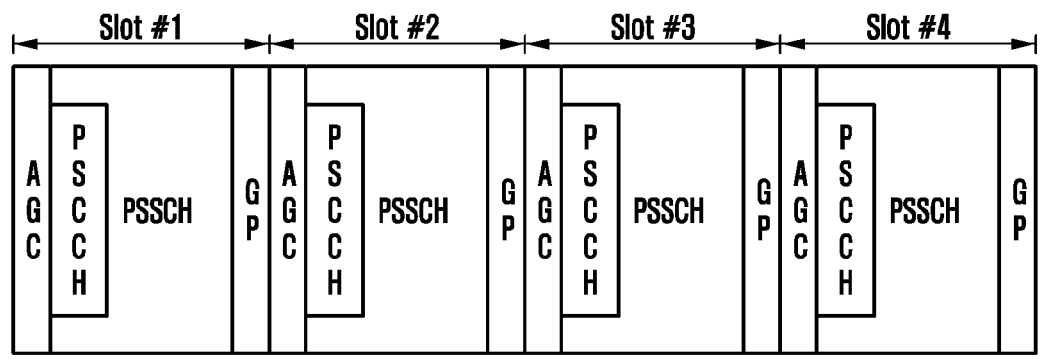
[Fig. 3]
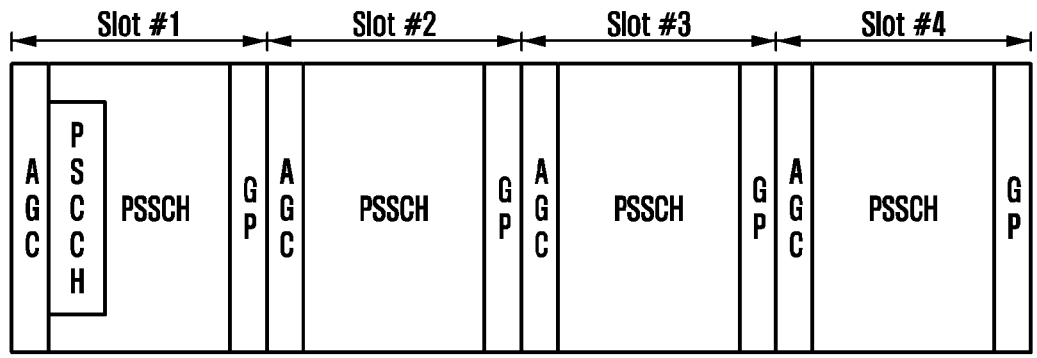

[Fig. 4]
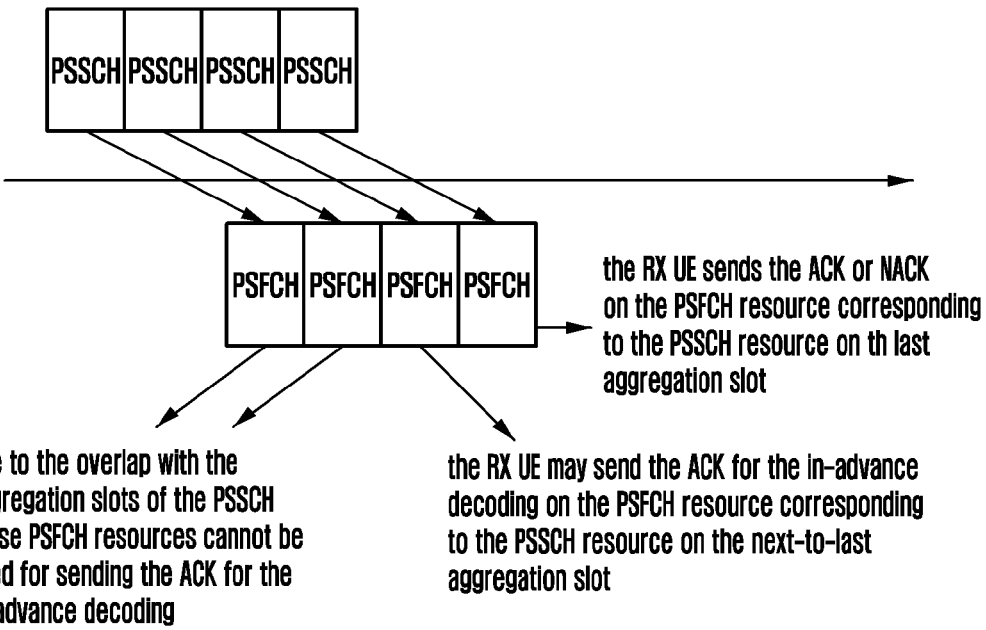
[Fig. 5]
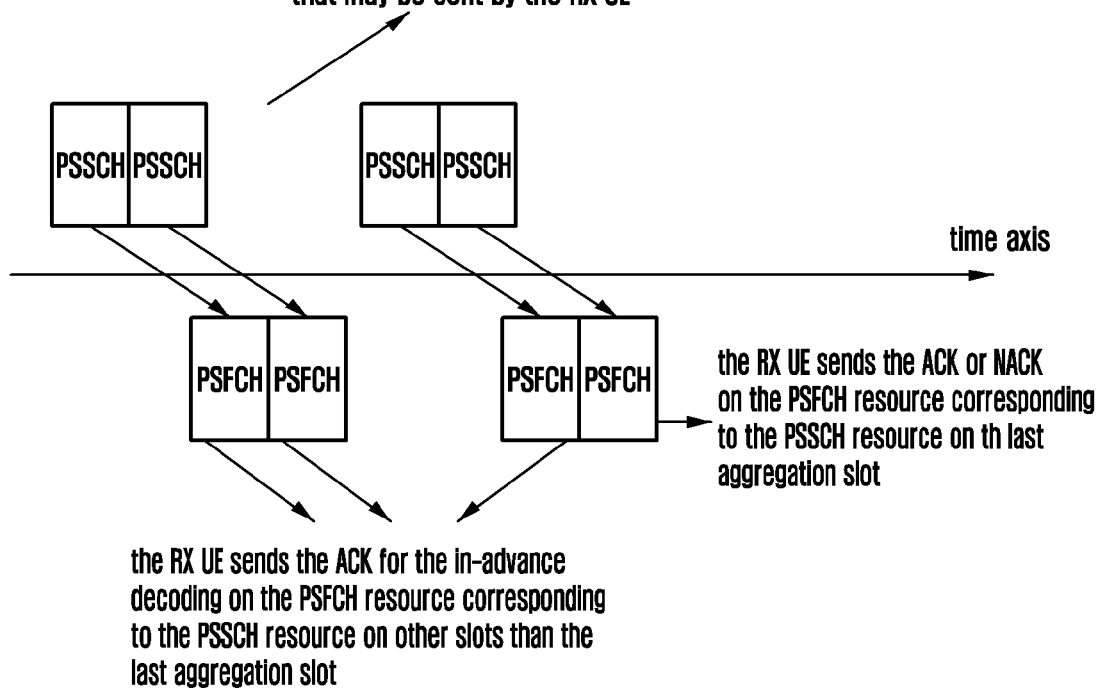

[Fig. 6]
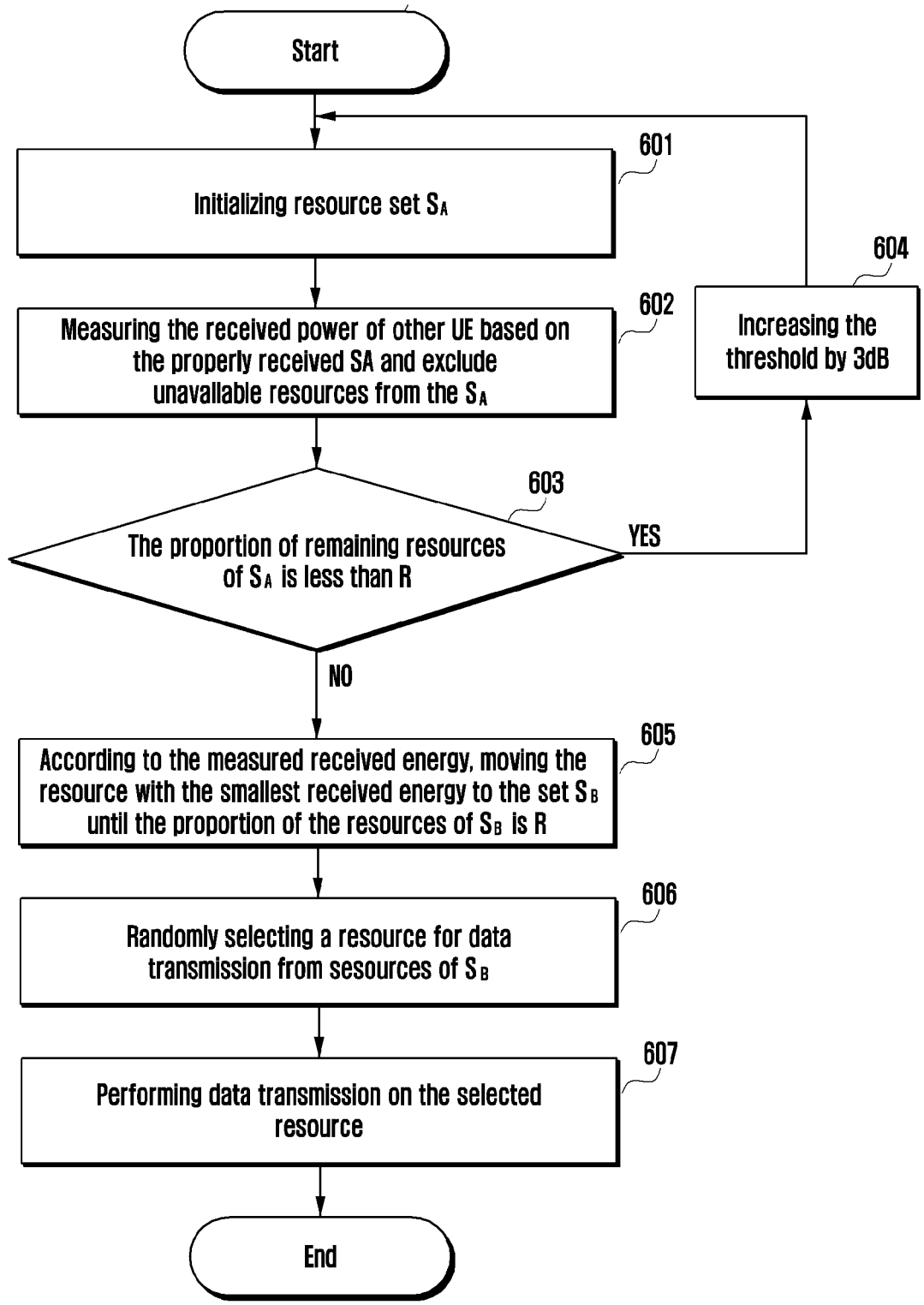

[Fig. 7]
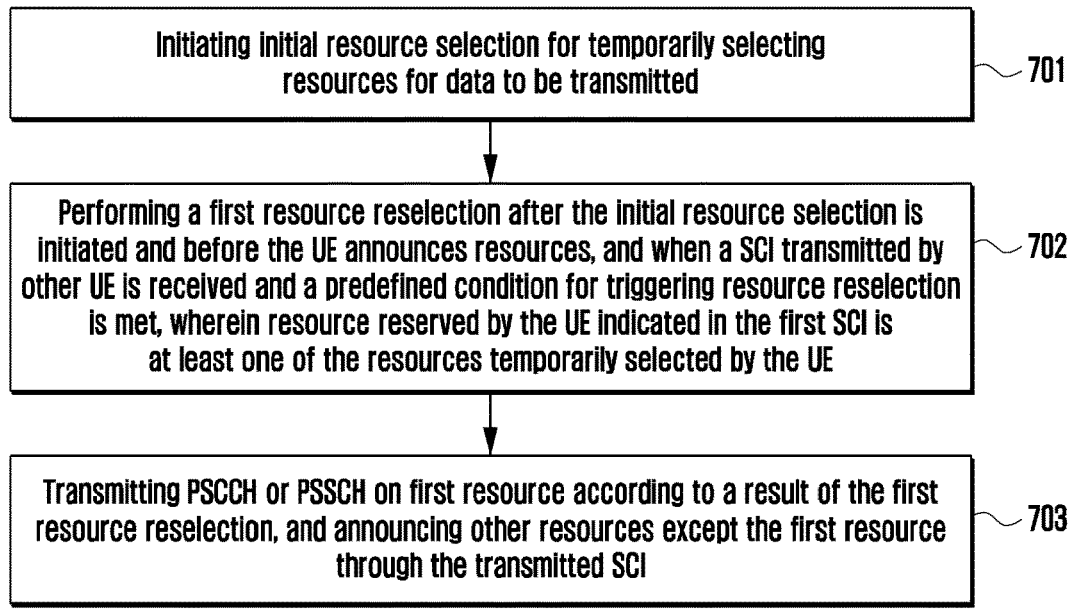
[Fig. 8]
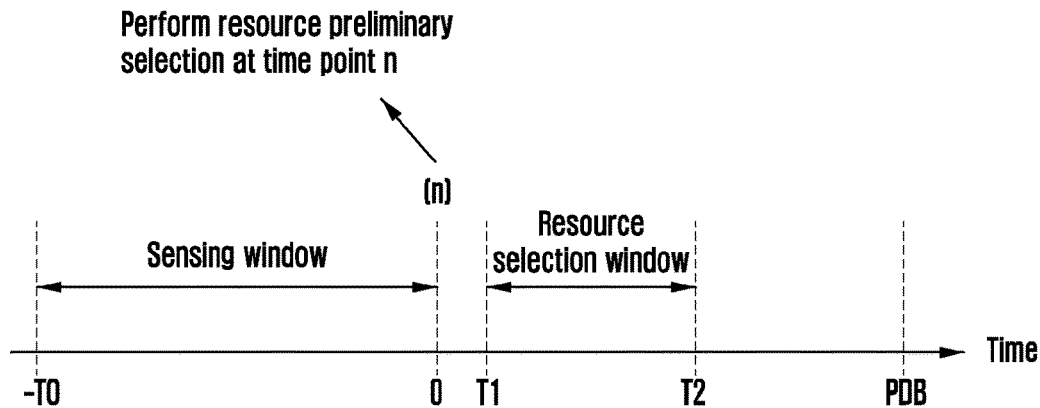
[Fig. 9]
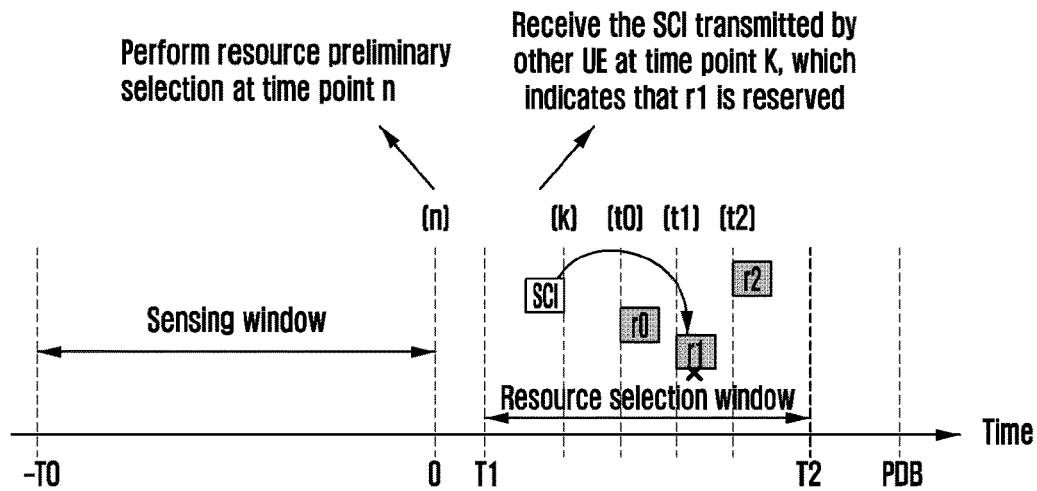

[Fig. 10]
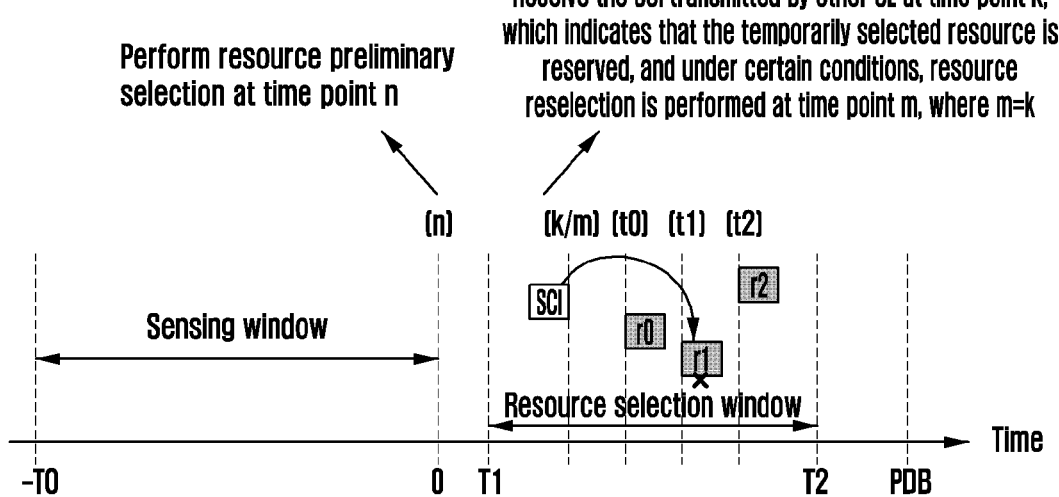
[Fig. 11]
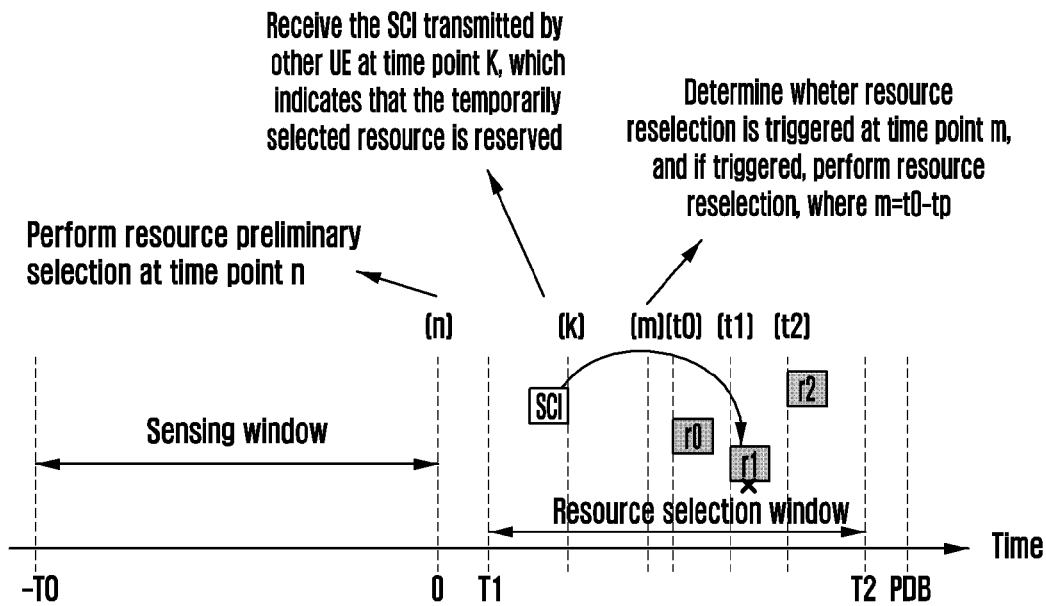

[Fig. 12]
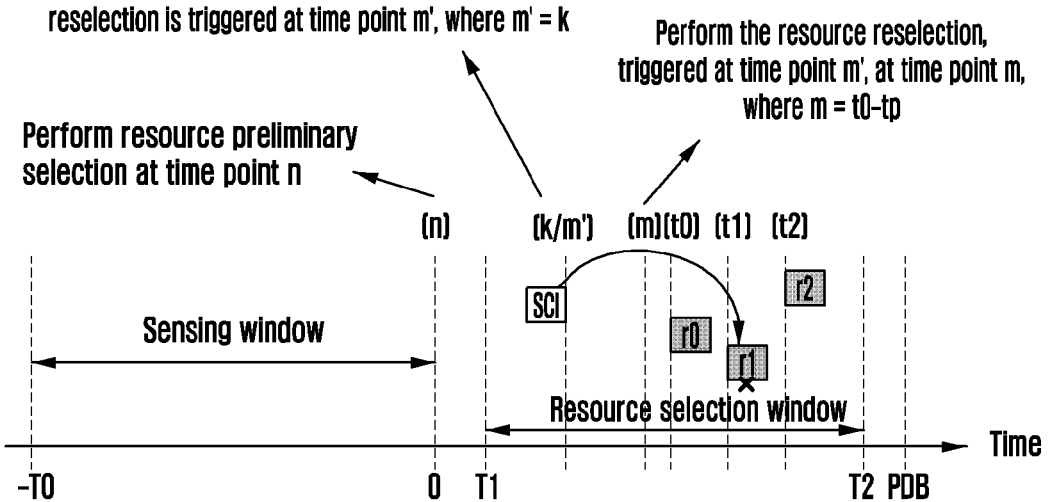
[Fig. 13]
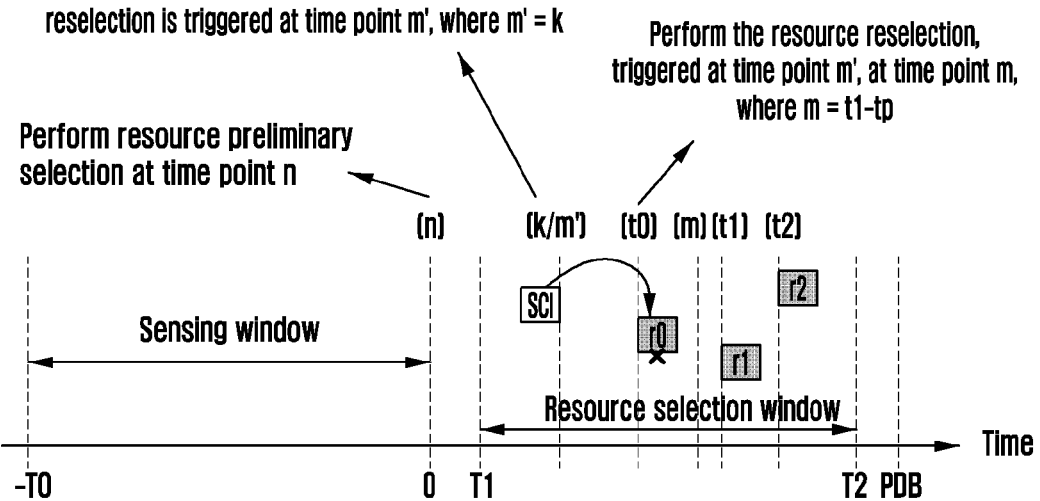

[Fig. 14]
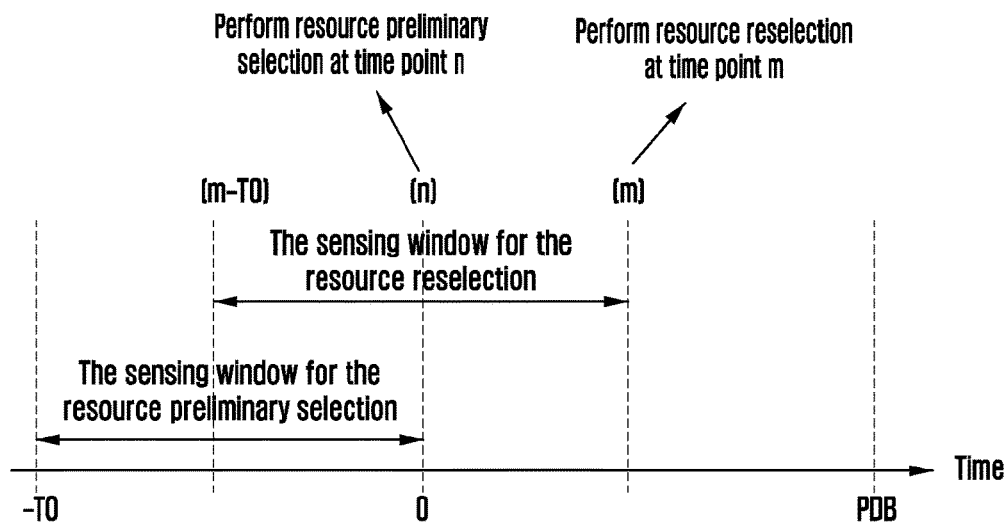
[Fig. 15]
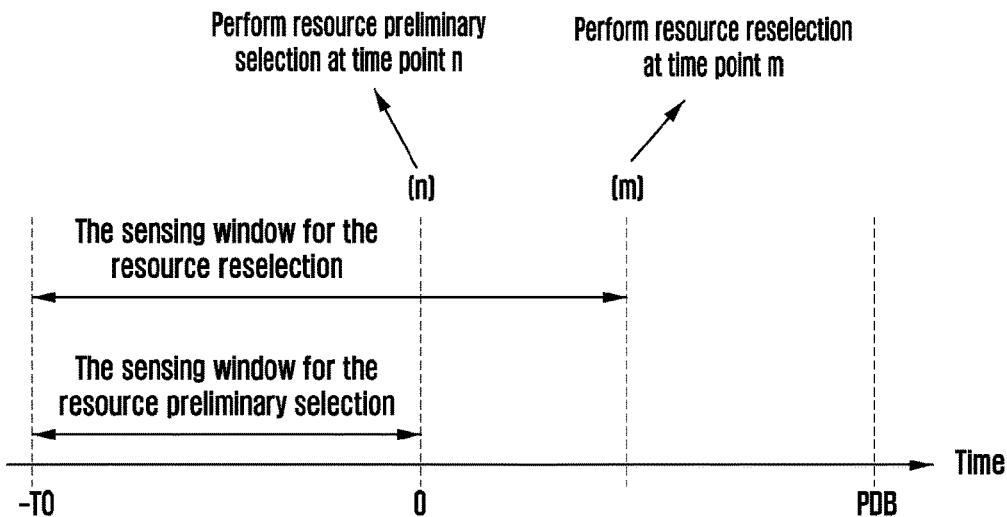
[Fig. 16]
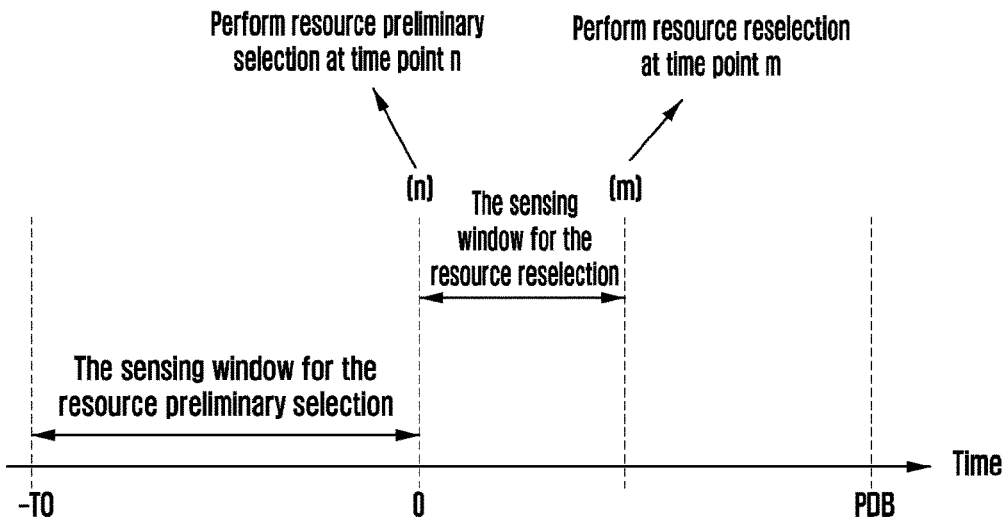

[Fig. 17]
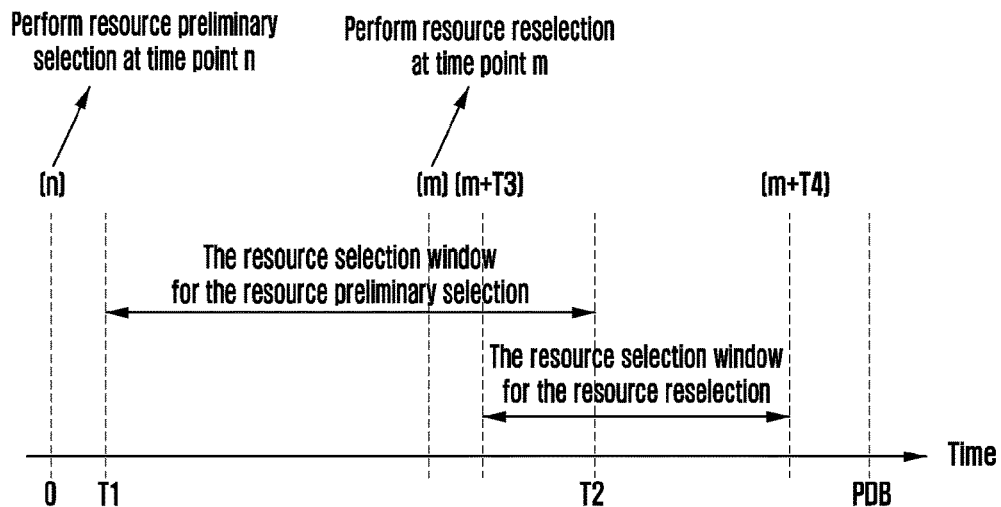
[Fig. 18]
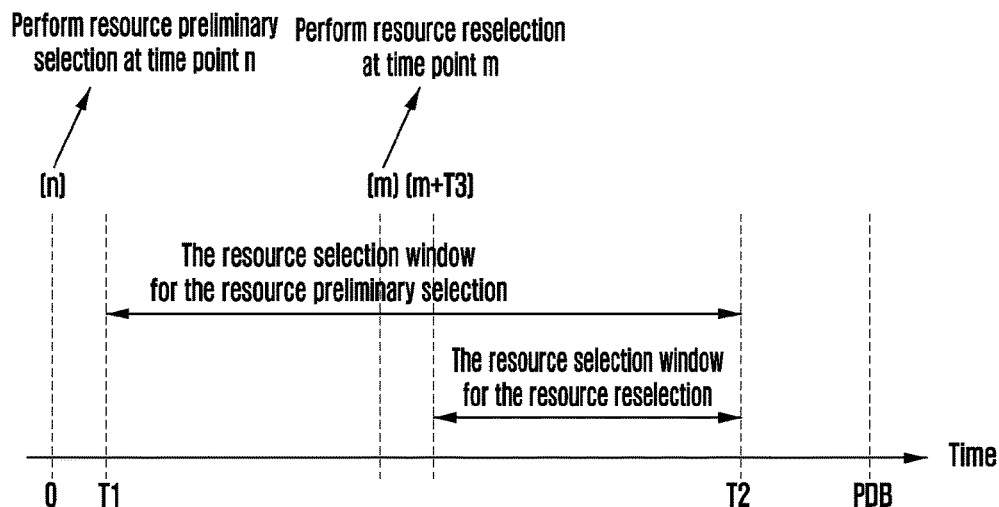
[Fig. 19]
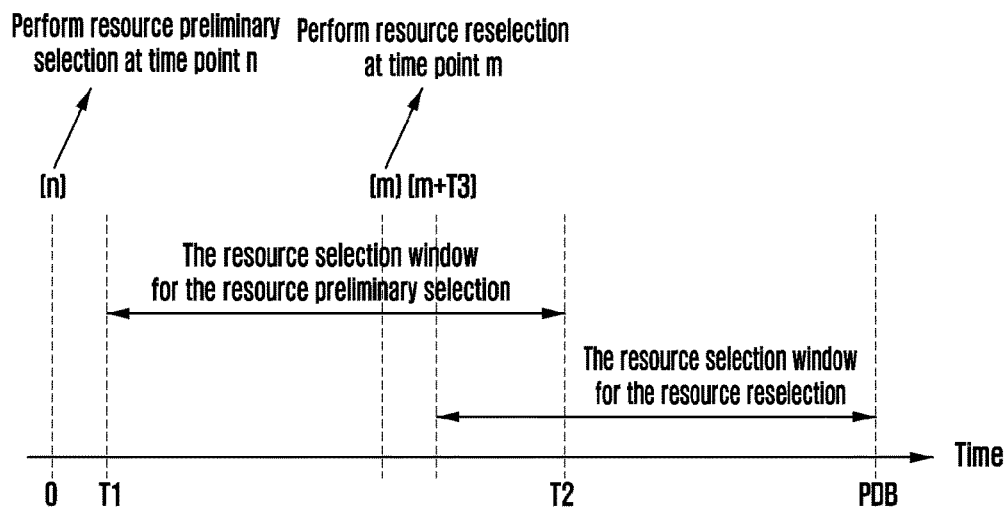

[Fig. 20]
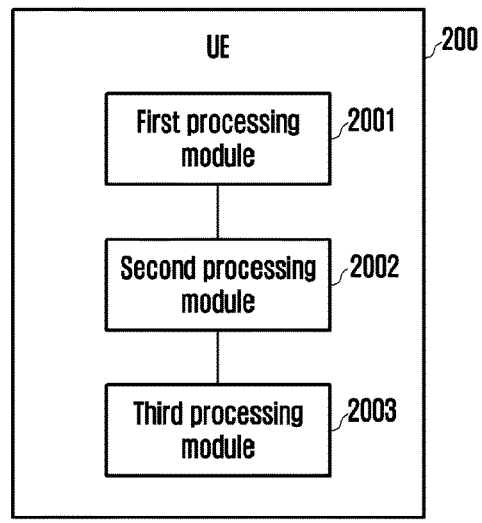
[Fig. 21]
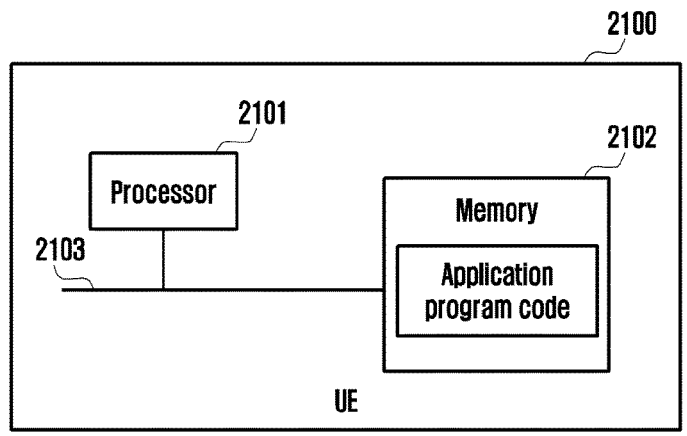
[Fig. 22]
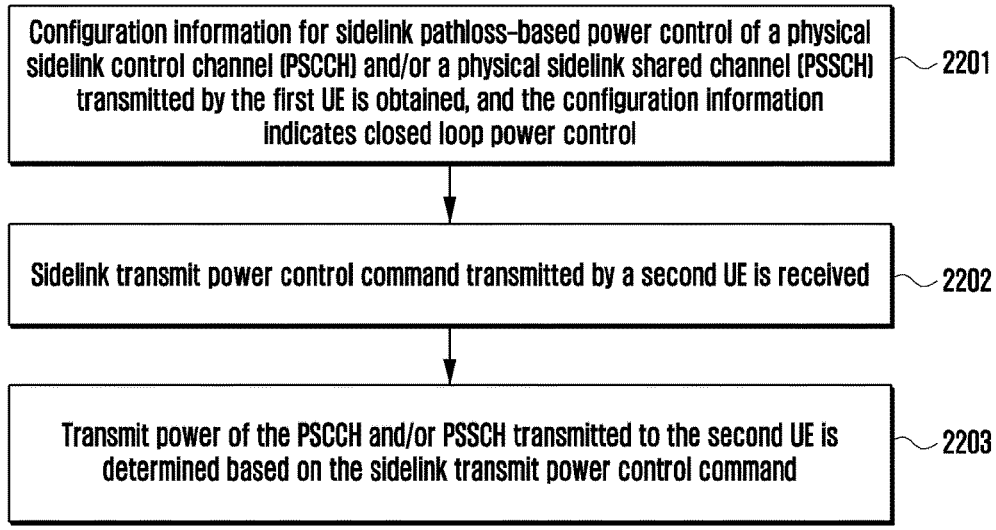

[Fig. 23]
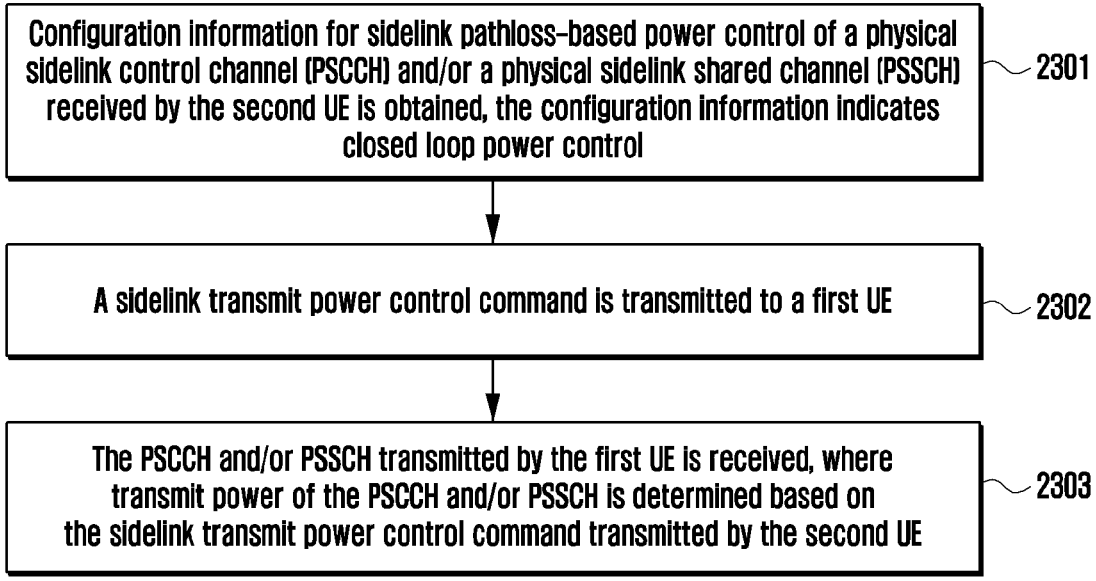
[Fig. 24]
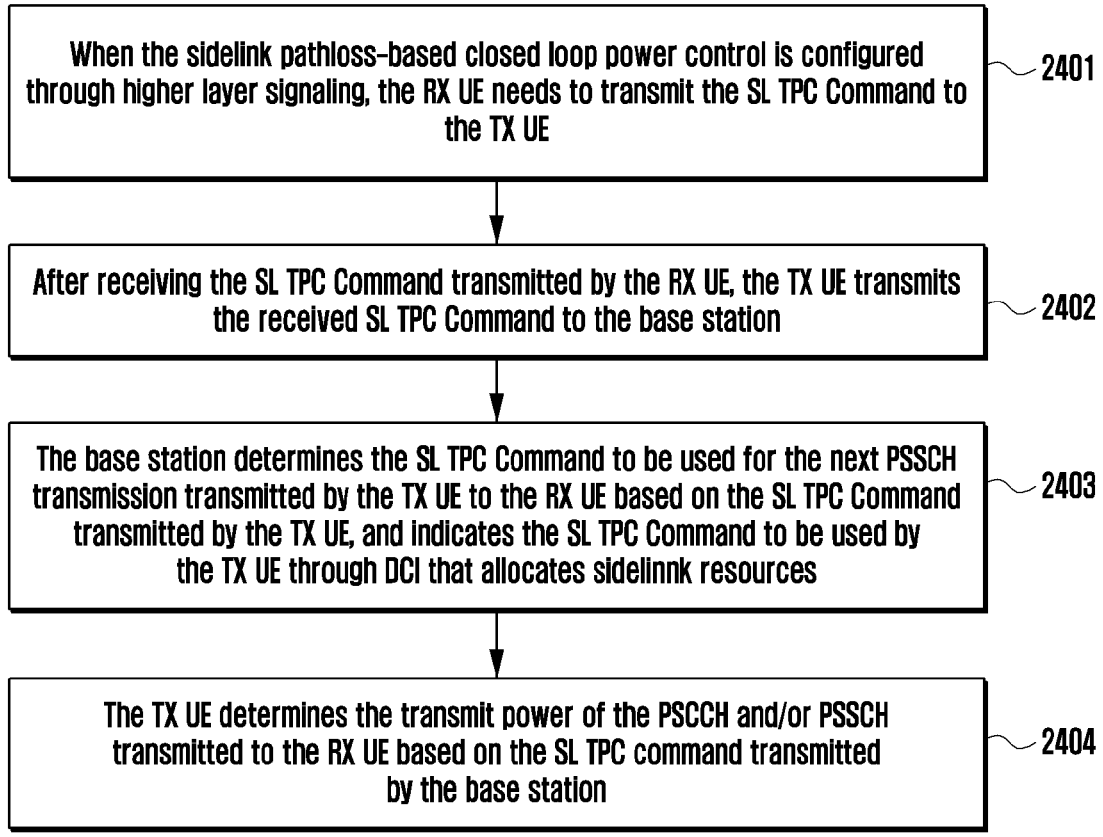

[Fig. 25]
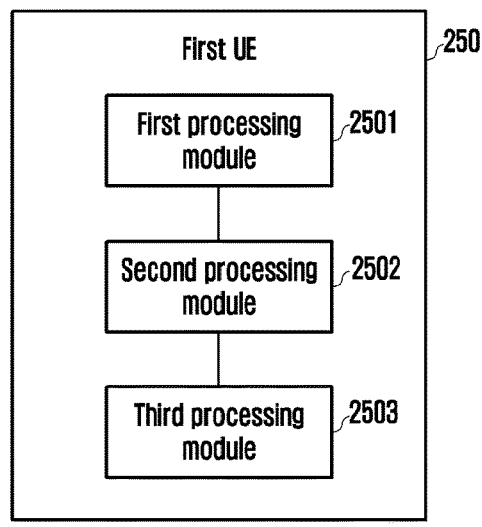
[Fig. 26]
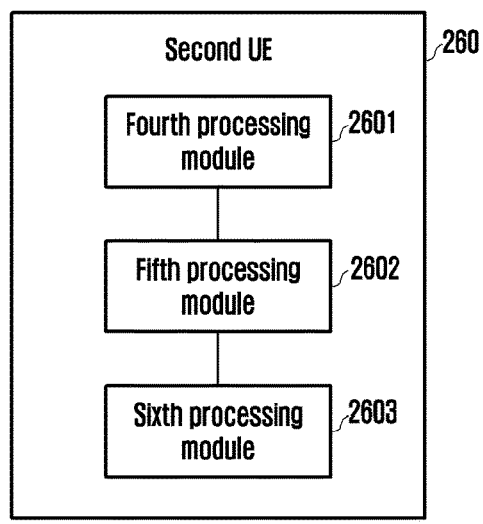
[Fig. 27]
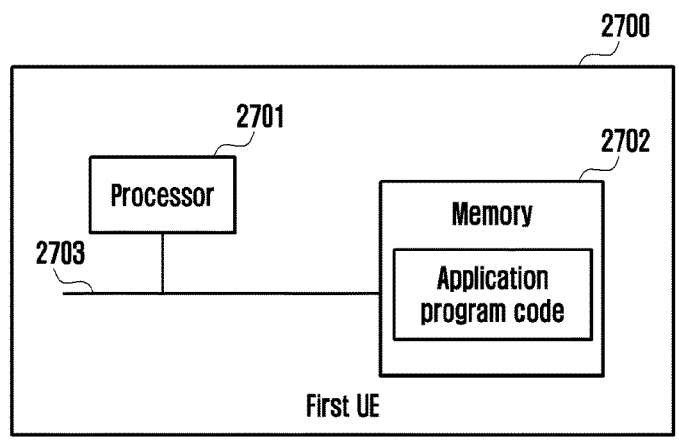

[Fig. 28]
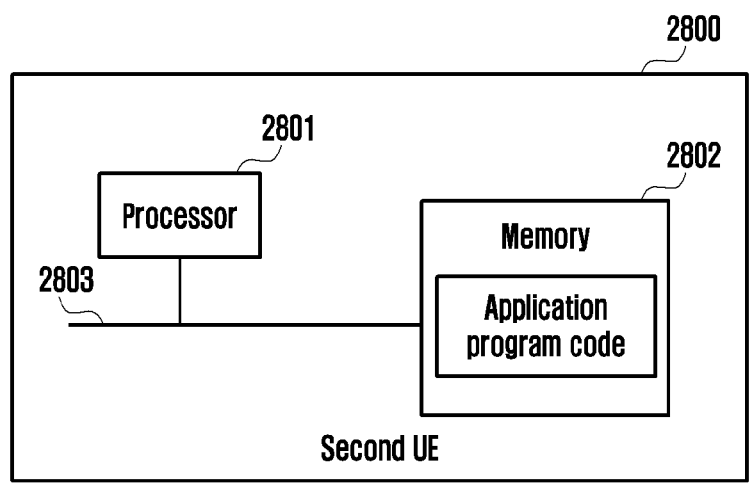

RESOURCE ALLOCATION AND A POWER CONTROL METHOD FOR SIDELINK COMMUNICATION SYSTEM

PRIORITY

This application is a National Phase Entry of PCT International Application No. PCT/KR2020/013141, which was filed on Sep. 25, 2020, and claims priority to Chinese Patent Application Nos. 201910918973.6, 201911084314.3, and 201911157710.4, which were filed on Sep. 26, 2019, Nov. 7, 2019, and Nov. 22, 2019, respectively, the entire content of each of which is incorporated herein by reference.

TECHNICAL FIELD

The present disclosure relates to the field of wireless communication technology. Specifically, the present disclosure relates to a resource allocation method and a power control method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the Long-term Evolution (LTE) standard formulated by the 3rd Generation Partnership Project (3GPP) organization, the direct communication link between a User Equipment (UE) and a UE is called Sidelink (SL). Similar to the Uplink (UL) and Downlink (DL), there are also control channels and data channels on the SL, that is, the Physical Sidelink Control Channel (PSCCH) and the Physical Sidelink Shared Channel (PSSCH). Among them, the PSSCH is used to carry data, and the PSCCH is used to indicate information such as the location of the time-frequency-domain resource and the modulation and coding scheme of the PSSCH transmission.

The 3GPP LTE standard defines two different sidelink communication mechanisms, including: a Device-to-Device (D2D) communication mechanism and a V2X communication mechanism. Among them, V2X is superior to D2D in terms of data rate, delay, reception reliability and the like. Therefore, V2X has become the most representative sidelink communication technology in the current 3GPP LTE standard.

The LTE V2X communication mechanism includes two resource allocation modes totally. One is a resource allocation mode scheduled by a base station (evolved Node B (eNB)), which is also known as a centralized resource allocation mode, that is, Mode 3; the other is a resource allocation mode that is autonomously selected by the UE, which is also known as a distributed resource allocation mode, that is, Mode 4. For Mode 3, the base station allocates specific sidelink resource locations for sending V2X information in a resource pool for the UE through the Physical Downlink Control Channel (PDCCH). Mode 3 minimizes the mutual interference between sidelink resources of different UEs through a reasonable base station scheduling strategy. For Mode 4, the base station is not involved in the allocation of specific sidelink resource locations, and the UE autonomously selects sidelink resources for sending V2X information from the sidelink resource pool according to resource selection conditions.

In a 3GPP 5G New Radio (NR) system, V2X is one of Working Items (WIs) of the Rel-16 NR standard. Similar to LTE V2X, the NR V2X system also supports two resource allocation modes. One is a resource allocation mode based on base station scheduling, that is, Mode 1, and Mode 1 of the NR V2X system corresponds to Mode 3 of the LTE V2X system; the other is a resource allocation mode that the UE autonomously selects, that is, Mode 2, and Mode 2 of the NR V2X system corresponds to Mode 4 of the LTE V2X system.

Compared with LTE V2X, NR V2X systems have higher service requirements. NR V2X systems need to support larger data packet to be transmitted. Specifically, the size of a typical data packet supported by the LTE V2X systems is 300 bytes, while the NR V2X systems need to support transmission of larger data packets, for example, the size of a NR V2X data packet can reach several kilobytes.

In order to support transmission of larger data packets, the NR V2X systems cannot reuse the single-slot resource allocation method of LTE V2X, but need to design a new resource allocation method for the NR V2X systems. However, in the prior art, the technical details of the resource allocation method for the NR V2X systems to support larger data packets are still not clear.

Compared with the LTE V2X system, the NR V2X system can support more types of business models. For example, the data of the business model of the UE may arrive non-periodically. In Mode 2, the UE may only use the self-selected resources once and may not reserve periodically the resources according to a certain reservation interval, so the above-mentioned UE autonomous resource allocation method may need to be improved. How to design the UE autonomous resource allocation method in Mode 2 of the NR V2X system is a problem which is needed to be solved urgently.

In NR V2X, for supporting more data service types, in addition to broadcast transmission, the sidelink communication also supports multicast transmission (that is, the physical channel transmitted by the UE is received and decoded by a group of UEs within a certain range) and unicast transmission (that is, the physical channel transmitted by the UE is received and decoded by another UE within a certain range). In order to reduce the transmit power of the UE as much as possible while meeting the requirements of sidelink transmission performance, thereby reducing the interference level between the UEs, both the multicast and unicast transmissions support the calculation of open loop transmit power based on the sidelink pathloss between two UEs. In particular, for the unicast transmission, it is also possible to support calculation of closed loop transmit power based on the sidelink pathloss between two UEs. For the sidelink pathloss-based closed loop power control, related technical details are not yet clear.

Solution to Problem

To overcome the above technical problems or at least partially solve the above technical problems, the present disclosure provides a resource allocation method for a sidelink communication system, including the following technical solutions.

There is provided a method for sidelink transmission, the method comprising: determining by a User equipment (UE) a parameter configuration for the slot aggregation transmission; determining by the UE a resource for slot aggregation based on the parameter configuration; and performing by the UE the Physical Sidelink Shared Channel (PSSCH) transmission and the associated Physical Sidelink Control Channel (PSCCH) transmission on the resource for slot aggregation.

Optionally, the PSSCH transmission is performed on PSSCH resources within the aggregated slots; or the PSSCH transmission is performed on PSSCH resources within the aggregated slots and on PSCCH resources within other aggregated slots than a first of aggregated slots.

Optionally, for a case where the PSSCH transmission is performed on PSSCH resources within the aggregated slots, a PSCCH associated with the PSSCH is sent on a PSCCH resource within each one of the aggregated slots; or a PSCCH associated with the PSSCH is sent on a PSCCH resource within a first of aggregated slots among the aggregated slots, and PSCCH resources within other aggregated slots than the first of aggregated slots are idle.

Optionally, for a case where the PSSCH transmission is performed on PSSCH resources within the aggregated slots and on PSCCH resources within other aggregated slots than a first of aggregated slots, the Demodulation Reference Signal (DMRS) pattern of the PSSCH within the first of aggregated slots is different from the DMRS patterns within the other aggregated slots than the first of aggregated slots.

Optionally, for a case where the PSSCH transmission is performed on PSSCH resources within the aggregated slots and on PSCCH resources within other aggregated slots than a first of aggregated slots, the transport block size of the PSSCH is decided according to the number of resource elements used for PSSCH mapping within the first of aggregated slots; or the transport block size of the PSSCH is decided according to the number of resource elements used for PSSCH mapping within other aggregated slots than the first of aggregated slots; or the transport block size of the PSSCH is decided according to the total number of resource elements used for PSSCH mapping within all the aggregated slots.

Optionally, the UE repeatedly sends the PSSCH within the aggregated slots.

Optionally, the same redundancy version is used within each one of the aggregated slots that the PSSCH is repeatedly sent; or the redundancy version used within each one of the aggregated slots that the PSSCH is repeatedly sent uses a predefined or preconfigured redundancy version cycle.

Optionally, for a case where the same redundancy version is used within each one of the aggregated slots that the PSSCH is repeatedly sent, the same redundancy version is fixed; or the same redundancy version is indicated by the UE through the Sidelink Control Information (SCI).

Optionally, for a case where the redundancy version used within each one of the aggregated slots that the PSSCH is repeatedly sent uses a predefined or pre-configured redundancy version cycle, the start redundancy version of the redundancy version cycle is fixed; or the start redundancy version of the redundancy version cycle is indicated by the UE through the SCI.

Optionally, the UE sends a PSSCH by the manner of overall rate matching within the aggregated slots.

Optionally, the UE sends a PSSCH using different analog beams within the aggregated slots.

Optionally, the aggregated slots are logically continuous.

Optionally, the aggregated slots are logically discontinuous.

Optionally, the parameter configuration comprises at least one of an enable/disable identifier for slot aggregation, a maximum number of slots that can be aggregated, a number of aggregated slots, an enable/disable identifier for Redundancy Version (RV) cycle, a RV cycle, a threshold of the Quality of service (Qos) of the PSSCH for deciding whether to use the slot aggregation transmission, a threshold of the Transport Block Size (TBS) of the PSSCH for deciding whether to use slot aggregation transmission, a threshold of the target communication range of the PSSCH for deciding whether to use the slot aggregation transmission, a threshold of the sidelink channel quality for deciding whether to use the slot aggregation transmission, a threshold of the sidelink power headroom for deciding whether to use the slot aggregation transmission, a threshold of the Reference Signal Receiving Power (RSRP) for deciding whether to exclude reserved resource for slot aggregations from a candidate resource set, and a threshold of the priority for the PSSCH when the slot aggregation transmission and uplink transmission overlaps.

Optionally, in cases where the value of the enable/disable identifier for slot aggregation is enable and disable respectively, at least one of the following conditions is satisfied: the format of the SCI for indicating the sidelink resource of the PSSCH transmission is different; in Mode 1 based on centralized resource allocation, the format of the Downlink Control Information (DCI) for scheduling the sidelink resource of the PSSCH transmission is different.

Optionally, the UE determines a set of numbers of slots that can be aggregated based on the maximum number of slots that can be aggregated, and the size of a field for indicating the number of aggregated slots in the SCI and/or the DCI for scheduling the sidelink resources is determined based on the size of the set of the numbers of slots that can be aggregated.

Optionally, the parameter configuration is pre-configured for at least one of a particular resource pool, a particular UE, a particular Quality Of Service and a particular Transport Block Size.

Optionally, the index of the starting slot of the PSSCH transmission is divisible by the total number of aggregated slots.

Optionally, in Mode 2 based on distributed resource allocation, when the UE autonomously selects a sidelink resource for the PSSCH transmission, the UE preferentially selects sidelink resources within a single slot for the PSSCH transmission, and if there are not enough sidelink resources within the single slot to select, the UE selects slot-aggregated sidelink resources for the PSSCH transmission; and/or the UE preferentially selects logically-continuous and slot-aggregated sidelink resources for one transmission of data to be transmitted, and if there are not enough logically-continuous and slot-aggregated sidelink resources to select, the UE segments the data to be transmitted into a plurality of transport blocks and determine the single-slot sidelink resources for the plurality of transport blocks respectively.

Optionally, the UE determines whether to use slot aggregation for performing the PSSCH transmission, the maximum number of slots that can be aggregated and/or the number of aggregated slots, based on at least one of the Quality Of Service and the Transport Block Size of the PSSCH to be sent.

Optionally, the threshold of the Reference Signal Receiving Power (RSRP) for excluding the reserved resource for slot aggregations and the threshold of Reference Signal Receiving Power (RSRP) for excluding the reserved single-slot resources are pre-configured separately.

Optionally, the threshold of the priority of the PSSCH for processing that the uplink transmission overlaps with the sidelink transmission of a single slot and the threshold of the priority of the PSSCH for processing that the uplink transmission overlaps with the sidelink transmission of the aggregation slot are pre-configured separately.

Optionally, when the uplink transmission of the UE and the sidelink transmission with slot aggregation overlap, if the priority of the sidelink transmission is lower than a threshold, the sidelink transmission is dropped by the UE, the dropping the sidelink transmission by the UE comprises: dropping the sidelink transmission on the slot(s) where the overlap occurs; or dropping the sidelink transmission on all aggregated slots; or dropping the sidelink transmission on all aggregated slots, if the slot(s) where the overlap occurs contains the first of aggregated slots; dropping by the UE only the sidelink transmission on the slot where the overlap occurs, if the slot(s) where the overlap occurs doesn't contain the first of aggregated slots.

Optionally, the method further comprises: receiving by the UE an ACK feedback for successful in-advance decoding of the PSSCH on a PSFCH resource, the PSFCH resource is associated with a PSSCH resource in one of aggregation slots other than the last of aggregation slots.

Optionally, an ACK feedback for successful in-advance decoding of the PSSCH is received by the UE on a PSFCH resource, the PSFCH resource corresponding to a PSSCH resource in one of aggregation slots other than the last of aggregation slots among the aggregated slots.

Optionally, the aggregated slots are logically discontinuous, and the UE receives the ACK feedback for successful in-advance decoding of the PSSCH within an interval slot between the logically-discontinuous aggregated slots.

Optionally, the total number of slots selected by the UE at one time for the sidelink resource of the PSSCH transmission does not exceed a predefined or pre-configured threshold.

Optionally, the method further comprises: reporting by the UE to a serving base station the assistance information for deciding whether to use slot aggregation transmission and/or for deciding the number of aggregated slots, wherein the assistance information comprises at least one of QoS of data to be transmitted, the amount of data to be transmitted, the target communication range, the Channel Quality Indicator (CQI) of the sidelink channel and the sidelink Power Headroom Report (PHR).

There is provided an apparatus for sidelink transmission, the apparatus performing the method as described above.

There is provided a computer device for sidelink transmission, comprising a processor and a memory storing thereon instructions which, when executed by the processor, performing the method as described above.

In view of the shortcomings of the existing methods, this application proposes a method and device for resource allocation to solve the problem of how to implement UE autonomous resource allocation method of the NR V2X system in Mode 2.

In an aspect, a method for resource allocation is provided, applied to user equipment UE, comprising:

initiating initial resource selection for temporarily selecting resources for data to be transmitted;

performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; and transmitting Physical Sidelink Control Channel (PSCCH) or Physical Sidelink Shared Channel (PSSCH) on first resource according to a result of the first resource reselection, and announcing other resources except the first resource through the transmitted SCI.

Optionally, performing a second resource reselection after the UE announces resources and before transmitting data on the announced resource, and when a second SCI transmitted by other UE is received and the predefined condition for triggering resource reselection is met, wherein a resource reserved by the other UE indicated in the second SCI is at least one of the resources that the UE has announced.

Optionally, the condition for triggering the first resource reselection comprises at least one of the following:

the UE triggers the first resource reselection when Reference Signal Received Power (RSRP), associated with the first SCI, measured by the UE is higher than a preconfigured threshold;

the UE triggers the first resource reselection when a priority of the data to be transmitted of the UE is lower than or equal to a priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when a resource on which the UE is to collide with the other UE is any one of the resources temporarily selected by the UE;

the UE triggers the first resource reselection when the resource on which the UE is to collide with the other UE is all resources temporarily selected by the UE;

the UE triggers the first resource reselection when the number of resources on which the UE is to collide with the other UE is greater than a predefined or preconfigured threshold;

the UE triggers the first resource reselection when the number of resources temporarily selected by the UE other than the resource on which the UE is to collide with the other UE is less than a predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission process of data to be transmitted; and the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, time relationship between the UE triggering the first resource reselection and performing the first resource reselection comprises at least one of the following:

the UE performs the first resource reselection immediately after triggering the first resource reselection, and the time point at which the first resource reselection is triggered is the same time point as the time point at which the first resource reselection is performed; and the UE does not perform the first resource reselection immediately after triggering the first resource reselection, and until a specific time point the UE performs the first resource reselection, the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0−Tp before the time point t0 at which the first resource temporarily selected by the UE is located, and when the condition for triggering resource reselection is met, the UE performs the first resource reselection at the time point t0−Tp, wherein the Tp is a predefined or preconfigured value, and the t0−Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, and after triggering the first resource reselection, until time point t0−Tp before the time point t0 at which the first resource temporarily selected by the UE is located, the UE performs the first resource reselection, where Tp is a predefined or preconfigured value, the t0−Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before a first available resource by a predefined interval Tp, the UE performs the first resource reselection, where Tp is a predefined or preconfigured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UE, and the conditions for triggering the resource reselection are met, the transmit power of the PSCCH and/or the PSSCH transmitted by the UE on the resource to be collided is adjusted.

Optionally, an adjustment amount of the transmit power of the PSCCH and/or the transmit power of the PSSCH is related to at least one of the following:
the RSRP of the other UE measured by the UE; and
the priority of the data to be transmitted of the UE;
the priority of the data of the other UE.

Optionally, adjusting the transmit power of the PSCCH and/or the transmit power of the PSSCH comprises at least one of the following:
when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;
when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:
the sensing window for the first resource reselection is a translation of a sensing window for a resource preliminary selection, and the resource preliminary selection is the initial resource selection;
the sensing window for the first resource reselection includes the sensing window for the resource preliminary selection, and the time after a time point n and before a time point m, where the time point n is a time point at which the resource preliminary selection is performed, and the time point m is a time point at which the first resource reselection is performed; and
the sensing window for the resource reselection includes the time after the time point n and before the time point m.

Optionally, a manner of defining a resource selection window for the first resource reselection comprises at least one of the following:
using a same criteria to determine the resource selection window for the first resource reselection and the resource selection window for the resource preliminary selection, and there is no correlation between the actual lengths of the two resource selection windows, wherein the resource preliminary selection is the initial resource selection;
the resource selection window for the first resource reselection is a translation of the resource selection window for resource preliminary selection;
the resource selection window for the first resource reselection is the remaining available time in the resource selection window for the resource preliminary selection; and
the resource selection window for the first resource reselection includes all of available time until Packet Delay Budget (PDB).

Optionally, an enable or disable status of the first resource reselection function is configured by at least one of the following:
configuring the enable or disable status of the first resource reselection function for each resource pool;
configuring the enable or disable status of the first resource reselection function for each UE;
configuring the enable or disable status of the first resource reselection function for a Channel Busy Ratio (CBR) on a resource pool; and
configuring the enable or disable status of the first resource reselection function for the priority of the data.

Optionally, configuring the enable or disable status of the first resource reselection function before resource announcement for a CBR on a resource pool, comprising:
for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:
for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:
the UE triggers the second resource reselection when the RSRP, associated with the second SCI, measured by the UE is higher than a preconfigured threshold;
the UE triggers the second resource reselection when the interval between the time when the UE successfully receives the second SCI and the PDB of the data to be transmitted is greater than a predefined or preconfigured threshold; and
the UE triggers the second resource reselection when the resource on which the UE will collide with other UE is used for the first transmission of a transport block of the UE.

Optionally, a manner of determining a time point at which performing second resource reselection includes any of the following:
the UE successfully receives the second SCI at the second time point, and when the condition for triggering the resource reselection is met, the UE performs the second resource reselection at the second time point; and
the UE successfully receives the second SCI at the second time point, and when the condition for triggering the resource reselection is met, the UE performs the second resource reselection at a time point by predefined interval before the time point of the resource to be collided.

In a second aspect, a UE is provided, including:
a first processing module configured to initiate initial resource selection for temporarily selecting resources for data to be transmitted;
a second processing module configured to perform a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; and
a third processing module configured to transmitting PSCCH or PSSCH on the first resource according to a result of the first resource reselection, and announcing other resources except the first resource through the transmitted SCI.

In a third aspect, the present application provides a UE, including: a processor, a memory, and a bus;
the bus is configured to connect the processor and the memory;
the memory is configured to store an operation instruction;

the processor is configured to execute the method for resource allocation in the aspect of the present application by invoking the operation instruction.

The technical solutions provided in the embodiments of the present application have at least the following beneficial effects:

initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

Additional aspects and advantages of the present application will be given in the following description, which will become apparent from the following description or be learned through the practice of the present application.

In view of the disadvantages of the existing methods, the present disclosure proposes a power control method and a device to solve the above-mentioned technical defects.

According to an aspect of the present disclosure, a power control method used in a first user equipment (UE) is provided, and the method includes: obtaining configuration information for sidelink pathloss-based power control of a physical sidelink control channel (PSCCH) and/or a physical sidelink shared channel (PSSCH) transmitted by the first UE, the configuration information indicating closed loop power control; receiving a sidelink transmit power control command transmitted by a second UE; and determining transmit power of the PSCCH and/or PSSCH transmitted to the second UE based on the sidelink transmit power control command.

Alternatively, the determining transmit power of the PSCCH and/or PSSCH transmitted to the second UE based on the sidelink transmit power control command includes: transmitting the sidelink transmit power control command to a base station; receiving a sidelink transmit power control command transmitted by the base station for the PSCCH and/or PSSCH transmitted by the first UE to the second UE; and determining transmit power of the PSCCH and/or PSSCH transmitted to the second UE based on the sidelink transmit power control command transmitted by the base station.

Alternatively, the configuration information is included in the configuration information of a resource pool; or the configuration information is configured for each UE.

Alternatively, the closed loop power control indicated by the configuration information takes effect when at least one of the following conditions is met: channel busy ratio (CBR) measured by the first UE on the transmission resource pool is greater than a predefined or preconfigured threshold; and sidelink power head room (SL PHR) of the PSCCH and/or PSSCH transmitted by the first UE to the second UE is lower than a predefined or preconfigured threshold.

Alternatively, the determining the transmit power of the PSCCH and/or PSSCH includes: determining the smallest one of the following as the transmit power of the PSCCH and/or PSSCH: the maximum sidelink transmit power, the maximum sidelink transmit power configured based on a priority of data carried by the PSSCH and CBR range measured on the resource pool, downlink pathloss-based transmit power, and sidelink pathloss-based transmit power determined based on the sidelink transmit power control command.

Alternatively, determining the sidelink pathloss-based transmit power based on the sidelink transmit power control command includes any one of the following: determining the sidelink pathloss-based transmit power based on an accumulated value of a currently received sidelink transmit power control command and a previously received sidelink transmit power control command; and determining the sidelink pathloss-based transmit power based on the currently received sidelink transmit power command.

Alternatively, the receiving the sidelink transmit power control command transmitted by the second UE includes: receiving the sidelink transmit power control command transmitted by the second UE through a physical sidelink feedback channel (PSFCH).

Alternatively, the receiving the sidelink transmit power control command transmitted by the second UE through the physical sidelink feedback channel (PSFCH) includes any one of the following: receiving the sidelink transmit power control command indicated by a transmission parameter of the PSFCH; receiving the sidelink transmit power control command indicated by acknowledgment (ACK) or non-acknowledgement (NACK) information carried by the PSFCH; and receiving the sidelink transmit power control command indicated by information bits carried by the PSFCH.

Alternatively, the receiving the sidelink transmit power control command indicated by the transmission parameter of the PSFCH includes at least one of the following: receiving the sidelink transmit power control command indicated by a signal sequence of the PSFCH; receiving the sidelink transmit power control command indicated by a demodulation reference signal (DMRS) of the PSFCH; receiving the sidelink transmit power control command indicated by an orthogonal cover code (OCC) of the PSFCH; and receiving the sidelink transmit power control command indicated by a resource of the PSFCH.

Alternatively, the receiving the sidelink transmit power control command indicated by the acknowledgment (ACK) or non-acknowledgement (NACK) information carried by the PSFCH includes: when the received feedback information carried by the PSFCH is ACK, the sidelink transmit power control command is to reduce the transmit power by a predefined or preconfigured value; and when the received feedback information carried by the PSFCH is NACK, the sidelink transmit power control command is to increase the transmit power by a predefined or preconfigured value.

Alternatively, the receiving the sidelink transmit power control command indicated by information bits carried by the PSFCH includes: multiplexing the information bits of the received sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the receiving the sidelink transmit power control command transmitted by the second UE includes: receiving the sidelink transmit power control command transmitted by the second UE through a media access control control element (MAC CE).

Alternatively, the sidelink transmit power control command is applied to the PSCCH and/or PSSCH transmitted by the first UE to the second UE during a preset time.

Alternatively, the sidelink control information (SCI) is used to indicate whether the second UE is triggered to transmit the sidelink transmit power control command to the first UE.

According to a second aspect of the present disclosure, a power control method used in a second UE is provided, and the method includes: obtaining configuration information for sidelink pathloss-based power control of a physical sidelink control channel (PSCCH) and/or a physical sidelink shared channel (PSSCH) received by the second UE, the configuration information indicating closed loop power control; transmitting a sidelink transmit power control command to a first UE; receiving the PSCCH and/or PSSCH transmitted by the first UE, where transmit power of the PSCCH and/or PSSCH is determined based on the sidelink transmit power control command transmitted by the second UE.

Alternatively, the transmit power of the PSCCH and/or PSSCH being determined based on the sidelink transmit power control command transmitted by the second UE includes: transmitting, by the first UE, the received sidelink transmit power control command transmitted by the second UE to a base station; transmitting, by the base station, the sidelink transmit power control command for the PSCCH/PSSCH to the first UE; and the transmit power of the PSCCH and/or PSSCH being determined based on the sidelink transmit power control command transmitted by the base station.

Alternatively, the obtaining configuration information for sidelink pathloss-based power control includes: receiving radio resource control (RRC) signaling of a PC5 interface transmitted by the first UE; and obtaining the configuration information based on the RRC signaling.

Alternatively, the transmitting the sidelink transmit power control command to the first UE includes: transmitting the sidelink transmit power control command through a physical sidelink feedback channel (PSFCH).

Alternatively, the transmitting the sidelink transmit power control command through the PSFCH includes any of the following: indicating the sidelink transmit power control command by the transmission parameter of the PSFCH; indicating the sidelink transmit power control command by the acknowledgment (ACK) or non-acknowledgement (NACK) information carried by the PSFCH; and indicating the sidelink transmit power control command by information bits carried by the PSFCH.

Alternatively, the indicating the sidelink transmit power control command by the transmission parameter of the PSFCH includes at least one of the following: indicating the sidelink transmit power control command by a signal sequence of the PSFCH; indicating the sidelink transmit power control command by a demodulation reference signal (DMRS) of the PSFCH; indicating the sidelink transmit power control command by an orthogonal cover code (OCC) of the PSFCH; and indicating the sidelink transmit power control command by a resource of the PSFCH.

Alternatively, the indicating the sidelink transmit power control command by the acknowledgment (ACK) or non-acknowledgement (NACK) information carried by the PSFCH includes: when the feedback information carried by the PSFCH is ACK, the sidelink transmit power control command is to reduce the transmit power by a predefined or preconfigured value; and when the feedback information carried by the PSFCH is NACK, the sidelink transmit power control command is to increase the transmit power by a predefined or preconfigured value.

Alternatively, the indicating the sidelink transmit power control command by information bits carried by the PSFCH includes: multiplexing the information bits of the sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the transmitting the sidelink transmit power control command to the first UE includes: transmitting the sidelink transmit power control command through a media access control control element (MAC CE).

Alternatively, the sidelink transmit power control command is applied to the PSCCH and/or PSSCH transmitted by the first UE to the second UE during a preset time.

Alternatively, based on the indication in the sidelink control information (SCI) transmitted by the first UE to the second UE, determining whether to trigger the transmission of the sidelink transmit power control command to the first UE.

According to a third aspect of the present disclosure, a first UE is provided, comprising: a first processing module configured to obtain configuration information for sidelink pathloss-based power control of a physical sidelink control channel (PSCCH) and/or a physical sidelink shared channel (PSSCH) transmitted by the first UE, the configuration information indicating closed loop power control; a second processing module configured to receive sidelink transmit power control command transmitted by a second UE; and a third processing module configured to determine transmit power of the PSCCH and/or PSSCH transmitted to the second UE based on the sidelink transmit power control command.

According to a fourth aspect of the present disclosure, a second UE is provided, comprising: a fourth processing module configured to obtain configuration information for sidelink pathloss-based power control of a physical sidelink control channel (PSCCH) and/or a physical sidelink shared channel (PSSCH) received by the second UE, the configuration information indicating closed loop power control; a fifth processing module configured to transmit a sidelink transmit power control command to a first UE; and a sixth processing module configured to receive the PSCCH and/or PSSCH transmitted by the first UE, and transmit power of the PSCCH and/or PSSCH is determined based on the sidelink transmit power control command transmitted by the second UE.

According to a fifth aspect of the present disclosure, a first UE is provided, comprising: a memory configured to store operating instructions; a processor configured to execute the operating instructions to perform the power control method according to the aspect of the present disclosure; and a bus configured to connect the processor and the memory.

According to a sixth aspect of the present disclosure, a second UE is provided, comprising: a memory configured to store operating instructions; a processor configured to execute the operating instructions to perform the power control method according to the second aspect of the present disclosure; and a bus configured to connect the processor and the memory.

The technical solution provided by the embodiments of the present disclosure has at least the following beneficial effects: obtaining configuration information for sidelink pathloss-based power control of a physical sidelink control channel (PSCCH) and/or a physical sidelink shared channel (PSSCH) transmitted by the first UE, the configuration information indicating closed loop power control; receiving sidelink transmit power control command transmitted by a second UE; and determining transmit power of the PSCCH and/or PSSCH transmitted to the second UE based on the sidelink transmit power control command. As such, the sidelink pathloss-based closed loop power control is achieved.

Additional aspects and advantages of the present disclosure will be partially given in the following description, which will become apparent from the following description, or be learned through the practice of the present disclosure.

Advantageous Effects of Invention

There is provided a method for sidelink transmission, the method comprising: determining by a User equipment (UE) a parameter configuration for the slot aggregation transmission; determining by the UE a resource for slot aggregation based on the parameter configuration; and performing by the UE the Physical Sidelink Shared Channel (PSSCH) transmission and the associated Physical Sidelink Control Channel (PSCCH) transmission on the resource for slot aggregation.

The technical solutions provided in the embodiments of the present application have at least the following beneficial effects:

initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

The technical solution provided by the embodiments of the present disclosure has at least the following beneficial effects: obtaining configuration information for sidelink pathloss-based power control of a physical sidelink control channel (PSCCH) and/or a physical sidelink shared channel (PSSCH) transmitted by the first UE, the configuration information indicating closed loop power control; receiving sidelink transmit power control command transmitted by a second UE; and determining transmit power of the PSCCH and/or PSSCH transmitted to the second UE based on the sidelink transmit power control command. As such, the sidelink pathloss-based closed loop power control is achieved.

BRIEF DESCRIPTION OF DRAWINGS

The above and/or additional aspects and advantages of the present disclosure will become apparent and easily understood from the following description of the embodiments in conjunction with the accompanying drawings, in which:

FIG. 1 is a flowchart of an example of a method for sidelink transmission;

FIG. 2 is a schematic diagram of a sidelink occupation mode;

FIG. 3 is another schematic diagram for sidelink occupation mode;

FIG. 4 is a schematic diagram of a PSFCH resource for receiving a HARQ feedback in a case where the UE sends a PSSCH on multiple logically-continuous aggregated slots;

FIG. 5 is a schematic diagram of a PSFCH resource for receiving HARQ feedback in a case where the UE sends a PSSCH on multiple logically-discontinuous aggregated slots.

FIG. 6 is a schematic flowchart of a UE autonomous resource allocation method of LTE V2X;

FIG. 7 is a schematic flowchart of a resource allocation method according to an embodiment of the present application;

FIG. 8 is a schematic diagram of a time relationship diagram of a resource selection process according to an embodiment of the present application;

FIG. 9 is a schematic diagram of the temporarily selected resource reserved by other UE through SCI according to an embodiment of the present application;

FIG. 10 is a schematic diagram of time point at which a resource reselection is triggered according to an embodiment of the present application;

FIG. 11 is a schematic diagram of time point at which a resource reselection is triggered according to an embodiment of the present application;

FIG. 12 is a schematic diagram of time point at which a resource reselection is triggered according to an embodiment of the present application;

FIG. 13 is a schematic diagram of time point at which a resource reselection is triggered according to an embodiment of the present application;

FIG. 14 is a schematic diagram of a sensing window for resource reselection according to an embodiment of the present application;

FIG. 15 is a schematic diagram of a sensing window for resource reselection according to an embodiment of the present application;

FIG. 16 is a schematic diagram of a sensing window for resource reselection according to an embodiment of the present application;

FIG. 17 is a schematic diagram of a resource selection window for resource reselection according to an embodiment of the present application;

FIG. 18 is a schematic diagram of a resource selection window for resource reselection according to an embodiment of the present application;

FIG. 19 is a schematic diagram of a resource selection window for resource reselection according to an embodiment of the present application;

FIG. 20 is a schematic structural diagram of a UE according to an embodiment of the present application;

FIG. 21 is a schematic structural diagram of a UE according to an embodiment of the present application.

FIG. 22 is a schematic flowchart of a power control method according to an embodiment of this disclosure;

FIG. 23 is a schematic flowchart of another power control method according to an embodiment of the present disclosure;

FIG. 24 is a schematic flowchart of yet another power control method according to an embodiment of the present disclosure;

FIG. 25 is a schematic structural diagram of a first UE according to an embodiment of this disclosure;

FIG. 26 is a schematic structural diagram of a second UE according to an embodiment of this disclosure;

FIG. 27 is a schematic structural diagram of a first UE according to an embodiment of this disclosure; and FIG. 28 is a schematic structural diagram of a second UE according to an embodiment of the present disclosure.

MODE FOR THE INVENTION

Hereinafter, embodiments of the present disclosure will be described in detail. Examples of the embodiments are shown in the accompanying drawings in which the same or similar reference numerals represent the same or similar elements or elements having the same or similar functions throughout. The embodiments described below with reference to the drawings are exemplary and are only used to explain the present disclosure, but cannot be interpreted as limiting of the present disclosure.

Those skilled in the art may understand that, unless specifically stated otherwise, the singular forms "a", "an", "the" and "said" may also include plural forms. It should be further understood that the term "include" used in the description of the present disclosure refers to the presence of the described features, integers, steps, operations, elements and/or components, but does not exclude the presence or addition of one or more other features, integers, steps, operations, elements, components and/or groups thereof. It should be understood that when an element is referred to as being "connected" or "coupled" to another element, it can be directly connected or coupled to the other element, or intervening elements may also be present. Furthermore, "connected" or "coupled" used herein may include being wirelessly connected or wirelessly coupled. The term "and/or" used herein includes all or any one and all combinations of one or more associated listed items.

Those skilled in the art can understand that, unless otherwise defined, all terms (including technical and scientific terms) used herein have the same meaning as those commonly understood by those of ordinary skill in the art to which this disclosure belongs. It should also be understood that terms such as those defined in the general dictionary should be understood to have meanings consistent with the meanings in the context of the prior art, and would not be explained by idealized or too formal meanings unless specifically defined like here.

Those skilled in the art can understand that the "terminal" and "terminal equipment" used herein include both devices containing wireless signal receivers, which are devices with wireless signal receivers that have no transmitting capability, and devices containing receiving and transmitting hardware, which are devices with receiving and transmitting hardware capable of performing two-way communication on a two-way communication link. Such devices may include: cellular or other communication devices which are cellular or other communication devices with single-line displays or multi-line displays or without multi-line display; PCS (Personal Communications Service) which can combine voice and data processing, fax and/or data communication capabilities; PDA (Personal Digital Assistant) which may include radio frequency receivers, pagers, Internet/Intranet access, web browsers, notepads, calendars and/or GPS (Global Positioning System) receivers; conventional laptop and/or palmtop computers or other devices which are conventional laptop and/or palmtop computers or other devices with and/or including radio frequency receivers. "Terminal" and "terminal equipment" used herein may be portable, transportable, installed in trans-portation (air, sea and/or land), or adapted and/or configured to operate locally, and/or operate in a distributed fashion on the earth and/or at any other position of the space. "Terminal" and "terminal equipment" used herein may also be communication terminals, Internet terminals, music/video playback terminals, for example may be PDAs, MIDs (Mobile Internet Devices), and/or mobile phones with music/video playback function, and may also be devices such as smart TVs, set-top boxes and so on.

Embodiment 1

In the following, a UE for sending a sidelink physical data channel is referred to as a sender UE and is labeled as a TX UE; a UE for receiving a sidelink physical data channel is referred to as a receiver UE and is labeled as an RX UE. The TX UE sends a Physical Sidelink Shared Channel (PSSCH) and a Physical Sidelink Control Channel (PSCCH) to the RX UE. Among them, the PSSCH is used to carry sidelink data, that is, used to carry a Sidelink Shared Channel (SL-SCH); the PSCCH is used to carry Sidelink Control Information (SCI), that is, used to carry information indicating the location of the time-frequency-domain resource, the modulation and coding scheme, etc. of the PSSCH transmission.

In the following, the slot of the NR V2X system is a concept that has the same physical meaning as the subframe of the LTE V2X system. The slot is the smallest granularity of NR V2X system PSSCH resources allocated in the time domain, and one slot includes 14 Orthogonal Frequency-Division Multiplexing (OFDM) symbols.

Regarding Slot Aggregation

Slot Aggregation is aggregating two or more slots together for transmission of one PSSCH.

Optionally, within the multiple aggregated slots, the same frequency-domain resources will be used to perform PSSCH transmission, that is, the frequency-domain resources indicated in the SCI are applicable to each aggregation slot.

Optionally, in the multiple aggregated slots, different frequency-domain resources may be used to perform PSSCH transmission. In one example, there is no relationship between the frequency-domain resources within different aggregated slots. The SCI needs to indicate the associated frequency-domain resource for each resource for slot aggregation, and when indicating the frequency-domain resource, may indicate, by the relative offset of the start position of the frequency-domain resource within the first slot, the start position of the frequency-domain resources within other slots. In another example, there is a predefined mapping relationship between frequency-domain resources within different aggregated slots. According to the mapping relationship and the frequency-domain resource within the first slot, frequency-domain resources within other slots may be determined, that is, the SCI only needs to indicate the frequency-domain resource within the first of aggregated slots.

Optionally, multiple aggregated slots for PSSCH transmission may be logically continuous, but may be physically discontinuous. The "logically continuous" means that the aggregated multiple slots are continuous from the perspective of a logical slot which refers to a slot configured for sidelink transmission; "physical continuous" means that the aggregated multiple slots are continuous from the perspective of a physical slot which includes a slot configured for sidelink transmission and a slot not configured for sidelink transmission. For logically-continuous PSSCH transmission, the SCI only indicates the position of the start aggregation slot and the number of aggregated slots, and does not need to indicate positions of other aggregated slots. The logically-continuous slot aggregation helps to simplify the design of the system and reduce the signaling overhead used to indicate time-domain sidelink resources.

Optionally, multiple aggregated slots for PSSCH transmission may be logically discontinuous. For logically-discontinuous PSSCH transmission, the SCI needs to indicate the position of each aggregation slot, for example, it may indicate positions of other slots by time intervals from the position of the first slot, or, indicate positions of other slots by the time interval from the position of the previous slot. The logically-discontinuous slot aggregation helps to allocate sidelink resources more flexibly, especially in Mode 2 based on a distributed resource allocation, provides greater freedom for the UE to autonomously select resource for slot aggregations, making the chance of being able to select resource for slot aggregations greater.

Regarding Slot Aggregation Transmission

FIG. 1 is steps about the slot aggregation transmission.

As shown in FIG. 1, the slot aggregation transmission includes the following steps.

Step 101: A TX UE determines a parameter configuration of the slot aggregation transmission.

Step 102: The TX UE determines resource for slot aggregations based on the parameter configuration.

Step 103: The TX UE performs Physical Sidelink Shared Channel (PSSCH) transmission and associated Physical Sidelink Control Channel (PSCCH) transmission on the determined resource for slot aggregations.

In the present specification, the present disclosure is explained using a pre-configured high-level parameter as an instance of the parameter configuration, but this cannot be used as a restrictive interpretation of other parameter configurations applicable to the present disclosure.

Regarding the Manner of Determining Pre-Configured High-Level Parameters of the Slot Aggregation Transmission in Modes 1 and 2 as Well as the Manner of Determining Resource for Slot Aggregations (1) In the Resource Allocation Mode Mode 1 Based on Base Station's Allocation of Sidelink Resources In the resource allocation mode Mode 1, determining by the TX UE the pre-configured high-level parameters of the slot aggregation transmission includes: receiving by the TX UE the pre-configured high-level parameters of the slot aggregation transmission from the base station based on UE specific RRC signaling.

In the resource allocation mode Mode 1, determining by the TX UE the resource for slot aggregations includes: determining by the TX UE the resource for slot aggregations based on the DCI contained in the PDCCH received from the base station.

(2) In the Resource Allocation Mode Mode 2 Based on UE's Autonomous Selection of Sidelink Resources In the resource allocation mode Mode 2, if the TX UE is within the coverage of a cellular network, determining by the TX UE pre-configured high-level parameters of the slot aggregation transmission includes: receiving by the TX UE the pre-configured high-level parameters of the slot aggregation transmission from the base station based on UE specific RRC signaling; if the TX UE is outside the coverage of the cellular network, determining by the TX UE pre-configured high-level parameters of the slot aggregation transmission includes: determining by the TX UE the pre-configured high-level parameters of the slot aggregation transmission based on the hard-coded sidelink parameters.

In the resource allocation mode Mode 2, determining by the TX UE the resource for slot aggregations includes: autonomously selecting by the TX UE the resource for slot aggregations.

Regarding the Adaptability and Beneficial Effects of the Slot Aggregation in Modes 1 and 2

One beneficial effect of the slot aggregation is to support transmission of larger TBS, that is, the purpose of the slot aggregation is to aggregate more resources in the time domain to transmit larger TBS at the target coding rate.

The PSSCH transmission that supports larger TBS through the slot aggregation is applicable to Mode 2 based on distributed resource allocation and not applicable to Mode 1 based on centralized resource allocation. This is because PSSCH resources of the UE are allocated centrally by the base station in Mode 1, and a smart base station can allocate more resources in the frequency domain to support PSSCH transmission of larger TBS without the need of allocating more resources in the time domain by the manner of slot aggregation to support PSSCH transmission of larger TBS, while in Mode 2, the UE autonomously selects sidelink resources by the manner of channel sensing, then there may not be enough resources in the frequency domain to support PSSCH transmission of larger TBS, and PSSCH transmission of larger TBS can only be supported by occupying more resources by the manner of slot aggregation.

Another beneficial effect of the slot aggregation is to support larger coverage, which is mainly applicable to scenarios where the transmit power is limited, and the above-mentioned slot aggregation for supporting larger TBS is applicable to scenarios where the transmit power is not limited. The transmit power being limited means that the transmit power has reached the maximum allowable transmit power, adding more resources in the frequency domain cannot improve the transmission performance, and the only way is to accumulate signal energy in time by the manner of slot aggregation to improve the reception Signal-to-Noise Ratio (SNR) on the RX UE side so as to enlarge the coverage. Supporting PSSCH transmission of larger TBS through the slot aggregation is applicable to both Mode 2 based on distributed resource allocation and Mode 1 based on centralized resource allocation. If the channel quality of the sidelink is poor and the transmit power of the TX UE is already limited, then the slot-aggregated PSSCH transmission can be enabled.

Regarding the Resource Occupation Mode of the Actual PSSCH Transmission on Aggregated Slots FIG. 2 and FIG. 3 respectively show two different embodiments of PSSCH transmission resource occupation modes on aggregated slots.

In terms of the composition of aggregated slots, similar technical schemes are described in the two embodiments shown in FIG. 2 and FIG. 3.

Each aggregated slot used for PSSCH transmission should use the same frequency domain resource. In a V2X system, a Sub-channel is the smallest granularity of the PSSCH resource allocation in the frequency domain. Each PSSCH sub-channel corresponds to one PSCCH resource, and the PSSCH sub-channel and the associated PSCCH resource are within the same slot. In actual transmission, if the PSSCH resource includes only one PSSCH, then the TX UE sends the PSCCH associated with the PSSCH on one PSCCH resource corresponding to the one PSSCH sub-channel; if the PSSCH resource includes multiple PSSCH sub-channels, then the TX UE sends the PSCCH associated with the PSSCH on only one PSCCH resource among multiple PSCCH resources corresponding to the multiple PSSCH sub-channels. In one example, other PSCCH resources in the multiple PSCCH resources are used for PSSCH transmission, that is, the PSSCH is mapped onto the multiple PSSCH sub-channels and other PSCCH resources than that used for PSCCH transmission among the multiple PSCCH resources, and in another example, the other PSCCH resources among the multiple PSCCH resources are idle.

As shown in FIG. 2 and FIG. 3, four logically-continuous slots being aggregated together for transmission of one PSSCH are taken as an example. Each slot includes:

The first OFDM symbol is used for Automatic Gain Control (AGC). Specifically, the TX UE sends, at the AGC symbol, a signal with the same transmit power as that of the PSSCH within the present slot. The signal sent specifically depends on the implementation of the UE. The RX UE adjusts the threshold of the AGC according to the energy of the signal received at the AGC symbol;

The last OFDM symbol is used for a Guard Interval (GP). Specifically, there is no transmission of any signal at the GP symbol;

A PSCCH resource; and

The PSSCH resource associated with the PSCCH resource.

Regarding the occupation mode of PSSCH transmission resources, two optional technical schemes are described in the two embodiments shown in FIG. 2 and FIG. 3.

In one embodiment, as shown in FIG. 2, the TX UE performs PSSCH transmission on the PSSCH resource within each aggregation slot, that is, the actual transmission of the PSSCH occupies the PSSCH resource in each aggregation slot.

Optionally, the TX UE sends the PSCCH associated with the PSSCH on the associated PSCCH resource within each slot of the multiple aggregated slots.

In one example, the number of aggregated slots used for PSSCH transmission is indicated by the SCI, and the number of aggregated slots indicated by the PSCCH associated with the PSSCH transmitted within each slot should be different. For example, the number of aggregated slots indicated by the PSCCH associated with the PSSCH transmitted within the first slot in FIG. 2 is 4, and the number of aggregated slots indicated by the PSCCH associated with the PSSCH transmitted within the second slot is 3, the number of aggregated slots indicated by the PSCCH associated with the PSSCH transmitted within the third slot is 2, and the number of aggregated slots indicated by the PSCCH associated with the PSSCH transmitted within the fourth slot is 1. That is, the number of aggregated slots indicated by the PSCCH associated with the PSSCH transmitted within each aggregation slot includes the number of the current slot and subsequent slots, excluding the number of previous slots. The beneficial effect of this is that even if the RX UE loses the PSSCH transmission of the previous parts of aggregated slots due to the influence of half duplex, the RX UE can still receive the PSSCH transmission of the subsequent parts of aggregated slots.

Optionally, except that the number of aggregated slots indicated in the SCI described above is different, other information indicated by the PSCCH associated with the PSSCH transmitted within each slot is completely the same.

If the PSSCH is transmitted on the aggregated slots by the manner of repeat transmission as described in the following, then the RV indicated by the PSCCH associated with the PSSCH transmitted within each aggregation slot may be different, and the indicated RV is only used for the PSSCH transmitted within the current slot. Optionally, except that the RV indicated in the SCI is different and the number of aggregated slots indicated in the SCI described above is different, other information indicated by the PSCCH associated with the PSSCH transmitted within each slot is completely the same.

In another example, the number of aggregated slots used for PSSCH transmission is semi-statically pre-configured through high-level parameters. The PSCCH associated with the PSSCH transmitted within each slot may indicate the position of the current slot in multiple aggregated slots. For example, the PSCCH associated with the PSSCH transmitted within the first slot in FIG. 2 indicates that the current slot is the first of the multiple aggregated slots, and the PSCCH associated with the PSSCH transmitted within the second slot indicates that the current slot is the second of the multiple aggregated slots, the PSCCH associated with the PSSCH transmitted within the third slot indicates that the current slot is the third of the multiple aggregated slots, and the PSCCH associated with the PSSCH transmitted within the fourth slot indicates that the current slot is the fourth of the multiple aggregated slots. The beneficial effect of this is that even if the RX UE loses the PSSCH transmission of the former parts of aggregated slots due to the influence of half duplex, the RX UE can still receive the PSSCH transmission of the latter parts of aggregated slots.

Optionally, except that the position of the current slot in the multiple aggregated slots indicated in the SCI described above is different, other information indicated in the PSCCH associated with the PSSCH transmitted within each slot is completely the same.

If the PSSCH is transmitted on the aggregated slots by the manner of repeat transmission as described in the below, then the RV indicated by the PSCCH associated with the PSSCH transmitted within each aggregation slot may be different, and the indicated RV is only used for the PSSCH transmitted within the current slot. Optionally, except that the RV indicated in the SCI is different and the position of the current slot in the multiple aggregated slots indicated in the SCI described above is different, other information indicated by the PSCCH associated with the PSSCH transmitted within each slot is completely the same.

Optionally, the TX UE sends the PSCCH associated with the PSSCH only on the associated PSCCH resource within the first slot of the multiple aggregated slots, and the associated PSCCH resources within other slots are idle.

Specifically, when the PSSCH resource includes multiple PSSCH sub-channels in the frequency domain, the TX UE sends the PSCCH associated with the PSSCH on only one PSCCH resource among multiple PSCCH resources associated with the multiple PSSCH sub-channels, and other PSCCH resources among the multiple PSCCH resources are used for the PSSCH transmission. Then, the above-mentioned PSSCH resource occupation mode is specifically that the TX UE performs the PSSCH transmission on the PSSCH resource within each aggregation slot as well as other PSCCH resources than that used for the PSCCH transmission among the multiple PSCCH resources within each aggregation slot, that is, the actual transmission of the PSSCH occupies the PSSCH resource within each aggregation slot as well as other PSCCH resources than that used for the PSCCH transmission among the multiple PSCCH resources within each aggregation slot.

The above slot-aggregated PSSCH resource occupation mode helps to support larger coverage, and is applicable to the PSSCH transmission sent based on the manner of repetition and the PSSCH transmission sent based on the manner of beam scanning as described in the following. This is because supporting larger coverage includes supporting larger PSSCH coverage and larger PSCCH coverage, and similar with the PSSCH transmission, PSCCH resources of other aggregated slots than the first of aggregated slots are also applied to the PSCCH transmission.

In another embodiment, as shown in FIG. 3, the TX UE performs the PSSCH transmission on the PSSCH resource within each aggregation slot as well as the associated PSCCH resources within other aggregated slots than the first of aggregated slots, that is, the actual transmission of the PSSCH occupies the PSSCH resource within each aggregation slot as well as the associated PSCCH resources within other aggregated slots than the first of aggregated slots. The TX UE sends the PSCCH associated with the PSSCH only on the associated PSCCH resource within the first of aggregated slots. That is to say, the transmission of the PSCCH is performed only on the PSSCH resource within the first of aggregated slots, and is performed on the PSSCH resources and the associated PSCCH resources within other aggregated slots.

Specifically, when the PSSCH resource includes multiple PSSCH sub-channels in the frequency domain, the TX UE sends the PSCCH associated with the PSSCH on only one PSCCH resource among the PSCCH resources associated with the multiple PSSCH sub-channels, and other PSCCH resources among the multiple PSCCH resources are also used for the PSSCH transmission. Then, the above-mentioned PSSCH resource occupation mode is specifically that the TX UE performs the PSCCH transmission on the PSCCH resources within each aggregation slot, other PSCCH resources than that used for the PSCCH transmission among the multiple PSCCH resources within the first of aggregated slots, and the each PSCCH resource within other aggregated slots, that is, the actual transmission of the PSSCH occupies the PSSCH resources within each aggregation slot, other PSCCH resources than that used for the PSCCH transmission among the multiple PSCCH resources within the first of aggregated slots, and the each PSCCH resource within other aggregated slots.

The above slot-aggregated PSSCH resource occupation mode helps to support a larger TBS, and is applicable to the PSSCH transmission sent based on the manner of overall rate matching as described in the following. This is because supporting a larger TBS only needs to allocate more resources for a PSSCH containing a larger amount of data without allocating more resources for a PSCCH carrying a SCI with a fixed load size. Then, PSCCH resources on other aggregated slots than the first of aggregated slots can be used for PSSCH transmission.

Optionally, the PSSCH Demodulation Reference Signal (DMRS) pattern in the first of aggregated slots is the same as those in other aggregated slots. Specifically, in the first of aggregated slots Slot #1 and other aggregated slots Slot #2-4, the PSSCH DMRS transmission is performed only on OFDM symbols of PSSCH resources.

Optionally, the PSSCH Demodulation Reference Signal (DMRS) pattern in the first of aggregated slots is different from those in other aggregated slots. Specifically, in the first of aggregated slots Slot #1, the PSSCH DMRS transmission is performed on the OFDM symbols of the PSSCH resources; while in other aggregated slots Slot #2-4, the PSSCH DMRS may also be performed on the OFDM symbols of the PSCCH resources in addition to the OFDM symbols of the PSSCH resources.

The PSSCH DMRS pattern in the first of aggregated slots being different from the PSSCH DMRS patterns in other aggregated slots may help to adaptively change the position and density of the PSSCH DMRS symbols according to the change of the number of OFDM symbols occupied by the PSSCH within the slot, so as to improve the accuracy of channel estimation, thereby improving the decoding performance of PSSCH.

Regarding the PSSCH Transmission Manner on Aggregated Slots

The following describes embodiments about three different PSSCH transmission manners on aggregated slots.

(1) Repeat Transmission Manner

In one embodiment, the PSSCH transmission is performed on aggregated slots using the repeat transmission manner. Specifically, the TX UE sends PSSCHs by the manner of repeat transmission within multiple aggregated slots.

The repeat transmission manner helps to improve the decoding performance of PSSCH transmission by the manner of energy accumulating, thereby supporting larger coverage, that is, the repeat transmission manner is applicable to the slot aggregation for supporting larger coverage when the transmit power is limited. This is because when the transmit power is limited, more times of repetition can improve more SNR than a lower channel coding rate.

Slot aggregation using a repeat transmission manner can also be called "Slot Bundling" or "Slot Repetition".

(1.1) Resource Occupation Mode of Actual PSSCH Transmission

Optionally, the repeat transmission manner may be applied to the PSSCH resource occupation mode shown in FIG. 2, that is, the TX UE performs the PSSCH transmission on PSSCH resources within multiple aggregated slots. This resource occupation mode is referred to herein as "the first resource occupation mode"

Optionally, the repeat transmission manner can be applied to the PSSCH resource occupation mode shown in FIG. 3, that is, the transmission of the PSSCH is performed only on the PSSCH resource in the first of aggregated slots, while within the other aggregated slots, the transmission of the PSSCH is performed on PSSCH resources and PSCCH resources. This resource occupation mode is referred to herein as "the second resource occupation mode"

(1.2) Determination of Transport Block Size (TBS)

For the first resource occupation mode, in each aggregation slot, the number of Resource Element (RE) occupied by the PSSCH transmission is the same, and the TX UE determines the TBS according to the total number of REs occupied within any slot of multiple aggregated slots.

For the second resource occupation mode, the number of REs occupied by the PSSCH transmission is different in the first of aggregated slots than in other aggregated slots. The number of REs for mapping PSSCH data symbols contained in other aggregated slots than the first of aggregated slots is greater than the number of REs for mapping PSSCH data symbols contained in the first of aggregated slots. Therefore, the TBS may be determined based on the total number of REs occupied in the first of aggregated slots, or may be determined based on the total number of REs occupied in any one of other aggregated slots. Correspondingly, rate matching may be performed based on the total number of REs occupied within the first of aggregated slots, or may be performed based on the total number of REs occupied within any one of other aggregated slots.

Optionally, the TX UE determines a TBS for PSSCH transmission based on the larger number of REs (that is, the number of REs for mapping PSSCH data symbols contained in any one of other aggregated slots than the first of aggregated slots), and performs rate matching based on the larger number of REs. When the PSSCH data symbols after the rate matching are mapped to the first of aggregated slots, the extra data symbols are dropped to fit the size of the PSSCH resources in the first of aggregated slots. For example, the data symbols of the last part of the PSSCH to be transmitted may be dropped, or the data symbols that should have been mapped onto the PSCCH resources in the first of aggregated slots within other aggregated slots may be dropped.

Optionally, the TX UE determines a TBS for PSSCH transmission based on the smaller number of REs (that is, the number of REs for mapping PSSCH data symbols contained in the first of aggregated slots), and performs rate matching based on the smaller number of REs. When the PSSCH data symbols after the rate matching are mapped to their aggregation slot, a part of the PSSCH data symbols is repeatedly mapped on extra REs on other aggregated slots to fit the size of PSSCH resources in other aggregated slots. For example, after the PSSCH data symbols are mapped, the mapping is restarted from the first PSSCH data symbol on the remaining REs.

(1.3) Determination of Redundance Version (RV)

Optionally, the same RV is used in multiple aggregated slots in which the PSSCH is repeatedly sent. Specifically, by default, the PSSCH uses the repeated transmission with an RV of 0 in multiple aggregated slots, or the TX UE indicates a particular RV used in all of the multiple aggregated slots in the SCI. Using the same RV can make the signals transmitted on the same RE in the multiple aggregated slots the same. Based on this characteristic, the RX UE can obtain the phase difference of the signals received on the same RE of the multiple aggregated slots, estimate the Doppler frequency offset based on the phase difference, and improve the accuracy of channel estimation based on the estimation result, thereby improving the decoding performance of PSSCH transmission.

For the foregoing manner of using the same RV in the multiple aggregated slots repeatedly sending the PSSCH, the same RV may be fixed or may be indicated by the TX UE through the SCI.

Using the same fixed RV helps to reduce the signaling overhead. The same RV indicated by the SCI helps the transmission flexibility. For example, the RV used when the PSSCH is retransmitted may be different from the RV used when the PSSCH is transmitted initially.

Optionally, different RVs are used in multiple aggregated slots repeatedly sending the PSSCH, that is, different RVs are used in turn on the multiple aggregated slots in a predefined sequence. This manner can be called "RV Cycling". The advantage of RV Cycling is that soft bit combinations of different redundant versions can be obtained, thereby increasing the channel coding gain and further improving the decoding performance of PSSCH.

For the manner of RV Cycling, the TX UE can obtain a predefined or pre-configured RV Cycling sequence. Optionally, there may be only one RV Cycling sequence, for example, 0 2 3 1. Optionally, there may be multiple RV Cycling sequences, for example, 0 2 3 1, 0 0 2 2, 0 0 0 0 or the like. Optionally, both the TX UE and the RX UE determine the RV Cycling sequence through pre-configured high-level parameters; optionally, the TX UE dynamically determines the RV Cycling sequence and indicates the used RV Cycling sequence in the SCI. In Mode 1, The TX UE determines the RV Cycling sequence by receiving the PDCCH for sidelink resource scheduling sent by the base station. In Mode 2, the TX UE autonomously determines the RV Cycling sequence.

For the manner of RV Cycling, further, enabling or disabling of the RV Cycling may be pre-configured. Specifically, when the value of the enable/disable identifier is disable, the same RV is used in multiple aggregated slots repeatedly sending the PSSCH. Optionally, the same RV is 0 by default, or optionally, the same RV is indicated by the TX UE through the SCI. When the value of the enable/disable identifier is enable, the predefined or pre-configured RV Cycling sequence is enabled.

Further, when the TX UE obtains a particular set of RV Cycling sequences (for example, 0 2 3 1), and under the condition that the value of the enable/disable identifier is enable, it is also necessary to determine the cycle start RV information, that is, determine the RV of the first of aggregated slots. For determination of the cycle start RV information, optionally, by default, the start point of the first of aggregated slots the RV Cycling cycles from is the first bit. For example, for the RV Cycling sequence 0 2 3 1, the RV on the first of aggregated slots uses the first bit of the RV Cycling sequence by default, that is, 0. The RVs on other aggregated slots continue to cycle from the second bit (i.e., 2) of the RV Cycling. Under the default manner, the indication field for the RV in the SCI may be reserved or used to indicate other information, for example, used to indicate the number of aggregated slots. Optionally, the start point of the first of aggregated slots the RV Cycling cycles from may be indicated by the SCI. For example, the RV on the first of aggregated slots may be indicated to use the third bit of the RV Cycling sequence, that is, 3. The RVs on other aggregated slots will start to cycle from the next bit (i.e., the fourth bit, 1) of the specified position according to the RV Cycling sequence.

Using a fixed start RV of the RV Cycling helps to reduce the signaling overhead. The start RV of the RV Cycling indicated by the SCI helps the transmission flexibility. For example, the start RV of the RV Cycling used when the PSSCH is retransmitted may be different from the start RV of the RV Cycling used when the PSSCH is transmitted initially.

(2) Manner of Overall Rate Matching

In another embodiment, the manner of overall rate matching is used on the aggregation slot to perform the PSSCH transmission. Specifically, the TX UE con-tinuously maps data symbols of different parts of one same PSSCH in multiple aggregated slots.

The manner of overall-rate-matched transmission helps reduce the channel coding rate to support a larger TBS. That is to say, the manner of overall-rate-matched transmission is applicable to the slot aggregation for supporting a larger TBS when the transmit power is not limited.

(2.1) Resource Occupation Mode of Actual PSSCH Transmission

Optionally, the manner of overall-rate-matched transmission may be applied to the first resource occupation mode.

Optionally, the manner of overall-rate-matched transmission may be applied to the second resource occupation mode.

(2.2) Determination of Transport Block Size (TBS)

For the two resource occupation modes described above, the TX UE determines the TBS according to the total number of REs for mapping PSSCH data symbols contained in all aggregated slots, and performs the rate matching according to the total number of REs.

(3) Manner of Beam Sweeping

In another embodiment, the manner of beam scanning is used on the aggregation slot to perform the PSSCH transmission. Specifically, the TX UE uses different beams to send the PSSCH in multiple aggregated slots, and uses different beams to send the associated PSCCH in multiple aggregated slots, and the PSSCH and its associated PSCCH in the same slot use the same beam. The beam is an analog beam.

The manner of beam-scanned transmission realizes omni-directional coverage by di-rectional transmission in turn, so that the PSSCH sent by the TX UE can be received and decoded by the RX UE in more directions, especially in scenarios with high frequency points and large attenuation. The manner of beam-scanned transmission is applicable to broadcast and multicast PSSCHs, and is not applicable to unicast PSSCHs.

Here, the slot aggregation of the PSSCH transmission is discussed for the TX UE, but for the RX UE, the PSSCH received by the RX UE is still transmitted in a single slot, that is, the RX UE receives only the PSSCH on the slot in the direction of the beam where it is.

In addition, the aggregated slots used for beam-scanned transmission need not to be logically continuous, that is, multiple aggregated slots may be logically discontinuous.

(3.1) Resource Occupation Mode of Actual PSSCH Transmission

The manner of beam scanning is applied to the first resource occupation mode.

(3.2) Determination of Transport Block Size (TBS)

The TBS is determined by the number of REs for mapping PSSCH data symbols contained within any one of aggregation slots of the multiple slots.

Regarding pre-configured high-level parameters (1) Enable/Disable Identifier for Slot Aggregation For the identifier used to indicate whether to enable the aggregation slot, the enable/disable identifier may be pre-configured.

Optionally, when the aggregation slot is pre-configured to be enabled and pre-configured to be disabled, the TX UE uses different SCI formats in the sent PSCCH. For example, comparing the SCI format used by the PSCCH when the aggregation slot is pre-configured to be enabled with the SCI format used by the PSCCH when the aggregation slot is pre-configured to be disabled, the SCI format of the former further contains a filed for indicating the number or specific positions of aggregated slots.

Optionally, in Mode 1 based on centralized resource allocation, when the aggregation slot is pre-configured to be enabled and pre-configured to be disabled, the PDCCH for sidelink resource scheduling should use different DCI formats. For example, comparing the DCI format used by the PDCCH when the aggregation slot is pre-configured to be enabled with the DCI format used by the PDCCH when the aggregation slot is pre-configured to be disabled, the DCI format of the former further contains a filed for indicating the number or positions of aggregated slots.

The technical scheme about the SCI format and the DCI format being different in the scenarios where the value of the enable/disable identifier for slot aggregation is enable and disable respectively as described above increases the flexibility of system configuration and reduce the control signaling overhead.

(2) Maximum Number of Slots that can be Aggregated

For the maximum number of slots that can be aggregated, optionally, the maximum number of slots that can be aggregated may be predefined. Optionally, the maximum number of slots that can be aggregated may be semi-statically pre-configured. When the maximum number of aggregated slots is pre-configured to 1, it means that the slot-aggregated resource allocation method is disabled. That is, the enable or disable of the aggregation slot can be indirectly indicated by the maximum number of aggregated slots.

In addition, the system also stipulates the number of slots that can be aggregated. For example, the system predefines a table for the number of slots that can be aggregated. This table indicates the number of slots that can be aggregated under a particular maximum number of slots that can be aggregated, that is, according to this predefined table and the pre-configured maximum number of aggregated slots, the TX UE can determine the number of slots that can be aggregated. Table 1 shows an example.

TABLE 1

| Maximum number of slots that can be aggregated | Number of slots that can be aggregated |
| --- | --- |
| 2 | 1 2 |
| 4 | 1 2 4 |
| 8 | 1 2 4 8 |
| 16 | 2 4 8 16 |

If the number of slots that can be aggregated has two or more values, then the TX UE may indicate the number of aggregated slots through the SCI. That is, the number of slots aggregated by the PSSCH transmission is indicated by the SCI. That is to say, in addition to the frequency domain resource allocation (i.e., the positions and number of sub-channels) used for PSSCH transmission, the time domain resource allocation (i.e., the starting slot position, and the number of logically-continuous slots that are occupied) used for PSSCH transmission is also indicated in the SCI.

Optionally, the maximum number of aggregated slots indirectly decides the size of a field for indicating the number of aggregated slots in the SCI. This is because the maximum number of aggregated slots decides the set of numbers of slots that can be aggregated, and the size of the field for indicating the number of aggregated slots in the SCI can be decided by the size of the set of the numbers of slots that can be aggregated. For example, when the set of the numbers of slots that can be aggregated has 4 values, 2 bits can be used in the SCI to indicate the number of aggregated slots; when the set of the numbers of slots that can be aggregated has 2 values, 1 bit can be used in the SCI to indicate the number of aggregated slots.

Optionally, in Mode 1 based on centralized resource allocation, the maximum number of aggregated slots indirectly decides the size of a field for indicating the number of aggregated slots in the DCI for sidelink resource scheduling. This is because the maximum number of aggregated slots decides the set of the numbers of slots that can be aggregated, and the size of the field for indicating the number of aggregated slots in the DCI for sidelink resource scheduling can be decided by the size of the set of the numbers of slots that can be aggregated. For example, when the set of the numbers of slots that can be aggregated has 4 values, 2 bits can be used to indicate the number of aggregated slots in the DCI for sidelink resource scheduling; when the set of the numbers of slots that can be aggregated has 2 values, 1 bit can be used to indicate the number of aggregated slots in the DCI for sidelink resource scheduling.

In short, based on the maximum number of slots that can be aggregated, the TX UE determines a set of the numbers of slots that can be aggregated, and determines the size of the field for indicating the number of aggregated slots in the SCI and/or in the DCI for scheduling sidelink resources based on the size of the set of slots that can be aggregated. The technical scheme increases the flexibility of system configuration and reduces the control signaling overhead.

(3) The Number of Aggregated Slots

For the number of aggregated slots, optionally, the number of aggregated slots may be predefined. Optionally, the number of aggregated slots may be semi-statically pre-configured. When the number of aggregated slots is pre-configured to 1, it means that the slot-aggregated resource allocation method is not disabled. That is, the enable or disable of the aggregation slot can be indirectly indicated by the number of aggregated slots. If the TX UE is within the coverage of a cellular network, the serving base station pre-configures the above parameters through UE Specific RRC signaling; if the UE is out of the coverage of the cellular network, then the above parameters are pre-configured by the manner of hard coding.

In one embodiment, the system pre-configures the above three slot aggregation parameters for a particular resource pool. For example, the values of the enable/disable identifiers for slot aggregation of some resource pools are enable, and the values of the enable/disable identifiers for slot aggregation of some resource pools are disable. The maximum numbers of slots that can be aggregated of different resource pools may be different, or the numbers of aggregated slots of different resource pools may be different.

In another embodiment, the system pre-configures the above three slot aggregation parameters for a particular UE. For example, the values of the enable/disable identifiers for slot aggregation of some UEs are enable, and the values of the enable/disable identifiers for slot aggregation of some UEs are disable. The maximum numbers of slots that can be aggregated of different UEs can be different, or the numbers of aggregated slots of different UEs may be different.

In another embodiment, the system predefines or pre-configures the above three slot aggregation parameters for a particular Quality of Service (QoS) and/or Transport Block Size (TBS). For example, for a PSSCH with a higher QoS, the value of the enable/disable identifier for slot aggregation is enable, and for a PSSCH with a lower QoS, the value of the enable/disable identifier for slot aggregation is disable. For PSSCHs with different QoSs, the maximum numbers of slots that can be aggregated and the numbers of aggregated slots of the aggregation slot may be different. QoS can be indicated by the PSSCH priority information in the SCI. For another example, for a PSSCH with a larger TBS, the value of the enable/disable identifier for slot aggregation is enable, and for a PSSCH with a smaller TBS, the value of the enable/disable identifier for slot aggregation is disable. For aggregated slots of PSSCHs with different TBSs, the maximum numbers of slots that can be aggregated and the numbers of aggregated slots may be different. That is to say, in this example, the use condition of the slot aggregation is having a higher QoS and/or having a larger TBS.

In short, the pre-configured high-level parameters are pre-configured for at least one of a particular resource pool, a particular UE, a particular Quality Of Service and a particular Transport Block Size. Such a technical scheme may be advantageous. Specifically, it improves the adaptability of the system's pre-configured parameters to particular needs.

Criterion on the Starting Slot Position of Aggregated Slots

The system indexes the slots that are configured for sidelink transmission. The index of the starting slot for performing the sidelink transmission in N aggregated slots must meet the following condition:

$$\text{Index } \% \ N = 0 \qquad \text{(Formula 1)}$$

As shown in Formula 1, only the slot whose index is divisible by N can be used as the starting slot of N aggregated slots.

For example, assuming that the number of aggregated slots is N=4, for slots configured for sidelink transmission with the indexes of 0, 4, 8, they can be used as the starting slots; while, for slots whose indexes are not divisible by 4, for example, slots with indexes of 1, 2, 3, 5, 6, 7, they cannot be used as the starting slots. It should be noted that the index is an index of a logical slot instead of an index of a physical slot.

In Mode 2 based on distributed resource allocation, the UE should follow the above rules when autonomously selecting sidelink resources. This rule can align the slot aggregation resources autonomously selected by different UEs on the same resource pool, thereby reducing the probability of resource fragmentation.

Details on the Slot Aggregation Transmission in Mode 2

(1) Selection of Single Slot Transmission or Slot Aggregation Transmission Based on the UE Implementation In one embodiment, in Mode 2 based on distributed resource allocation, the TX UE may autonomously select whether to use the slot aggregation based on the UE implementation, that is, the TX UE can autonomously select a sidelink resource within one slot or sidelink resources within the aggregated slots for transmission of the PSSCH based on the UE implementation. For example, when there are two selectable resource allocation schemes, that is, multiple sub-channels in one slot and one sub-channel on multiple aggregated slots, the TX UE will select one of them for one transmission of the PSSCH based on the UE implementation.

(2) Selection of Single Slot Transmission or Slot Aggregation Transmission Based on the Predefined Priority In another embodiment, in Mode 2 based on distributed resource allocation, the TX UE may select whether to use the single slot sidelink resource or the slot aggregation sidelink resource to transmit the PSSCH based on the priorities of the single slot transmission and the slot aggregation transmission.

Optionally, selecting a sidelink resource within one slot may have a higher priority than selecting sidelink resources in aggregated slots. In a selectable resource set, when there are two selectable resource allocation schemes, that is, multiple sub-channels of one slot and one sub-channel on multiple aggregated slots, the TX UE preferentially selects the former resource allocation scheme. In other words, only when there are not enough sub-channels within one slot for carrying the transmission of the PSSCH of the target TBS, the TX UE uses sidelink resources within aggregated slots in order to use more sidelink resources to carry the transmission of the PSSCH of the target TBS.

Optionally, selecting sidelink resources within aggregated slots may have a higher priority than selecting a sidelink resource within one slot. In the selectable resource set, when there are two selectable resource allocation schemes, that is, multiple sub-channels of one slot and aggregation of one sub-channel on multiple aggregated slots, the TX UE preferentially selects the latter resource allocation scheme. In other words, only when there are not enough logically-continuous slots of the same sub-channel to be aggregated for carrying the transmission of the PSSCH of the target TBS, the UE selects a sidelink resource within a single slot.

(3) Selection of Single-TB Slot Aggregation Transmission or Multi-TB Single Slot Transmission Based on the Predefined Priority In another embodiment, in Mode 2 based on distributed resource allocation, the TX UE may select the slot-aggregated sidelink resources for transmission of one large TBS or select multiple single-slot sidelink resources for multiple transmissions of small TBSs based on priorities of the single-TB transmission and the multi-TB transmission.

Optionally, selecting the slot-aggregated sidelink resources for the transmission of one large TBS has a higher priority than selecting multiple single-slot sidelink resources for multiple transmissions of small TBSs. That is, when the UE autonomously selects a sidelink resource, if the amount of data to be transmitted by the UE is large, the UE transmits the data to be transmitted at one time preferentially by the manner of aggregated slots, that is, the single-TB transmission. In a candidate resource set, if there are no multiple continuous slots in the time domain to carry the amount of data to be transmitted by the manner of aggregation, then the UE can divide the data to be transmitted into two or more small TBs for transmission, that is, the multi-TB transmission. The UE may select sidelink resources within different slots respectively for these small TBSs, these slots can be discrete, and each small TBS uses a sidelink resource in a single slot to transmit.

In short, the UE preferentially selects a large block of sidelink resources within a single slot for transmission of the PSSCH, and if there are not enough large block of sidelink resources within a single slot to select, the UE selects the slot-aggregated sidelink resources for the transmission of the PSSCH; and/or, the UE preferentially selects logically-continuous and slot-aggregated sidelink resources for one transmission of data to be transmitted, and if there are no logically-continuous and slot-aggregated sidelink resources to select, the UE segments the data to be transmitted into multiple transmission blocks, and determines a single-slot sidelink resource respectively for the multiple transmission blocks.

Such a technical scheme may be advantageous. Specifically, preferentially selecting a large block of sidelink resources of a single slot can avoid the deterioration of the half-duplex effect caused by the slot aggregation transmission, and preferentially selecting the slot-aggregated sidelink resources to support transmission of a large TBS can improve the transmission delay of the service to improve the Quality Of Service.

(4) Determination of Whether to Use Slot Aggregation Transmission Based on at Least One of QoS, TBS, Target Communication Range, Sidelink Channel Quality and Sidelink Power Headroom of the PSSCH In another embodiment, in Mode 2 based on distributed resource allocation, the TX UE determines whether to use the slot aggregation according to at least one of QoS, TBS, target communication range, sidelink channel quality and sidelink power headroom of the PSSCH to be transmitted.

Optionally, when the amount of data of the PSSCH to be transmitted is large, that is, the target TBS value is greater than a predefined or pre-configured threshold, the TX UE autonomously selects the slot-aggregated sidelink resource for PSSCH transmission. That is to say, the slot aggregation is only used for the transmission of the PSSCH with a larger TBS.

Optionally, when the QoS of the PDSSCH to be transmitted is high, for example, when the value of the priority of the PSSCH is less than a predefined or pre-configured threshold, the TX UE autonomously selects the slot-aggregated sidelink resource for PSSCH transmission. That is to say, the slot aggregation is only used for the transmission of the PSSCH with higher QoS, and the parameter characterizing QoS may be the priority of the PSSCH indicated in the SCI.

Optionally, when the amount of data of the PSSCH to be transmitted is large and the QoS of the data to be transmitted is high, that is, the target TBS is greater than a predefined or pre-configured threshold and the value of the service priority is less than a predefined or pre-configured threshold, the TX UE autonomously selects the slot-aggregated sidelink resource for PSSCH transmission. That is to say, the slot aggregation is only used for the transmission of the PSSCH with a larger TBS and higher QoS.

Optionally, when the target communication range of the data to be transmitted is large, that is, the target communication range is greater than a predefined or pre-configured threshold, the TX UE autonomously selects the slot-aggregated sidelink resource for PSSCH transmission. That is to say, the slot aggregation is only used for a case of a larger target communication range.

Optionally, when the sidelink channel quality of the target RX UE is poor, for example, when the value of the CQI of the target channel is less than a predefined or pre-configured threshold, the TX UE autonomously selects the slot-aggregated sidelink resource for PSSCH transmission. That is to say, the slot aggregation is only used for a case of the poor sidelink channel quality, and the parameter characterizing the sidelink channel quality may be the CQI.

Optionally, when the sidelink power headroom of the TX UE is small, for example, when the value of the sidelink power headroom of the TX UE is less than a predefined or pre-configured threshold, the TX UE autonomously selects the slot-aggregated sidelink resource for PSSCH transmission. That is to say, the slot aggregation is only used for a case of the small sidelink power headroom.

(5) Determination of the Number of Aggregated Slots Based on at Least One of QoS, TBS, target communication range, sidelink channel quality and sidelink power headroom of the PSSCH In one embodiment, in Mode 2 based on distributed resource allocation, when the TX UE autonomously selects aggregated slots to perform PSSCH transmission based on the above-mentioned resource usage conditions, the TX UE may determine the number of aggregated slots according to at least one of QoS, TBS, target communication range, sidelink channel quality and the sidelink power headroom of the PSSCH to be transmitted.

Optionally, TBSs in different ranges may correspond to different numbers of aggregated slots or the maximum number of aggregated slots. When the target TBS is in a predefined or pre-configured range, the TX UE may autonomously select the sidelink resource of the corresponding number of aggregated slots for PSSCH transmission.

Optionally, QoS in different ranges may correspond to different numbers of aggregated slots or the maximum number of aggregated slots. When the target service priority is in a predefined or pre-configured range, the TX UE can autonomously select the sidelink resource of the corresponding number of aggregated slots for PSSCH transmission.

Optionally, target communication ranges, sidelink channel quality and/or sidelink power headroom in different ranges may correspond to different numbers of aggregated slots or the maximum number of aggregated slots. When the target communication range, sidelink channel quality and/or sidelink power headroom are in a predefined or pre-configured range, the TX UE can autonomously select the sidelink resource of the corresponding number of aggregated slots for PSSCH transmission.

In short, the TX UE determines whether to use multiple resource for slot aggregations to perform the PSSCH transmission, the maximum number of slots that can be aggregated, and/or the number of aggregated slots based on at least one of QoS, TBS, target communication range, sidelink channel quality and sidelink power headroom of the PSSCH to be transmitted.

The above technical scheme may be advantageous. Specifically, it determines appropriate transmission resources according to the quality of service and the transport block size of the PSSCH to be sent, thereby increasing the flexibility and adaptability of system resource allocation and improving the use efficiency of resources.

(6) Using by the Single Slot Transmission and the Slot Aggregation Transmission of Different Reference Signal Receiving Power (RSRP) Thresholds for Resource Exclusion In one embodiment, in Mode 2 based on distributed resource allocation, when the UE autonomously selects a sidelink resource, the TX UE excludes the reserved resources indicated in the SCI that it previously received and decoded from the target resource pool. When the TX UE autonomously selects a single slot to perform the PSSCH transmission based on the above resource usage conditions, the reserved resources excluded are sidelink resources in the single slot; when the TX UE autonomously selects aggregated slots to perform the PSSCH transmission based on the above resource usage conditions, the reserved resources excluded are sidelink resources in the aggregated slots.

Optionally, different RSRP thresholds may be used to exclude the two kinds of reserved resources as described above. For example, the RSRP threshold for excluding the reserved resources of aggregated slots and the RSRP threshold for excluding the reserved resources of a single slot can be pre-configured separately. For another example, there is a predefined or pre-configured difference between the two RSRP thresholds, for example, the RSRP threshold for excluding the reserved resources of aggregated slots is predefined or pre-configured to be 3 dB higher than the RSRP threshold for excluding the reserved resources of a single slot.

The separate configuration of the RSRP threshold for excluding the reserved resources of aggregated slots and the RSRP threshold for excluding the reserved resources of a single slot can increase the flexibility of the transmission system. Due to the limited slot resources, the possibility of being able to find multiple slots for aggregation transmission is lower than the possibility of finding a single slot for transmission. Therefore, for the above-mentioned RSRP thresholds for excluding resources, the requirement of the former is lower than that of the latter because of the actual consideration of the characteristics of resource occupation, which is a reasonable balance between excluding slot resources with high interference levels and ensuring sufficient slot resources for transmission requirements in.

Processing of Sidelink Transmission of Slot Aggregation Overlapping with UL

In an actual transmission scenario, when the UE is within the coverage of a cellular network, the UE may need to send both uplink and sidelink, that is, the uplink transmission and the sidelink transmission of the same UE may overlap. If the uplink transmission and the sidelink transmission share the same Radio Frequency (RF), the UE needs to choose between the uplink transmission and the sidelink transmission; if the uplink transmission and the sidelink transmission use different RFs but share the total transmit power, the UE needs to adjust between the transmit power of the uplink and the transmit power of the sidelink.

In LTE V2X, when the uplink transmission and the sidelink transmission of the same UE overlap, if the priority of the PSSCH of the sidelink transmission is higher than a priority threshold (that is, the value of the priority indicated in the SCI is less than a predefined or pre-configured threshold), if the uplink and the sidelink share the same carrier, the TX UE drops the uplink transmission; if the uplink and the sidelink use different carriers, the TX UE reduces the power of the uplink transmission of the overlapping area so that the total transmit power of the uplink transmission and the sidelink transmission does not exceed the maximum transmit power. If the priority of the PSSCH of the sidelink transmission is lower than the predefined priority (that is, the value of the priority indicated in the SCI is greater than the predefined or pre-configured threshold), if the uplink and the sidelink share the same carrier, the TX UE drops the sidelink transmission; if the uplink and sidelink use different carriers, the TX UE reduces the power of the sidelink transmission of the overlapping area so that the total transmit power of the uplink transmission and the sidelink transmission does not exceed the maximum transmit power.

Optionally, the predefined or pre-configured threshold may be different for a PSSCH of a single slot and a PSSCH of an aggregation slot. For example, the predefined or pre-configured threshold for processing the overlap of the PSSCH transmission with the uplink transmission in a single slot and the predefined threshold for processing the overlap of the PSSCH transmission with the uplink transmission in an aggregation slot can be configured separately.

Optionally, if the above-mentioned sidelink transmission overlapping with the uplink transmission is the PSSCH transmission performed on aggregated slots, when the TX UE drops the sidelink transmission, the TX UE drops the sidelink transmission on other aggregated slots in addition to the sidelink transmission on the overlapping slot, that is, drops the sidelink transmission on all aggregated slots.

Optionally, if the above-mentioned sidelink transmission overlapping with the uplink transmission is the PSSCH transmission performed on aggregated slots, when the TX UE reduces the power of the sidelink transmission of the overlapping area, the TX UE, in addition to reducing the power of the sidelink transmission on the overlapping slot, applies the reduced transmit power to the sidelink transmission on other slots, that is, keeps the transmit power on all aggregated slots the same.

Optionally, if the above-mentioned sidelink transmission overlapping with the uplink transmission is the PSSCH transmission performed on aggregated slots, when the TX UE drops the sidelink transmission, the TX UE drops only the sidelink transmission on the overlapping slot, and does not drop the sidelink transmission on other aggregated slots.

Optionally, if the above-mentioned sidelink transmission overlapping with the uplink transmission is the PSSCH transmission performed on aggregated slots, when the TX UE reduces the power of the sidelink transmission of the overlapping area, the TX UE only reduces the power of the sidelink transmission on the overlapping slot, and does not reduce the power of the sidelink transmission on other slots.

Optionally, if the above-mentioned sidelink transmission overlapping with the uplink transmission is the PSSCH transmission performed on aggregated slots, when the TX UE drops the sidelink transmission, whether to drop the sidelink transmission on the overlapping slot or to drop the sidelink transmission on all aggregated slots by the TX UE depends on the position of the overlapping slot. For example, if the overlapping slot is the first of aggregated slots, then the TX UE drops the sidelink transmission on all sidelink aggregated slots, otherwise, the TX UE drops only the sidelink transmission on the overlapping slot.

The manner of dropping or adjusting the power of the sidelink transmission on all aggregated slots is beneficial to avoid unnecessary waste of power and reflects the reasonable use of the transmit power; while the manner of only dropping or adjusting the power of the overlapping sidelink transmission on the aggregated slots takes into consideration the decoding success rate and reduces the retransmission in some cases.

For example, in the above-mentioned second PSSCH resource occupation mode, in a scenario where the sidelink slot overlapping with the uplink transmission is an aggregation slot other than the first of aggregated slots, the above processing manner of partial dropping is more applicable. Because the control signaling concentrated on the PSCCH resources in the first of aggregated slots is not affected, there is still a high possibility that the RX UE can decode successfully. For example, in the above-mentioned second PSSCH resource occupation mode, in a scenario where the sidelink slot overlapping with the uplink transmission is the first of aggregated slots, the above processing manner of full dropping is more applicable. Because the control signaling concentrated on the PSCCH resources in the first of aggregated slots is affected, even if the transmission in other aggregated slots is maintained, the probability that the RX UE can decode successfully is extremely low, it is better to drop the transmission of all aggregated slots to avoid unnecessary waste of power.

Timing Relationship Between the Slot-Aggregated PSSCH and the Associated Physical Sidelink Feedback Channel (PSFCH)

In a NR V2X system, the unicast PSSCH or multicast PSSCH transmission supports the HARQ feedback function, that is, the RX UE receiving the unicast or multicast PSSCH feeds back the decoding result (ACK or NACK) of the PSSCH to the TX UE, the HARQ feedback is carried through the PSFCH. There is a predefined mapping relationship between the PSFCH resource and the associated PSSCH resource, that is, the RX UE may determine the PSFCH resource associated with the PSSCH resource according to the received PSSCH resource. Therefore, the TX UE does not need to explicitly inform the RX UE of the PSFCH resource associated with the PSSCH resource through the signaling. The PSFCH resource refers to one PSFCH resource in the time domain, the frequency domain and the code domain.

In one embodiment, when the unicast PSSCH or multicast PSSCH transmission uses the manner of slot aggregation, the RX UE determines the associated PSFCH resource according to the PSSCH resource on the last of aggregation slots so as to send the HARQ feedback.

The above technical scheme that the PSFCH resource corresponds to the PSSCH resource of the last of aggregation slots among the multiple aggregated slots may be advantageous. Specifically, the RX UE may perform merge decoding only after receiving the PSSCH on all aggregated slots so as to reduce the number of PSSCH decoding times of the RX UE and simplify the RX UE's behavior of feeding back the HARQ.

In another embodiment, when the unicast PSSCH or multicast PSSCH transmission uses the manner of slot aggregation, and the PSSCH is transmitted through the above-mentioned repeat transmission manner, the RX UE may attempt to decode the received PSSCH before not fully receiving the PSSCH transmission in all aggregated slots. When the decoding is successful, the ACK can be fed back to the TX UE in advance. The PSFCH resource used by the ACK fed back in advance is determined by the PSSCH resource on one slot previous to the last of aggregation slots.

The above technical scheme that the PSFCH resource corresponds to the PSSCH resource of one of aggregation slots other than the last of aggregation slots among the multiple aggregated slots may be advantageous. Specifically, the RX UE may attempt to decode the PSSCH in advance, and when the in-advance decoding is successful, the ACK is fed back to the TX UE in advance, thereby improving the HARQ feedback delay of the PSSCH transmission. Even the TX UE may drop the subsequent PSSCH transmission after receiving the ACK fed back by the RX UE in advance, thereby saving power.

Optionally, after receiving the PSSCH on each aggregation slot, the RX UE may attempt to combine and decode the PSSCH on the received slot in advance. Optionally, the RX UE may attempt to combine and decode the PSSCH on the received slot in advance after receiving the PSSCH on a particular number of aggregated slots. For the in-advance decoding, if the RX UE successfully decodes the PSSCH in advance on one of aggregation slots previous to the last of aggregation slots, the RX UE may send the ACK feedback for the in-advance decoding to the TX UE on the PSFCH resource associated with the PSSCH resource of the aggregation slot, and the RX UE does not need to receive the PSSCH transmission in the subsequent aggregation slot; if the in-advance decoding is unsuccessful, the RX UE may continue to receive the PSSCH transmission on the subsequent aggregation slot until the PSSCH transmission on all aggregated slots is completely received, and the final PSSCH decoding result is fed back on the PSFCH resource associated with the PSSCH resource of the last of aggregation slots. The manner of decoding in advance can improve the HARQ feedback delay of the PSSCH transmission.

In the V2X system, the UE works in a half-duplex mode, that is, the TX UE cannot receive any sidelink signal/channel when sending the PSSCH. If the aggregated slots for PSSCH transmission are logically continuous, then the TX UE cannot receive sidelink signals/channels sent by other UEs before sending the PSSCH on all the aggregated slots completely. Therefore, the above beneficial effect of improving the HARQ feedback delay of the PSSCH transmission may be caused to be limited. Specifically, for example, the PSFCH slot for the TX UE to receive the ACK fed back in advance should be located after the aggregation slot for the TX UE to transmit the associated PSSCH, that is, the RX UE should send the PSFCH for feeding back the ACK in advance at least only after the TX UE sends the PSSCH on all the aggregated slots completely. In other words, not all the PSFCH resources associated with the PSSCH resources of every aggregated slots other than the last of aggregation slots can be used for feeding back the ACK in advance. Only the PSFCH resources located after all the aggregated slots of the PSSCH can be used for feeding back the ACK in advance.

The TX UE sends the PSSCH on multiple logically-continuous aggregated slots. Even if the in-advance decoding is successful, the TX UE cannot receive the HARQ feedback before completing the PSSCH transmission. As shown in FIG. 4 below, the PSFCH resource associated with the PSSCH resource of the next-to-last of aggregation slots is the earliest PSFCH slot that can receive the ACK feedback for the successful in-advance decoding.

In order to solve the above limitation, optionally, multiple aggregated slots for transmitting the PSSCH may be logically discrete, that is, there is an interval between the multiple aggregated slots, the RX UE may send the PSFCH for feeding back the ACK in advance on the interval slots, and the TX UE receives on the interval slots the PSFCH, for feeding back the ACK in advance, that the RX UE may send. In other words, the RX UE can send the ACK in advance before the TX UE has sent the PSSCH on all aggregated slots. If the TX UE receives the in-advance-decoded ACK sent by the RX UE, then the TX UE may drop repeated PSSCH transmissions on the subsequent aggregated slots to save power.

The TX UE sends the PSSCH on multiple logically-discontinuous aggregated slots. If the in-advance decoding is successful, the TX UE can receive the HARQ feedback before completing the PSSCH transmission. As shown in FIG. 5 below, before completing the PSSCH transmission on all aggregated slots, the TX UE can receive the ACK feedback for successful in-advance decoding in the interval slots reserved between the aggregated slots.

Limitation on the Total Number of Slots of all PSSCH Resources Indicated by the SCI In order to flexibly allocate sidelink resources, the sidelink resource allocation method can support both sidelink resource allocation within a single slot and sidelink resource allocation within aggregated slots at the same time, and can even support sidelink resources allocation within different numbers of aggregated slots. Furthermore, in addition to indicating PSSCH resources transmitted currently, the SCI may also indicate one or more reserved PSSCH resources for subsequent transmission. The purpose of indicating the reserved PSSCH resources through the SCI in advance is to avoid resource collision. When autonomously selecting sidelink resources, other UEs should exclude the reserved resources indicated by the received SCI from the candidate resource set. The SCI can indicate a total of N PSSCH resources at most, including the PSSCH resource transmitted currently, these PSSCH resources can be used for the initial transmission or retransmission of one Transport Block (TB) or multiple TBs, and N is a value predefined or pre-configured by the system, for example, N=4.

If the HARQ feedback function is not enabled, the N PSSCH resources may include PSSCH resources for TB blind retransmission. For example, the SCI may indicate PSSCH resources for the initial transmission and at most 3 times of blind retransmission of the same TB, or the SCI may also indicate PSSCH resources for the initial transmission and at most one time of blind retransmission of 2 TBs.

If the HARQ feedback function is enabled, whether the N PSSCH resources are used for the initial transmission or retransmission of one TB or multiple TBs depends on the HARQ feedback. For example, if what is fed back by the RX UE to the TX UE is the ACK, when the TX UE has data to be transmitted, then the next PSSCH resource reserved through the SCI can be used for the initial transmission of a new TB, and when the TX UE has no data to be transmitted, then the next PSSCH resource reserved through the SCI can transmit nothing and is left empty or is released for other UEs to use; if what is fed back by the RX UE to the TX UE is the NACK, then the next PSSCH resource reserved through the SCI can be used for the retransmission of the same TB.

Optionally, the SCI can indicate the PSSCH resource within one slot, can also indicate PSSCH resources within aggregated slots, and can even indicate PSSCH resources within different numbers of aggregated slots. In addition, the SCI can indicate N PSSCH resources (including the PSSCH resource transmitted currently) at most. In order to avoid that the overall PSSCH resources indicated by the SCI occupy too many slots, the system stipulates that the total number of slots included in all PSSCH resources indicated by the SCI cannot exceed a predefined or pre-configured threshold.

In other words, the maximum number of total slots occupied by all PSSCH resources indicated by the SCI is predefined or pre-configured, instead of being by default the product of the maximum number of PSSCH resources indicatable by the SCI and the maximum number of slots that can be aggregated. For example, the maximum number of slots, that can be aggregated, supported by the PSSCH is 4, the maximum number of PSSCH resources indicatable by the SCI is 4, and the maximum number of total slots occupied by all PSSCH resources indicated by the SCI is 8, that is, the total number of slots included in all PSSCH resources indicated by the SCI cannot exceed 8. When aggregated slots are used for resource allocation, the limitation of the total number of slots causes the maximum number of PSSCH resources indicatable by the SCI to be reduced accordingly. In Mode 2 based on distributed resource allocation, the UE should follow the above rules when autonomously selecting sidelink resources.

The use of the above rules may be advantageous. Specifically, it avoids the excessive occupation of slot resources by the same UE, provides relative fairness for UEs that are not configured with slot aggregation transmission, and facilitates more efficient resource allocation.

Assistance Information Reporting for Slot Aggregation Transmission in Mode 1

When the sidelink channel quality is poor and the TX UE's transmit power is limited, the slot aggregation transmission based on the manner of repeat transmission can be used to improve the coverage.

In Mode 1 based on centralized resource allocation, the serving base station may allocate multiple aggregated slots for the PSSCH to improve the coverage of the sidelink transmission. In order to help the base station decide whether to use slot aggregation (also known as slot repetition or slot bundling) and/or decide the appropriate number of slots for aggregation/repetition/bundling, the TX UE may report some assistance information to the base station. The TX UE may report the channel quality information (Channel Quality Indicator, CQI) of the sidelink channel to the base station, for example, the TX UE may report the SL CQI to the base station through the PUCCH, the SL CQI is measured and fed back to the TX UE by the RX UE, and if the SL CQI is poor, the base station may enable resource allocation of the slot aggregation transmission or allocate more number of slots for aggregation; and/or, the TX UE may send a sidelink Power Headroom Report (PHR) to the base station, for example, the TX UE may report the SL PHR to the base station through MAC CE, and if the SL PHR is low, the base station may enable resource allocation of the slot aggregation transmission, or allocate more number of slots for aggregation, and the SL PHR is different from the traditional UL PHR and is the transmit power headroom calculated by the TX UE based on the resource allocation granularity (sub-channel) of the SL channel.

When the amount of data to be transmitted is large, slot aggregation transmission may be used to support a larger TBS.

In Mode 1 based on centralized resource allocation, the serving base station may allocate multiple aggregated slots for the PSSCH to support a larger TBS. In order to help the base station decide whether to use slot aggregation and/or decide the appropriate number of slots for aggregation, the TX UE may report some assistance information to the base station. The TX UE may report at least one of the QoS of the data to be transmitted, the amount of data to be transmitted and the target communication range to the base station. For example, if the QoS of the data to be transmitted is high, the amount of data to be transmitted is large, and/or the target communication range is large, the base station may enable resource allocation of the slot aggregation transmission, or allocate more number of slots for aggregation.

The technical scheme of reporting the assistance information may be advantageous. Specifically, the assistance information can help the base station more accurately allocate adaptive sidelink resources for the current sidelink channel quality, the sidelink transmit power headroom of the TX UE, the QoS of the data to be transmitted, the amount of data to be transmitted, and the target communication range.

The resource allocation method of aggregating/binding/repeating multiple slots for the NR V2X system provided by this application can also be applied to a LTE V2X system, that is, the PSSCH of the LTE V2X system can be transmitted on multiple aggregated/bound/repeated sub-frames using the above method.

Embodiment 2

Example 1

An embodiment of the present application provides a method for resource allocation, applied to a UE. A schematic flowchart of the method is shown in FIG. 7, and the method includes:

Step 701, initiating initial resource selection for temporarily selecting resources for data to be transmitted.

Step 702, performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE.

Step 703, transmitting Physical Sidelink Control Channel (PSCCH) or Physical Sidelink Shared Channel (PSSCH) on a first resource according to a result of the first resource reselection, and announcing other resources except the first resource through the transmitted SCI.

In the embodiment of the present application, initiating initial resource selection for temporarily selecting resources for data to be transmitted; performing a first resource reselection after the initial resource selection is initiated and before the UE announces resources, and when a first SCI transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

Optionally, performing a second resource reselection after the UE announces resources and before transmitting data on the announced resource, and when a second SCI transmitted by other UE is received and the predefined condition for triggering resource reselection is met, wherein the resource reserved by the other UE indicated in the second SCI is at least one of the resources announced by the UE.

Optionally, the conditions for triggering the first resource reselection comprise at least one of the following:

the UE triggers the first resource reselection when the RSRP, associated with the first SCI, measured by the UE is higher than a preconfigured threshold;

the UE triggers the first resource reselection when priority of the data to be transmitted of the UE is lower than or equal to the priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when the resource on which the UE is to collide with the other UE is any one of the resources temporarily selected by the UE;

the UE triggers the first resource reselection when the resources on which the UE is to collide with the other UE are all resources temporarily selected by the UE;

the UE triggers the first resource reselection when the number of resources on which the UE is to collide with the other UE is greater than the predefined or preconfigured threshold;

the UE triggers the first resource reselection when the number of resources temporarily selected by the UE other than resource on which the UE is to collide with the other UE is less than the predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission of data to be transmitted; and the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, the time relationship between the UE triggering the first resource reselection and performing the first resource reselection comprises at least one of the following:

the UE performs the first resource reselection immediately after triggering the first resource reselection, where the time point at which the first resource reselection is triggered is the same as the time point at which the first resource reselection is performed;

the UE does not perform the first resource reselection immediately after triggering the first resource reselection, and until a specific time point, the UE performs the first resource reselection, where the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0−Tp before the time point t0 at which the first resource temporarily selected by the UE is located, when the condition for triggering resource reselection is met, the UE performs the first resource reselection at the time point t0−Tp, wherein the Tp is a predefined or preconfigured value, and the t0−Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, and after triggering the first resource reselection, until the time point t0−Tp before the time point t0 at which the first resource temporarily selected by the UE is located, the UE performs the first resource reselection, where Tp is a predefined or preconfigured value, and the t0−Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before that of the first available resource by a predefined interval Tp, the UE performs the first resource reselection, where Tp is a predefined or pre-configured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UEs, and the conditions for triggering the resource reselection are met, the transmit power of the PSCCH and/or the PSSCH transmitted by the UE on the resource to be collided is adjusted.

Optionally, the adjustment amount of the transmit power of the PSCCH and/or the transmit power of the PSSCH is related to at least one of the following:

the RSRP of the other UE measured by the UE;

the priority of the data to be transmitted of the UE;

the priority of the data of the other UE.

Optionally, adjusting the transmit power of the PSCCH and/or the transmit power of the PSSCH comprises at least one of the following:

when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;

when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:

the sensing window for the first resource reselection is a translation of a sensing window for the resource preliminary selection, and the resource preliminary selection is the initial resource selection;

the sensing window for the first resource reselection includes the sensing window for the resource preliminary selection, the time after a time point n and before a time point m, where the time point n is a time point at which the resource preliminary selection is performed, and the time point m is a time point at which the first resource reselection is performed;

the sensing window for the resource reselection includes the time after the time point n and before the time point m.

Optionally, a manner of defining a resource selection window for the first resource reselection comprises at least one of the following:

using a same criteria to determine the resource selection window for the first resource reselection and the resource selection window for a resource preliminary selection, and there is no correlation between the actual lengths of the two resource selection windows, wherein the resource preliminary selection is the initial resource selection;

the resource selection window for the first resource reselection is a translation of the resource selection window for resource preliminary selection;

the resource selection window for the first resource reselection is the remaining available time in the resource selection window for the resource preliminary selection; and the resource selection window for the first resource reselection includes all of available time until Packet Delay Budget (PDB).

Optionally, an enable or disable status of the first resource reselection function is configured by at least one of the following:

configuring the enable or disable status of the first resource reselection function for each resource pool;

configuring the enable or disable status of the first resource reselection function for each UE;

configuring the enable or disable status of the first resource reselection function for a Channel Busy Ratio (CBR) on a resource pool; and configuring the enable or disable status of the first resource reselection function for the priority of the data.

Optionally, configuring the enable or disable status of the first resource reselection function before resource announcement for a CBR on a resource pool, comprising:

for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:

for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:

the UE triggers the second resource reselection when Reference Signal Received Power (RSRP), associated with the second SCI, measured by the UE is higher than a preconfigured threshold;

the UE triggers the second resource reselection when the interval between the time when the UE successfully receives the second SCI and the PDB of the data to be transmitted is greater than a predefined or preconfigured threshold;

the UE triggers the second resource reselection when the resource on which the UE will collide with other UE is used for the first transmission of a transport block of the UE.

Optionally, a manner of determining a time point at which performing second resource reselection includes any of the following:

the UE successfully receives the second SCI at the second time point, and when the condition for triggering the resource reselection is met, the UE performs the second resource reselection at the second time point;

the UE successfully receives the second SCI at the second time point, and when the condition for triggering the resource reselection is met, the UE performs the second resource reselection at a time point by a predefined interval before the time point at which the resource to be collided is located.

The technical solutions provided in the embodiments of the present application have at least the following beneficial effects:

the UE autonomous resource allocation of the NR V2X system in Mode 2 is achieved.

The above embodiments of the present application are comprehensively and thoroughly introduced by the following embodiments:

In one embodiment, the UE is configured with an autonomous resource allocation mode (Mode 2). When data arrives, an initial resource selection is initiated for the data to be transmitted; before the resource is announced (that is the resource is reserved through SCI indication), temporarily selected resource may be reserved by other UE through the SCI indication in advance, then a resource reselection needs to be initiated for resources that are temporarily selected but reserved by other UE; after the resource is announced (that is the resource is reserved through SCI indication), resource that has been reserved may still be reserved by other UE through SCI indication, that is, pre-empted by other UE, then resource reselection needs to be initiated for the resource that has been reserved but is pre-empted by other UE.

Specifically, in Mode 2, the overall procedure for the UE to allocate resources for data to be transmitted includes one of the following a first step, a second step and a third step:

Step 1: The UE initiates an initial resource selection for the data to be transmitted at a time point.

The UE may temporarily select one or N (N>1) resources for the data to be transmitted during the initial resource selection process. The specific number of resources selected depends on the system configuration and the amount of data to be transmitted. If N resources are temporarily selected, the UE will indicate reservation for other N−1 resources through the SCI transmitted on the first resource to achieve the purpose of resource announcement. Here, only the first resource cannot be announced in advance through SCI, the following N−1 resources can be announced in advance through SCI.

Step 2: If the UE temporarily selects one resource for the data to be transmitted, before the actual use of this resource, under certain conditions, the UE may initiate resource reselection at a time point; if the UE temporarily selects N resources for the data to be transmitted, before the actual use of the first resource, under certain conditions, the UE may initiate resource reselection, that is, before the resource announcement (indicating reservation for the selected resource through SCI), the UE may initiate resource reselection at a time point.

If the resource temporarily selected by the UE is reserved by other UE through the SCI indication, where the SCI is received after the initial resource selection and before the resource announcement, that is, the UE will collide with other UE on the temporarily selected resource, and when a certain condition is met, the UE should trigger resource reselection, release the resource that has been temporarily selected but reserved by other UE, and reselect the resource to replace the released resource, that is, the number of reselected resources is the same with the number of the resources to be released due to collision.

Step 3: If the UE temporarily selects N resources for the data to be transmitted, after the resource announcement (indicating reservation for the selected resources through SCI), the UE may initiate resource reselection at a time point under certain conditions.

If the resource already announced by the UE is reserved by other UE through the SCI indication, where the SCI is received after the resource announcement and before the actual use of the announced resource, under certain conditions, the UE should trigger resource reselection, release the resource that has been announced previously but reserved by other UE, and reselect resource to replace the released resource, that is, the number of reselected resources is the same with the number of resources to be released due to collision. This process is also called pre-emption.

1. Initial Resource Selection

If new data arrive at the UE, but there is no available resources, or no enough available resources for the UE to transmit the data, the UE should initiate an initial resource selection for the data to be transmitted. The resource selection process may generally include two steps, which are called Step 1 and Step 2 respectively.

In Step 1, the UE evaluates each resource in the resource selection window based on the SCI successfully received in the sensing window and the measured RSRP. Under certain conditions, some resources are excluded. For example, if a resource is reserved by other UE through SCI indication, and the RSRP associated with the corresponding SCI is higher than the threshold, then the resource is excluded. After the resource is excluded, the number of remaining resources should be guaranteed to be at least above a certain ratio. If the number of remaining resources does not meet a certain ratio, the RSRP threshold for excluding resources is increased by 3 dB, and the process of excluding resources is repeated. Here, the initial RSRP threshold is jointly pre-configured based on the UE's own data priority and the data priorities of other UEs that preemptively indicate resource reservation through the SCI. In Step 1, resources that do not meet the conditions in the resource selection window are excluded mainly, in which the specific processes included are not described in detail here. The approximate processes may refer to steps 601 to 604 in FIG. 6.

In Step 2, the UE selects 1 or N resources for the data to be transmitted from the remaining resources after some resources are excluded in Step 1. For example, the remaining resources are ordered according to the RSSI measured in the sensing window, or the remaining resources are ordered according to the sequence of the resources in domain, or the remaining resources are ordered according to the weighting for the RSSI measured in the sensing window and the sequence of the resources in domain. After finishing the resource ordering, UE randomly selects the first one or N resources from a certain number of resources. The specific processes included in Step 2 are not described in detail here, and the approximate processes may refer to steps 605 to 607 in FIG. 6.

The above resource reselection process before the resource announcement and the resource reselection process after the resource announcement also repeat Step1 and Step2 included in the initial resource selection process, but the specific details may be different.

FIG. 8 is a schematic diagram of the time relationship diagram of the resource selection process. The UE performs resource selection at a time point n. According to the sensing results in the sensing windows n−T0~n before the time point n, the UE selects 1 or more resources for the data to be transmitted in the resource selection window n+T1~n+T2 after the time point n. Wherein, the resource selection window should not be later than the Packet Delay Budget (PDB), that is, n+T2≤PDB. Here, n is assumed to be the time origin 0.

2. Sensing Window for Resource Preliminary Selection

As shown in FIG. 8, the sensing window for the resource preliminary selection is n−T0~n, assuming that n is the time origin 0, then the length of the sensing window is T0, where the value of T0 is predefined or preconfigured.

Optionally, the unit of T0 is a time slot and is a physical time slot, that is, the sensing window includes a time slot that is not configured for sidelink transmission, in addition to the time slot that is configured for sidelink transmission.

Optionally, the unit of T0 is absolute time, for example, the unit of T0 is millisecond, then the number of physical time slots included in the sensing window is related to the subcarrier spacing used in the system, that is, the UE determines the number of physical time slots contained in the sensing window according to the subcarrier spacing and the predefined or preconfigured T0 value.

Optionally, the value of T0 is predefined, for example, the value of T0 is predefined as 1000 time slots, that is, T0 is fixed as 1000 time slots in any case. That is, T0 is the same for different resource pools, different UEs on the same resource pool, and different priorities of data services to ensure the fairness of resource selection.

Optionally, the value of T0 is configurable, and T0 configured for each resource pool, that is, the resource selection process on different resource pools may use different T0 values. For example, when the time slots configured for sidelink transmission in the resource pool are sparse, T0 may be configured with a larger value to ensure that enough sidelink time slots are measured in the sensing window.

Optionally, the value of T0 is configurable, and T0 is configured for each UE, that is, different UEs on the same resource pool may use different T0 values. For example, a UE with more services may be configured with a smaller T0 value to reduce the overall time of resource sensing.

Optionally, the value of T0 is configurable, and T0 is configured for each priority of the data service, that is, the same UE may use different T0 values for data services of different priorities. For example, a data service of higher priority may be configured with a smaller T0 value to reduce the overall time of resource sensing.

Optionally, the value of T0 is configurable, and T0 is configured for each Channel Busy Ratio (CBR) range on the resource pool, that is, the same resource pool may use different T0 values in different CBR ranges. For example, a higher CBR range may be configured with a larger T0 value to reduce the probability of resources collision.

3. Resource Selection Window for Resource Preliminary Selection

As shown in FIG. 8, the resource selection window for resource preliminary selection is n+T1~n+T2, that is, the earliest time point at which the UE may select resource is n+T1, and the latest time point at which the UE may select resource is n+T2, the length of the resource selection window is T2−T1. Here, the value of T1 is predefined or pre-configured, and the minimum and/or maximum values of T2 is predefined or pre-configured.

The UE needs to take certain processing time during the process of the resource selection. The resources in this processing time cannot be selected. Assuming that the processing time of the resource selection process is Tproc, then the resources in windows n~n+Tproc cannot be included in the resource selection window. For different UEs, Tproc values may be different due to different implementations. The system specifies a maximum value of Tproc, that is, the processing time of the resource selection process of all UEs should not exceed the maximum Tproc value specified by the system.

Optionally, the system specifies that the value of T1 is the above-mentioned maximum Tproc value, that is, T1=Tproc-max. All UEs on the same resource pool use the same T1 value, even if the processing time of the resource selection process of some UEs may be less than the maximum Tproc value specified by the system.

Optionally, the system specifies that the value of T1 is less than or equal to the above-mentioned maximum Tproc value, that is, T1≤Tproc-max. The actually used T1 value depends on the processing time of the resource selection process of the UE, that is, depends on the implementation of the UE, different UEs on the same resource pool may use different T1 values.

In one example, the unit of the above-mentioned maximum Tproc value (that is, the maximum T1 value) is a time slot or an OFDM symbol. That is, the minimum granularity of Tproc (T1) is one time slot or one OFDM symbol. Different subcarrier spacing should use different maximum values of Tproc (that is, the maximum T1 value).

In another example, the unit of the above-mentioned maximum Tproc value (that is, the maximum T1 value) is an absolute time, that is, the number of time slots or OFDM symbols included within the maximum Tproc time is determined by the subcarrier spacing and the maximum Tproc value.

Optionally, the system specifies the minimum value T2-min and/or the maximum value T2-max for the above-mentioned T2, that is, T2≤T2-min; or T2≤T2-max; or T2-min≤T2≤T2-max. In particular, the system specifies that T2-max is the PDB of the data, that is, T2-max=PDB, T2≤PDB. The PDB of data service is predefined or preconfigured. For example, the PDB may be 50 ms or 100 ms, then the T2-max may be 50 ms or 100 ms. Optionally, different PDB values may be configured for different Quality of Service (QoS) of the data service; and/or different PDB values may be configured for different priorities of the data service. Optionally, the T2-min value is predefined, and T2-min is related to the maximum time interval between the first resource and the last resource indicated in the SCI, for example, T2-min=T1+Time-Gap-max; or T2-min=T1-max+Time-Gap-max, where Time-Gap-max is the maximum time interval between the first resource and the last resource indicated in the SCI.

The SCI should indicate at least one PSSCH resource, that is, in addition to indicating the PSSCH resources associated with the current SCI, the SCI may also indicate other reserved PSSCH resources. When the SCI indicates multiple resources, the maximum time interval Time-Gap-max between the first resource and the last resource is predefined or preconfigured. For example, the maximum time interval may be 16 ms or 32 ms, that is, T2-min may be 16 ms or 32 ms.

Optionally, the maximum time interval Time-Gap-max between the first resource and the last resource indicated in the SCI is related to the maximum number of resources indicated in the SCI. For example, the maximum number of resources indicated in the SCI is preconfigured and the system specifies the maximum time interval between two adjacent resources indicated in the SCI, then the maximum time interval between the first resource and the last resource indicated in the SCI is determined by the product of the maximum number of resources indicated in the SCI and the maximum time interval between two adjacent resources. In another example, the maximum time interval between the first resource and the last resource indicated in the SCI is independent of the maximum number of resources indicated in the SCI.

Optionally, the maximum time interval Time-Gap-max between the first resource and the last resource indicated in the SCI is related to whether these two resources are used for the same TB transmission. For example, when multiple resources indicated in the SCI are configured to be used for the same TB transmission, the maximum time interval between the first resource and the last resource is 16 ms; when multiple resources indicated in the SCI are configured to be used for different TB transmissions, the maximum time interval between the first resource and the last resource is 32 ms.

Optionally, the T2-min value and/or the T2-max value are preconfigured. For example, different T2-min values and/or T2-max values may be configured for different resource pools; and/or different T2-min values and/or T2-max values may be configured for different priorities of data services; and/or, different T2-min values and/or T2-max values may be configured for different UEs; and/or different T2-min values and/or T2-max values may be configured for different numbers of resources to be allocated in the resource selection process; and/or, different T2-min values and/or T2-max values may be configured for different maximum retransmission times; and/or, different T2-min values and/or T2-max values may be configured for blind retransmission and HARQ feedback-based retransmission.

Optionally, the T2 value should satisfy the above-mentioned ranges of T2-min and/or T2-max, and the actually used T2 value depends on the implementation of the UE.

Optionally, the T2 value should satisfy the above-mentioned ranges of T2-min and/or T2-max, and the actually used T2 value is determined by the UE according to a predefined rule. For example, the UE should randomly select a value within T2-min—T2-max as the actually used T2 value; or, the UE decides the actually used T2 value according to any one or more of the data priority, the range of amount of data arriving, the number of resources to be allocated, the maximum number of retrans-missions, whether to use blind retransmission or HARQ feedback-based retransmission.

Optionally, the T2 value is predefined, for example, T2=PDB. That is, the resource selection window is ended at PDB.

Optionally, the T2 value is preconfigured, for example, different T2 values may be configured for different resource pools; and/or different T2 values may be configured for different UEs; and/or different T2 values may be configured for the different priorities of data services; and/or, different T2 values may be configured for different ranges of amount of data arriving; and/or, different T2 values may be configured for different numbers of resources to be allocated; and/or, different T2 values may be configured for different maximum retransmission times; and/or, different T2 values may be configured for blind retransmission and HARQ feedback-based retransmission.

4. Resource Reselection Before Resource Announcement

During the resource selection process, the UE temporarily selects 1 or N (N>1) resources in the resource selection window n+T1~n+T2 at the time point n for the data to be transmitted. If the UE selects N resources temporarily, it will indicate in the SCI transmitted on the selected first resource that other N−1 resources are reserved to achieve the purpose of resource reservation. Resource reservation is also called resource announcements.

Before the UE indicates reservation for the temporarily selected resource through the SCI, this resource may be pre-empted by other UE through the SCI. If the UE continues to use the temporarily selected resource, the two UEs may collide on this resource. If the two UEs are far away, that is, a RSRP level between the two UEs is low, then the interference level therebetween is low, and the collision that will occur has no effect on the data transmission of both, then the UE may continue use this temporarily selected resource. However, if the two UEs are close, that is, the RSRP level between the two UEs is high, then the interference level therebetween is high, and the collision that will occur has effect on the data transmission of both, then the UE should release this temporarily selected resource and initiate a resource reselection process.

As shown in FIG. 9, the UE performs a resource preliminary selection at time point n, and temporarily selects 3 resources in the resource selection window n+T1~n+T2, which are r0, r1, and r2 respectively, and the corresponding time points are t0, t1, and t2. Before the time point t0, the UE may receive the SCI transmitted by other UE, and the SCI indicates that one or more among r0, r1, and r2 are reserved, that is, the resources reserved (announced) by other UEs through SCI indications will collide with the resources temporarily selected by the UE. As shown in FIG. 9, the UE receives the SCI transmitted by other UE at time point k, which indicates that r1 is reserved. Under certain conditions, the UE should trigger resource reselection for resource r1, that is, the UE reselects the resource to replace resource r1. The time in FIG. 9 is the time point.

5. Triggering Conditions for Resource Reselection Before Resource Announcement

The conditions that trigger resource reselection may be related to one or more of the priorities of the data of both the UE and a UE to be collided, the RSRP level of the UE to be collided, the number of resources to be collided, and the location of the resources to be collided.

The triggering condition of the resource reselection may be related to the priority of the data to be transmitted of the UE and the priority of the data of the UE to be collided indicated through the SCI. Specifically, the triggering condition for resource reselection may be any one of the following:

Optionally, the UE triggers resource reselection only if the priority of the data to be transmitted of the UE is lower than or equal to the priority of the data of the UE to be collided indicated through the SCI;

Optionally, the UE triggers resource reselection only if the priority of the data to be transmitted of the UE is lower than the priority of the data of the UE to be collided indicated through the SCI;

Optionally, the UE triggers resource reselection only if the condition that the priority of the data to be transmitted of the UE is lower than the priority of the data of the UE to be collided indicated through the SCI, and the difference between the priorities of the both is higher than or equal to predefined or preconfigured threshold, is met;

Note: In the NR system, the smaller the priority value indicated in the SCI, the higher the priority of the corresponding data; the larger the priority value indicated in the SCI, the lower the priority of the corresponding data.

A condition for triggering resource reselection may be related to a signal strength between two UEs that will collide with each other, that is, related to a measured RSRP level of the UE to be collided. Here, the RSRP is obtained based on the measurement of the PSSCH DMRS.

Optionally, the UE may trigger resource reselection only if the condition that the measured RSRP of the UE to be collided is higher than a preconfigured threshold is met. Here, the RSRP threshold is related to the priority of the data to be transmitted of the UE and the priority of the data of the UE to be collided indicated in the SCI, that is, the RSRP threshold is determined according to the two priorities. The system configures different RSRP thresholds based on different values or ranges of the two priorities.

Optionally, the above-mentioned RSRP threshold for judging whether the resource is released to trigger resource reselection is the same as the RSRP threshold for excluding resources in Step 1 of the resource preliminary selection process described above. The former RSRP threshold may use the adjusted RSRP threshold in Step 1, that is, the RSRP threshold may be adjusted based on the preconfigured initial RSRP threshold; or, the former RSRP threshold may use the initial RSRP threshold preconfigured in Step 1.

Optionally, the above-mentioned RSRP threshold for judging whether resource is released to trigger resource reselection is different from the RSRP threshold for excluding resources in Step 1 of the resource preliminary selection process described above, and they are configured separately.

The condition for triggering resource reselection may be related to the number of resources to be collided. Here, the resources to be collided meet the above-mentioned triggering conditions related to the data priority. For example, the condition that the data priority of the UE to be collided indicated in the SCI is higher than the priority of the data to be transmitted of the UE itself is met; and/or, the resource to be collided meets the above-mentioned triggering conditions related to the RSRP of the UE to be collided, for example, the condition that the measured RSRP of the UE to be collided is higher than the threshold is met. Specifically, the condition for triggering resource reselection is any of the following:

Optionally, the UE triggers resource reselection only if any resource temporarily selected by the UE collides with a resource announced by other UE.

Optionally, the UE triggers resource reselection only if the condition that all the resources temporarily selected by the UE will collide with resources announced by other UEs is met.

Optionally, the UE may trigger resource reselection only if the condition that the number of resources that will collide with resources announced by other UEs among resources temporarily selected by the UE is greater than or equal to a predefined or preconfigured threshold is met. The predefined or preconfigured threshold may be related to the priority or QoS of the data, and the higher priority or higher QoS may have a smaller threshold. The threshold may be an absolute number or a relative ratio based on the total number of temporarily selected resources.

Optionally, the UE triggers the resource reselection only if the number of the remaining resources after excluding the resources that will collide with resources announced by other UEs from the resources temporarily selected by the UE is less than or equal to a predefined or preconfigured threshold. The predefined or preconfigured threshold may be related to the priority or QoS of the data, and the higher priority or higher QoS of the data may have a higher threshold; and/or, the predefined or pre-configured threshold may be related to the amount of data to be transmitted. The larger the amount of data to be transmitted, the larger the threshold may be. The threshold may be an absolute number or a relative ratio based on the total number of temporarily selected resources.

Optionally, the UE triggers resource reselection only if the condition is met, in which the number of the remaining resources after excluding the resources that will collide with resources announced by other UEs from the resources temporarily selected by the UE is less than the number of the transport blocks to be transmitted, or is insufficient to support at least one transmission of the data to be transmitted.

The condition that triggers resource reselection may be related to the location of the resource to be collided. Optionally, the UE triggers resource reselection only if the condition is met, in which the first resource temporarily selected by the UE and a resource announced by other UE will collide.

The system may use one or more of the above-mentioned triggering conditions for resource reselection. When there are multiple triggering conditions, the UE triggers resource reselection only when multiple conditions are met simultaneously. Optionally, the system defines multiple triggering conditions for resource reselection, and the specific triggering condition to be used is preconfigured. For example, the triggering condition for resource reselection may be configured as one or more of the above-mentioned triggering conditions for resource reselection.

6. The Timing Relationship Between a Triggering Time Point and a Performing Time Point of Resource Reselection Before Resource Announcement Optionally, the UE performs resource reselection immediately after triggering the resource reselection, that is, the time point m' at which the resource reselection is triggered is the same as the time point m at which the resource reselection is performed. Therefore, triggering resource reselection and performing resource reselection may be considered as the same event. Specifically, the following optional schemes are available:

In one example, the time point at which the resource reselection may be performed is the time point at which the SCI, transmitted by other UE, indicating that the reserved resource and the resource temporarily selected by the UE will collide is successfully received. Considering that it takes processing time for the UE to receive and decode the SCI, the time point at which the UE successfully decodes the SCI is not the time point at which the SCI is received. For example, other UE transmits the SCI indicating that the reserved resource will collide with the resource temporarily selected by the UE at time point s, and assuming that the processing time of receiving and decoding for SCI is Tdecode, the UE successfully receives the SCI at time point s+Tdecode, that is k=s+Tdecode.

As shown in FIG. 10, the UE successfully receives the SCI transmitted by other UE at time point k. The SCI indicates that resource r1 is reserved. If the condition that triggers resource reselection is met, the UE should perform resource reselection at time point k. The time in FIG. 10 is the time point.

In another example, the time point at which resource reselection may be performed is a predefined time point before the first resource r0 is temporarily selected by the UE, such as t0−Tp, where Tp is a predefined or preconfigured value. Optionally, the system specifies Tp=Tprepare+Tproc'; or, the system specifies Tp=Tprepare. Wherein, Tprepare is the preparation time for PSCCH/PSSCH transmission, and Tproc' is the processing time for performing resource reselection. The processing time took by the UE in the resource reselection process in the second step may be less than the processing time took in the resource selection process in the first step, that is, Tproc'刲proc.

As shown in FIG. 11, the UE receives SCI transmitted by other UE at time point k. The SCI indicates that the resource r1 is reserved. The UE determines whether the resource reselection is triggered at time point t0−Tp, that is, determines whether the temporarily selected resource will collide with other UE. If there is a resource that will collide with another UE and the above-mentioned condition for triggering resource reselection is met, the UE performs resource reselection at time point t0−Tp, that is, m=t0−Tp. The time in FIG. 11 is the time point.

Optionally, the UE does not perform resource reselection immediately after triggering the resource reselection, until a specific time point, that is, the time point m' at which the resource reselection is triggered and the time point m at which the resource reselection is performed are different. Therefore, triggering of resource reselection and performing of resource reselection are two different events. Here, the time point m' at which the resource reselection may be triggered is the time point at which the SCI, transmitted by another UE, indicating that the reserved resource and the resource temporarily selected by the UE will collide is successfully received, if the condition that triggers the resource reselection is met. The time point m at which the resource reselection is performed may be determined by any of the following methods:

In one example, after the resource reselection is triggered at the time point m', the UE does not perform resource reselection immediately, until a predefined time point before the temporarily selecting of first resource r0, such as t0−Tp, where Tp is a predefined or preconfigured value. Optionally, the system specifies Tp=Tprepare; or, the system specifies Tp=Tprepare+Tproc', where Tprepare is a preparation time for PSCCH/PSSCH transmission, and Tproc' is a processing time for performing resource reselection.

Here, before the UE performs resource reselection at time point m, the UE may trigger multiple resource reselections, that is, the UE may trigger resource reselection at different time points m' because different resources will collide, then when the UE performs resource reselection at time point m, it needs to reselect multiple resources to replace the resources to be collided. Therefore, multiple resource reselection triggering events at different time points correspond to one resource reselection performing event at the same time point, which is why the resource reselection is not performed immediately when triggered, so as to reduce the times of the resource reselection for the UE.

As shown in FIG. 12, the UE receives the SCI transmitted by another UE at time point k. The SCI indicates that resource r1 is reserved. Under certain conditions, the UE triggers resource reselection at time point k, that is, m'=k, after the resource reselection is triggered, the UE will wait until the time point t0−Tp to perform the resource reselection, that is, m=t0−Tp. The time in FIG. 12 is the time point.

Optionally, the UE decides at which time point to perform resource reselection according to whether the resource to be collided contains r0. If the reason for triggering resource reselection is that the UE will collide with another UE on the resource r0, the UE performs resource reselection at time point t0−Tprepare, that is, m=t0−Tprepare. The purpose of reserving Tprepare is to have time to cancel the transmission of PSCCH/PSSCH on the resource r0; if the reason for triggering resource reselection is that the UE will collide with other UE on resources other than resource r0, the UE performs resource reselection at time point t0−Tprepare−Tproc', that is, m=t0−Tprepare−Tproc'. The purpose of reserving Tprepare and Tproc' is to have time to reserve the reselected resource through the SCI indication transmitted on the first resource r0.

Optionally, after the UE triggers the resource reselection at the time point m', the UE does not perform the resource reselection immediately, but waits until a predefined time point before the first available resource to perform the resource reselection. As shown in FIG. 13, the UE receives the SCI transmitted by other UE at time point k, and the SCI indicates that resource r0 is reserved, then the UE performs resource reselection at time point t1−Tp before the first available resource r1, where, Tp is a predefined or preconfigured value. Optionally, the system specifies Tp=Tprepare; or, the system specifies Tp=Tprepare+Tproc', where Tprepare is a preparation time for PSCCH/PSSCH transmission, and Tproc' is a processing time for performing resource reselection.

In FIG. 13, if the resource r1 is reserved by other UE preemptively through the SCI indication before the time point t1−Tp, the UE may perform resource reselection at the time point t2−Tp before the time point of the next available resource r2. If the resource r2 is also reserved by other UE preemptively through the SCI indication before the time point t2−Tp, that is, all resources temporarily selected are reserved by other UE preemptively through the SCI indication, then the UE performs resource reselection at a time point t2-Tp before the time point t2 of the last resource r2 which is determined to be collided; or the UE performs resource reselection at the time point when the last SCI indicating that the resource to be collided is received successfully; or the UE performs resource reselection at the end time point T2 of the resource selection window. The time in FIG. 13 is the time point.

Optionally, after the UE triggers the resource reselection at the time point m', the specific time point m at which the resource reselection is performed depends on the UE implementation, but it cannot later than the predefined time point before the temporarily selecting of first resource r0, for example '헤0-Tp; or, cannot later than a predefined time point Tp before the first available resource, where Tp is a predefined or preconfigured value. Optionally, Tp=Tprepare or Tp=Tprepare+Tproc', where Tprepare is a preparation time for PSCCH/PSSCH transmission, and Tproc' is a processing time for performing resource reselection.

7. Maximum Number of Resource Reselections Before Resource Announcement

The UE triggers the resource reselection because the resource temporarily selected by the UE will collide with resource announced by other UE. After the UE performs resource reselection, another resource that is not to collide temporarily among the resources selected by the UE at time point n and that is reselected at time point m may also collide with resource announced by other UE again, thereby the resource reselection is triggered again, that is, the UE may trigger the resource reselection again after performing resource reselection and before final announcing of resource, then the resource reselection is performed again.

Optionally, the system specifies that the UE only performs resource reselection at most once before final announcing of resource.

Optionally, the system specifies the maximum number of times that the UE can perform the resource reselection before final announcing of resource. The maximum number of times can be predefined or preconfigured. The system may configure different maximum number of times of resource reselections for different resource pools; and/or, configure different maximum number of times of resource reselections for different UEs; and/or, configure different maximum number of times of resource reselections for different priorities of data.

In one example, after the actual number of resource reselections reaches the maximum, if a selected resource collides with a resource announced by another UE again, the UE ignores possible collisions on this resource, and may still reserve for this resource indicated through SCI and continue to use this resource, and there is no special handling for the transmit power of PSCCH/PSSCH transmitted on this resource.

In another example, after the actual number of resource reselections reaches the maximum, if a selected resource collides with a resource announced by another UE again, the UE ignores possible collisions on this resource, and may still reserve for this resource indicated through SCI and continue to use this resource, and it needs special handling for the transmit power of PSCCH/PSSCH transmitted on this resource.

For example, if the priority of data to be transmitted of UE is higher than the priority of data of another UE to be collided, and/or the RSRP of the another UE measured by the UE is lower than a preconfigured threshold, then the transmit power of PSCCH/PSSCH transmitted by the UE on this resource may be increased to counteract possible interference and ensure the reliability of the transmission; if the priority of the data to be transmitted of the UE is lower than that of the data of another UE to be collided, and/or the RSRP of the other UE measured by the UE is higher than the preconfigured threshold, then the transmit power of the PSCCH/PSSCH transmitted by the UE on the resource is adjusted to be lower to reduce the interference level to another UE. Wherein, the adjustment amount (increased amount or decreased amount) of the transmit power of the PSCCH/PSSCH transmitted on this resource is predefined or preconfigured, and the adjustment amount should be related to at least one of the RSRP level of the UE to be collided, the priority of the data of the UE to be collided indicated in the SCI, and the priority of the data to be transmitted.

8. Sensing Window for Resource Reselection Before Resource Announcement

The resource reselection process is similar to the initial resource selection process, and also includes the above-mentioned Step 1 and Step 2. Similarly, the resource reselection process will also have a corresponding sensing window and resource selection window, that is, based on the detection information in the corresponding sensing window, resources are reselected for the data to be transmitted in the corresponding resource selection window, and the number of reselected resources is equal to the number of resources to be collided.

Optionally, the sensing window for resource reselection is the translation of the sensing window for the resource preliminary selection, that is, the windows n-T0~n are translated from the time point n to the time point m. As shown in FIG. 14, the sensing window of the resource reselection process performed at time point m is m-T0~m. The time in FIG. 14 is a time point.

Optionally, the sensing window for resource reselection includes the time after the time point n and before the time point m in addition to the sensing window for the resource preliminary selection. As shown in FIG. 15, the sensing window of the resource reselection process performed at time point m is n-T0~m. The time in FIG. 15 is a time point.

Optionally, the sensing window for resource reselection includes only the time after the time point n and before the time point m. As shown in FIG. 16, the sensing window of the resource reselection process performed at time point m is n~m. The time in FIG. 16 is a time point.

9. Resource Selection Window for Resource Reselection Before Resource Announcement Similar to resource preliminary selection, resource reselection also has a corresponding resource selection window. For ease of description, the resource selection window of the resource reselection process performed at time point m may be set to m+T3~m+T4, as shown in FIG. 17. The time in FIG. 17 is a time point.

Wherein, the starting point T3 of the resource selection window for resource reselection is determined has a similar meaning to the starting point T1 of the resource selection window of the resource preliminary selection process. That is, T3 is determined by the processing time Tproc' of the resource reselection process, T1 is determined by the processing time Tproc of the resource preliminary selection process, where Tproc' and Tproc may be the same or different. Optionally, the system specifies T3=T1, that is, the system specifies that the maximum processing time Tproc-max of the resource preliminary selection process is the same as the maximum processing time Tproc'-max of the resource reselection process. Optionally, the system specifies T3 '헤hat is, the system specifies that the maximum processing time Tproc-max of the resource preliminary selection process is different from the maximum processing time Tproc'-max of the resource reselection process, which is similar to the method for determining the T1 value described above, T3=Tproc'-max; or, T3=Tproc'-max, and the specific T3 value depends on the implementation of the UE.

Optionally, the ending point T4 of the resource selection window for resource reselection is determined has the same minimum and/or maximum value as the ending point T2 of the resource selection window for resource preliminary selection, that is, T4-min=T2-min, and/or T4-max=T2-max, but the actual values of T4 and T2 may be different. For example, the actual values of T2 and T4 depend on the implementation of the UE and may be the same or different; or the actual values of T2 and T4 depend on the number of resources that need to be allocated. Because the number of resources to be allocated during the resource reselection process is less than or equal to the number of resources to be allocated during the resource preliminary selection process, the actual value of T4 should be less than or equal to the actual value of T2. Therefore, the length of the resource selection window for resource reselection should be less than or equal to the length of the resource selection window for resource preliminary selection.

Optionally, the resource selection window of the resource preliminary selection is translated to the time point m as the resource selection window of the resource reselection, that is, the window of the time point m+T1~m+T2. Therefore, the length of the resource selection window for resource preliminary selection is exactly the same as the length of the resource selection window for resource reselection. It should be noted, if m+T2>PDB, then the resource selection window is m+T1~PDB, that is, the resource selection window does not exceed PDB at the latest.

Optionally, the resource selection window for resource reselection reuses the remaining available time in the resource selection window for the resource preliminary selection. As shown in FIG. 18, the resource selection window for the resource reselection process performed at time point m is m+T3~n+T2. If T3=T1, then the resource selection window is m+T1~n+T2. The time in FIG. 18 is the time point. Optionally, the resource selection window for resource reselection includes all available times until the end of the PDB. As shown in FIG. 19, the resource selection window for the resource reselection process performed at time point m is m+T3~PDB. If T3=T1, the resource selection window is m+T1~PDB. The time in FIG. 19 is the time point.

10. Enable/Disable Status of Resource Reselection Function Before Resource Announcement The resource reselection function before the resource announcement may effectively avoid resource collision between two UEs, thereby reducing the interference level on the resource pool and improving the performance of the sidelink transmission, but the resource reselection also increases the implementation complexity of the UE. Optionally, the resource reselection function before the resource announcement may be enabled/disabled. When this function is enabled, the UE should determine whether the selected resource is preemptively announced by another UE before announcing the resource. If the selected resource is preemptively announced by another UE, when certain conditions are met, the UE should initiate resource reselection. When the function is disabled, the UE does not need to determine whether the selected resource is preemptively announced by other UE before announcing the resource. The UE always uses the selected resource for actual data transmission.

The enable/disable status of the resource reselection function before the resource announcement may be configured in any one or more of the following ways:

Optionally, the enable/disable status of the resource reselection function before the resource announcement may be configured for each resource pool, that is, different resource pools may have different configurations.

Optionally, the enable/disable status of the resource reselection function before the resource announcement may be configured for the CBR range on the resource pool, that is, for the same resource pool, when the CBR is higher, this function may be enabled, and when the CBR is lower, this function may be disabled.

Optionally, the enable/disable status of the resource reselection function before the resource announcement may be configured for each UE, that is, on the same resource pool, some UEs may be enabled with this function, while other UEs may be disabled with this function.

Optionally, the enable/disable status of the resource reselection function before the resource announcement may be configured for each priority of data or the range thereof, that is, for the same UE, when the priority of the data to be transmitted is higher, this function may be disabled, and when the priority of the data to be transmitted is lower, this function may be enabled.

11. Resource Reselection after Resource Announcement (that is Pre-Emption)

After the UE indicates reservation for the selected resource through the SCI, this resource may be reserved by other UE through the SCI, that is, the same resource is reserved by two UEs through the SCI. If the two UEs are to transmit PSCCH/PSSCH on resources reserved by themselves, then the two UEs will collide on this resource. If the two UEs are far away, that is, the RSRP level between the two UEs is low, then the interference level between the two UEs is lower, the collision that will occur has no effect on the data transmission of both, then the two UEs can continue to use the reserved resource; but if the two UEs are close, the RSRP level between the two UEs is relatively high, then the interference level between the two UEs is high, and the collision that will occur may affect the data transmission of the two UEs, then one of the UEs should release the reserved resources and initiate a resource reselection process.

For the convenience of description, in the following, among the above two UEs, the earlier UE indicating reservation for resource through SCI is referred to as the first UE, and the later UE indicating reservation for resource through SCI is referred to as the second UE. The UE releasing reserved resources and initiating resource reselection shall referred to as the first UE, that is, the second UE has a higher transmission priority than the first UE. In the case where the first UE has reserved resources through the SCI, the second UE may still reserve the same resources through the SCI under certain conditions, that is, the resources reserved by the first UE are pre-empted by the second UE. For example, the condition for the second UE to preempt the resources reserved by the first UE may be: the priority of the data of the second UE is higher than the priority of the data of the first UE, and the second UE has no other more suitable available resource within the PDB.

12. Triggering Conditions for Resource Reselection after Resource Announcement

Similar to the resource reselection before the resource announcement, the triggering condition used for the resource reselection before the resource announcement may also be applied to the resource reselection after the resource announcement. For example, the triggering condition may be related to the priorities of two UEs that will collide with each other, and the RSRP level between the two UEs.

Optionally, the first UE triggers resource reselection only if the RSRP of the second UE measured by the first UE is higher than a preconfigured threshold. Here, the RSRP threshold is related to the data priorities of the first UE and the second UE.

Here, the RSRP threshold used to determine whether pre-emption triggers resource reselection is the same as the RSRP threshold used to determine whether resource reselection is triggered before resource announcement; or, the RSRP threshold used to determine whether pre-emption triggers resource reselection is the different from the RSRP threshold used to determine whether resource reselection is triggered before resource announcement, that is, they are configured separately.

In particular, if the pre-empted resource is reserved for data retransmission which is the HARQ feedback-based retransmission, then when the HARQ feedback received by the UE is ACK, the resource reserved for data retransmission will not be used. In this case, the UE may not initiate a resource retransmission for the pre-empted resource.

Optionally, when the time interval between the time point at which the UE successfully receives the SCI, indicating that resources are pre-empted, transmitted by other UE, and the maximum PDB of the data to be transmitted is greater than a predefined or preconfigured threshold, the UE initiates resource reselection.

Optionally, when a resource of the UE that will collide with that of another UE is used for the first transmission of a transport block of the UE, the UE initiates resource reselection.

13. Timing Relationship Between a Triggering Time Point and a Performing Time Point of Resource Reselection after Resource Announcement Similar to the resource reselection before the resource announcement, the method used to define the triggering time point of the resource reselection and/or the performing time point of the resource reselection before the resource announcement may also be applied to the resource reselection after the resource announcement.

Optionally, the first UE successfully receives the second UE's SCI at time point k indicating that the same resource is reserved, and the first UE initiates resource reselection at time point k under certain conditions.

Optionally, the first UE successfully receives the second UE's SCI at time point k indicating that the same resource is reserved, and under certain conditions, the first UE initiates resource reselection at a predefined time point Tp before the time point of the reserved resource. Where Tp=Tprepare, and Tprepare is the preparation time for PSCCH/PSSCH transmission.

Optionally, the first UE successfully receives the second UE's SCI at time point k indicating that the same resource is reserved, and under certain conditions, the time point when the first UE initiates resource reselection depends on the UE implementation, but no later than the predefined time point Tp before the time point of the reserved resource. Where Tp=Tprepare, and Tprepare is the preparation time for PSCCH/PSSCH transmission.

14. Maximum Number of Resource Reselections after Resource Announcement

When multiple resources are announced to be reserved by the SCI, multiple or all of the reserved resources may be pre-empted by other UEs. Then, after the resource announcement by the SCI, the UE may initiates multiple resource reselections due to the pre-emption. Similar to resource reselection before resource announcement, the number of resource reselections initiated due to pre-emption after resource announcement should be limited not to exceed the preconfigured maximum value. The method used to configure the maximum number of resource reselections before the resource announcement may also be applied to the resource reselection after the resource announcement.

15. Sensing Window for Resource Reselection after Resource Announcement

Similar to the resource reselection before the resource announcement, the method used to define the sensing window position of the resource reselection before the resource announcement may also be applied to the resource reselection after the resource announcement. For example, assuming that the UE performs the resource reselection process triggered by pre-emption at time point t, the sensing window for resource preliminary selection may be translated to time point t as the sensing window for resource reselection after resource announcement, that is, t−T0~t; or, the sensing window for resource reselection after resource announcement has the same starting position as the sensing window for resource preliminary selection, that is, n−T0~t; or, the starting position of the sensing window is the time point q at which the corresponding SCI for resource declaration is transmitted, that is, q~t.

16. Resource Selection Window for Resource Reselection after Resource Announcement Similar to the resource reselection before the resource announcement, the method used to define the sensing window position of the resource reselection before the resource announcement may also be applied to the resource reselection after the resource announcement. For example, assuming that the UE performs the resource reselection process triggered by pre-emption at time point t, the resource selection window for resource preliminary selection may be translated to time point t as the resource selection window for resource reselection after resource announcement, that is, t+T1~t+T2; or, the resource selection window for resource reselection before resource announcement is translated to time point t as the resource selection window for resource reselection after resource announcement, that is, t+T3~t+T4; or, the starting point and ending point of the resource selection window for resource reselection after the resource announcement may be defined as T5 and T6, that is, t+T5~t+T6, where T5 may have the same value as T1/T3, or T5 may have the same maximum value as T1/T3, T6 may have the same maximum and/or minimum value as T2/T4, but the specific value may be different from T2/T4; or, resource selection window for resource reselection after resource announcement may use all available time until the end of the PDB, that is, t+T5~PDB.

17. Enable/Disable Status of Resource Reselection Function after Resource Announcement Similar to the resource reselection before the resource announcement, the resource reselection function after the resource announcement may also be enabled/disabled. The method used to configure enable/disable status of the resource reselection function before the resource announcement may also be used for the resource reselection function after the resource announcement. For example, the enable/disable status of the resource reselection function after the resource announcement may be configured according to different resource pools, different CBR ranges, different UEs, and different priorities of data.

Optionally, the resource reselection function before the resource announcement and the resource reselection function after the resource announcement share the same enable/disable configuration, that is, both are enabled or disabled at the same time.

Optionally, the resource reselection function before the resource announcement and the resource reselection function after the resource announcement use different enable/disable configurations respectively, that is, they are enabled or disabled separately.

Example 2

Based on the same inventive concept of the above Example 2, an embodiment of the present application further provides a UE, a schematic structural diagram of which is shown in FIG. 20. The UE 200 includes a first processing module 2001, a second processing module 2002, and a third processing module 2003.

The first processing module 2001 is configured to initiate initial resource selection for temporarily selecting resources for data to be transmitted;

The second processing module 2002 is configured to perform a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE;

The third processing module 2003 is configured to transmitting PSCCH or PSSCH on the first resource according to a result of the first resource reselection, and announcing other resources except the first resource through the transmitted SCI.

UE 200 further includes a fourth processing module, which is configured to perform a second resource reselection after the UE announces resources and before transmitting data on the announced resource, and when a second SCI transmitted by other UE is received and the predefined condition for triggering resource reselection is met, wherein the resource reserved by the other UE indicated in the second SCI is at least one of the resources that the UE has announced.

Optionally, the condition for triggering the first resource reselection comprises at least one of the following:

the UE triggers the first resource reselection when Reference Signal Received Power (RSRP), associated with the first SCI, measured by the UE is higher than a pre-configured threshold;

the UE triggers the first resource reselection when priority of the data to be transmitted of the UE is lower than or equal to the priority of the data indicated in the first SCI;

the UE triggers the first resource reselection when the priority of the data to be transmitted of the UE is lower than the priority of the data indicated in the first SCI;

the UE triggers the first resource reselection when the priority of the data to be transmitted of the UE is lower than the priority of the data indicated in the first SCI, and a difference between the priority of the data to be transmitted of the UE and the priority of the data indicated in the first SCI is greater than or equal to a predefined or preconfigured threshold;

the UE triggers the first resource reselection when the resource on which the UE is to collide with the other UE is any one of the resources temporarily selected by the UE;

the UE triggers the first resource reselection when the resource on which the UE is to collide with the other UE is all resources temporarily selected by the UE;

the UE triggers the first resource reselection when the number of resources on which the UE is to collide with the other UE is greater than the predefined or preconfigured threshold;

the UE triggers the first resource reselection when the number of resources temporarily selected by the UE other than resources on which the UE is to collide with the other UE is less than the predefined or preconfigured threshold;

the UE triggers the first resource reselection when the number of resources temporarily selected by the UE other than the resource on which the UE is to collide with the other UE is less than the number of transport blocks to be transmitted, or is insufficient to support one transmission process of data to be transmitted;

the UE triggers the first resource reselection when the resource on which the UE is to collide with the other UE is the first resource temporarily selected by the UE.

Optionally, the RSRP threshold used to trigger the first resource reselection is the same as the RSRP threshold used for resource exclusion in the initial resource selection process.

Optionally, the manner for determining the RSRP threshold used to trigger the first resource reselection comprises any one of the following:

using an initial value of the RSRP threshold used for resource exclusion in the initial resource selection process as the RSRP threshold used to trigger the first resource reselection; or using an adjusted value of the RSRP threshold used for resource exclusion in the initial resource selection process as the RSRP threshold used to trigger the first resource reselection.

Optionally, the RSRP threshold for triggering the first resource reselection and the RSRP threshold for resource exclusion in the initial resource selection process are configured separately.

Optionally, the RSRP threshold for triggering the first resource reselection is configured according to the priority of the data to be transmitted of the UE and the priority of the data indicated in the first SCI.

Optionally, time relationship between the UE triggering the first resource reselection and performing the first resource reselection comprises at least one of the following:

the UE performs the first resource reselection immediately after triggering the first resource reselection, and the time point at which the first resource reselection is triggered is the same as the time point at which the first resource reselection is performed;

the UE does not perform the first resource reselection immediately after triggering the first resource reselection, and until a specific time point the UE performs the first resource reselection, the time point at which the first resource reselection is triggered is different from the time point at which the first resource reselection is performed.

Optionally, the UE performing the first resource reselection immediately after triggering the first resource reselection comprises:

the UE successfully receives the first SCI at a first time point, and when the condition for triggering resource reselection is met, the UE performs the first resource reselection at the first time point; or the UE successfully receives the first SCI at a first time point, and the UE determines whether the first resource reselection is triggered at a predefined time point t0−Tp before the time point t0 of the temporarily selected first resource, when the condition for triggering resource reselection is met, the UE performs the first resource reselection at the time point t0−Tp, wherein the Tp is a predefined or preconfigured value, and the t0−Tp indicates a time point before t0 by an interval of Tp.

Optionally, the UE does not perform the first resource reselection immediately after triggering the first resource reselection, and until a specific time point, the UE performs the first resource reselection, comprising:

the UE successfully receives the first SCI at a first time point, and when the condition for triggering resource reselection is met, the UE triggers the first resource reselection at the first time point, after triggering the first resource reselection, until a predefined time point t0−Tp before the time point t0 of the first resource temporarily selected by the UE, the UE performs the first resource reselection, where Tp is a predefined or preconfigured value, the t0−Tp indicates a time point before t0 by an interval of Tp; or the UE successfully receives the first SCI at the first time point, and when the condition for triggering resource reselection is met, the UE triggers the first resource reselection at the first time point, and after triggering the first resource reselection, until the time point before the first available resource by a predefined interval Tp, the UE performs the first resource reselection, where Tp is a predefined or preconfigured value.

Optionally, the Tp comprises at least a preparation time for transmitting a PSCCH/PSSCH, and/or a processing time for performing the first resource reselection process.

Optionally, the number of times that the UE performs the first resource reselection should not exceed a predefined or preconfigured maximum value.

Optionally, when the number of times that the UE performs the first resource reselection exceeds the maximum value and a collision will occur between the resources selected by the UE and resources announced by other UEs, and the conditions for triggering the resource reselection are met, the transmit power of the PSCCH and/or the PSSCH transmitted on the resource to be collided is adjusted by the UE.

Optionally, the adjustment amount of the transmit power of the PSCCH and/or the transmit power of the PSSCH is related to at least one of the following:

RSRP of the other UE measured by the UE;
priority of the data to be transmitted of the UE; and
priority of the data of the other UE.

Optionally, adjusting the transmit power of the PSCCH and/or the transmit power of the PSSCH comprises at least one of the following:

when the priority of the data to be transmitted of the UE is higher than the priority of the data of the other UE, and/or the RSRP of the other UE measured by the UE is lower than a preconfigured threshold, the transmit power of the PSCCH and/or the transmit power of the PSSCH transmitted by the UE on the resource to be collided is adjusted to be higher;

when the priority of the data to be transmitted of the UE is lower than the priority of the data of the other UE, and/or the RSRP of the other UE measured by the UE is higher than the preconfigured threshold, the transmit power of the PSCCH and/or the transmit power of the PSSCH transmitted by the UE on the resource to be collided is adjusted to be lower.

Optionally, the manner of defining a sensing window for the first resource reselection comprises at least one of the following:

the sensing window for the first resource reselection is a translation of a sensing window for a resource preliminary selection, and the resource preliminary selection is the initial resource selection;

the sensing window for the first resource reselection includes the sensing window for the resource preliminary selection, the time after a time point n and before a time point m, where the time point n is a time point at which the resource preliminary selection is performed, and the time point m is a time point at which the first resource reselection is performed;

the sensing window for the resource reselection includes the time after the time point n and before the time point m.

Optionally, a manner of defining a resource selection window for the first resource reselection comprises at least one of the following:

using a same criteria to determine the resource selection window for the first resource reselection and the resource selection window for a resource preliminary selection, and there is no correlation between the actual lengths of the two resource selection windows, wherein the resource preliminary selection is the initial resource selection;

the resource selection window for the first resource reselection is a translation of the resource selection window for resource preliminary selection;

the resource selection window for the first resource reselection is the remaining available time in the resource selection window for the resource preliminary selection;

the resource selection window for the first resource reselection includes all of available time until Packet Delay Budget (PDB).

Optionally, an enable or disable status of the first resource reselection function is configured by at least one of the following:

configuring the enable or disable status of the first resource reselection function for each resource pool;

configuring the enable or disable status of the first resource reselection function for each UE;

configuring the enable or disable status of the first resource reselection function for a Channel Busy Ratio (CBR) on a resource pool; and configuring the enable or disable status of the first resource reselection function for the priority of the data.

Optionally, configuring the enable or disable status of the first resource reselection function before resource announcement for a CBR on a resource pool, comprising:

for the same resource pool, when the CBR is greater than a first threshold, the first resource reselection function is set to be enabled; when the CBR is less than a second threshold, the first resource reselection function is set to be disabled.

Optionally, configuring the enable or disable status of the first resource reselection function before the resource announcement for each priority or a range of priority of data, comprising:

for the same UE, when the priority of data to be transmitted is greater than a first priority, the first resource reselection function is set to be enabled; when the priority of data to be transmitted is lower than a second priority, the first resource reselection function is set to be disabled.

Optionally, the condition for triggering the second resource reselection comprises at least one of the following:

the UE triggers the second resource reselection when RSRP, associated with the second SCI, measured by the UE is higher than a preconfigured threshold;

the UE triggers the second resource reselection when the interval between the time when the UE successfully receives the second SCI and the PDB of the data to be transmitted is greater than a predefined or preconfigured threshold;

the UE triggers the second resource reselection when the resource that the UE will collide with other UE is used for the first transmission of a transport block of the UE.

Optionally, a manner of determining a time point at which performing second resource reselection includes any of the following:

the UE successfully receives the second SCI at the second time point, and when the condition for triggering the resource reselection is met, the UE performs the second resource reselection at the second time point;

the UE successfully receives the second SCI at the second time point, and when the condition for triggering the resource reselection is met, the UE performs the second resource reselection at a time point by a predefined interval before the time point at which the resource to be collided is located.

The technical solutions provided in the embodiments of the present application have at least the following beneficial effects:

In the embodiment of the present application, initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting PSCCH or PSSCH on the first resource according to a result of the first resource reselection, and announcing other resources except the first resource through the transmitted SCI. In this way, the UE autonomous resource allocation of the NR V2X system in Mode 2 is achieved.

For the content not described in detail in the UE provided in the embodiment of the present application, reference may be made to the foregoing resource allocation method. The beneficial effects that the UE provided in the embodiment of the present application may achieve are the same as the foregoing method for resource allocation, and are not described herein again.

Example 3

Based on the same inventive concept, an embodiment of the present application further provides a UE, a schematic structural diagram of which is shown in FIG. 21. The UE 210 includes at least one processor 2101, a memory 2102, and a bus 2103. At least one processor 2101 is electrically connected with the memory 2102; the memory 2102 is configured to store at least one computer-executable instruction, and the processor 2101 is configured to execute the at least one computer-executable instruction, so as to execute any one of the embodiments in the Example 1 of the present application or steps of any method for resource allocation provided by any optional embodiments.

Further, the processor 2101 may be a Field-Programmable Gate Array (FPGA) or other devices with logic processing capabilities, such as a Microcontroller Unit (MCU), and a Central Process Unit (CPU).

The embodiments of the present application have at least the following beneficial effects:

In the embodiment of the present application, initiating initial resource selection for temporarily selecting resources for data to be transmitted; performing a first resource reselection after the initial resource selection is initiated and before the UE announces resources, and when a first sidelink control signaling (SCI) transmitted by other UE is received and a predefined condition for triggering resource reselection is met, wherein a resource reserved by the other UE indicated in the first SCI is at least one of the resources temporarily selected by the UE; transmitting Physical Sidelink Control Channel (PSCCH) or Physical Sidelink Shared Channel (PSSCH) on first resource according to a result of the first resource reselection, and announcing other resources except the first resource through the transmitted SCI. In this way, the UE autonomous resource allocation of the NR V2X system in Mode 2 is achieved.

Those skilled in the art can understand that computer program instructions can be used to implement each block in these structural diagrams and/or block diagrams and/or flow diagrams and a combination of these structural diagrams and/or block diagrams and/or flow diagrams. Those skilled in the art may understand that these computer program instructions may be provided to a general purpose computer, a dedicated computer, or a processor specified by other programmable data processing methods to implement, so that a computer or a processor specified by other programmable data processing method is used to execute a scheme specified in a block or blocks of the structural diagram and/or block diagram and/or flow diagram disclosed in the present application.

Those skilled in the art can understand that the steps, measures, solutions in various operations, methods, flows that have been discussed in this application can be alternated, modified, combined, or deleted. Further, the other steps, measures, solutions in various operations, methods, flows that have been discussed in this application can also be alternated, modified, rearranged, decomposed, combined, or deleted. Further, the steps, measures, solutions in various operations, methods, flows, in prior art, disclosed in this application can also be alternated, modified, rearranged, decomposed, combined, or deleted.

The above description is only part of the implementation of the present application. It should be noted that, for those of ordinary skill in the art, without departing from the principles of the present application, several improvements and retouches can be made, which are also within the protection scope of this application.

Embodiment 3

Example 1

An embodiment of the present disclosure provides a power control method used in a first UE. A schematic flowchart of the method is shown in FIG. 24. The method includes the following steps.

Step 2401: configuration information for sidelink pathloss-based power control of a physical sidelink control channel (PSCCH) and/or a physical sidelink shared channel (PSSCH) transmitted by the first UE is obtained, and the configuration information indicates closed loop power control.

Step 2402: sidelink transmit power control command transmitted by a second UE is received.

Step 2403: transmit power of the PSCCH and/or PSSCH transmitted to the second UE is determined based on the sidelink transmit power control command.

It should be noted that the transmit power control command for the sidelink pathloss-based closed loop power control is simply referred to as the sidelink transmit power control command.

In an embodiment of the present disclosure, it may obtain configuration information for sidelink pathloss-based power control of a physical sidelink control channel (PSCCH) and/or a physical sidelink shared channel (PSSCH) transmitted by the first UE, the configuration information indicating closed loop power control; receive sidelink transmit power control command transmitted by a second UE; and determine transmit power of the PSCCH and/or PSSCH transmitted to the second UE based on the sidelink transmit power control command. As such, the sidelink pathloss-based closed loop power control is achieved.

Alternatively, the determining transmit power of the PSCCH and/or PSSCH transmitted to the second UE based on the sidelink transmit power control command includes: transmitting the sidelink transmit power control command to a base station; receiving a sidelink transmit power control command transmitted by the base station for the PSCCH and/or PSSCH transmitted by the first UE to the second UE; and determining transmit power of the PSCCH and/or PSSCH transmitted to the second UE based on the sidelink transmit power control command transmitted by the base station.

Alternatively, the configuration information is included in the configuration information of a resource pool; or the configuration information is configured for each UE.

Alternatively, the closed loop power control indicated by the configuration information takes effect when at least one of the following conditions is met: channel busy ratio (CBR) measured by the first UE on the transmission resource pool is greater than a predefined or preconfigured threshold; and sidelink power head room (SL PHR) of the PSCCH and/or PSSCH transmitted by the first UE to the second UE is lower than a predefined or preconfigured threshold.

Alternatively, the determining the transmit power of the PSCCH and/or PSSCH includes: determining the smallest one of the following as the transmit power of the PSCCH and/or PSSCH: the maximum sidelink transmit power, the maximum sidelink transmit power configured based on the priority of the data carried by the PSSCH and the CBR range measured on the resource pool, the downlink pathloss-based transmit power, and the sidelink pathloss-based transmit power determined based on the sidelink transmit power control command.

Alternatively, the determining the sidelink pathloss-based transmit power based on the sidelink transmit power control command includes any one of the following: determining the sidelink pathloss-based transmit power based on accumulated value of the currently received sidelink transmit power control command and the previously received sidelink transmit power control command; and determining the sidelink pathloss-based transmit power based on the currently received sidelink transmit power command.

Alternatively, the receiving the sidelink transmit power control command transmitted by the second UE includes: receiving the sidelink transmit power control command transmitted by the second UE through a physical sidelink feedback channel (PSFCH).

Alternatively, the receiving the sidelink transmit power control command transmitted by the second UE through the physical sidelink feedback channel (PSFCH) includes any one of the following: receiving the sidelink transmit power control command indicated by the transmission parameter of the PSFCH; receiving the sidelink transmit power control command indicated by the acknowledgment (ACK) or non-acknowledgement (NACK) information carried by the PSFCH; and receiving the sidelink transmit power control command indicated by information bits carried by the PSFCH.

Alternatively, the receiving the sidelink transmit power control command indicated by the transmission parameter of the PSFCH includes at least one of the following: receiving the sidelink transmit power control command indicated by a signal sequence of the PSFCH; receiving the sidelink transmit power control command indicated by a demodulation reference signal (DMRS) of the PSFCH; receiving the sidelink transmit power control command indicated by an orthogonal cover code (OCC) of the PSFCH; and receiving the sidelink transmit power control command indicated by a resource of the PSFCH.

Alternatively, the receiving the sidelink transmit power control command indicated by the acknowledgment (ACK) or non-acknowledgement (NACK) information carried by the PSFCH includes: when the received feedback information carried by the PSFCH is ACK, the sidelink transmit power control command is to reduce the transmit power by a predefined or preconfigured value; and when the received feedback information carried by the PSFCH is NACK, the sidelink transmit power control command is to increase the transmit power by a predefined or preconfigured value.

Alternatively, the receiving the sidelink transmit power control command indicated by information bits carried by the PSFCH includes: multiplexing the information bits of the received sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the receiving the sidelink transmit power control command transmitted by the second UE includes: receiving the sidelink transmit power control command transmitted by the second UE through a media access control control element (MAC CE).

Alternatively, the sidelink transmit power control command is applied to the PSCCH and/or PSSCH transmitted by the first UE to the second UE during a preset time.

Alternatively, the sidelink control information (SCI) is used to indicate whether the second UE is triggered to transmit the sidelink transmit power control command to the first UE.

An embodiment of the present disclosure provides another power control method used in a second UE. A schematic flowchart of the method is shown in FIG. 23. The method includes the following steps.

Step 2301: configuration information for sidelink pathloss-based power control of a physical sidelink control channel (PSCCH) and/or a physical sidelink shared channel (PSSCH) received by the second UE is obtained, and the configuration information indicates closed loop power control;

Step 2302: a sidelink transmit power control command is transmitted to a first UE.

Step 2303: the PSCCH and/or PSSCH transmitted by the first UE is received, where transmit power of the PSCCH and/or PSSCH is determined based on the sidelink transmit power control command transmitted by the second UE.

In the embodiment of the present disclosure, the sidelink pathloss-based closed loop power control is achieved.

Alternatively, the transmit power of the PSCCH and/or PSSCH being determined based on the sidelink transmit power control command transmitted by the second UE includes: transmitting, by the first UE, the received sidelink transmit power control command transmitted by the second UE to a base station; transmitting, by the base station, the sidelink transmit power control command for the PSCCH/PSSCH to the first UE; and the transmit power of the PSCCH and/or PSSCH is determined based on the sidelink transmit power control command transmitted by the base station.

Alternatively, the obtaining configuration information for sidelink pathloss-based power control includes: receiving radio resource control (RRC) signaling of the PC5 interface transmitted by the first UE; and obtaining the configuration information based on the RRC signaling.

Alternatively, the transmitting the sidelink transmit power control command to the first UE includes: transmitting the sidelink transmit power control command through a physical sidelink feedback channel (PSFCH).

Alternatively, the transmitting the sidelink transmit power control command through the PSFCH includes any of the following: indicating the sidelink transmit power control command by the transmission parameter of the PSFCH; indicating the sidelink transmit power control command by the acknowledgment (ACK) or non-acknowledgement (NACK) information carried by the PSFCH; and indicating the sidelink transmit power control command by information bits carried by the PSFCH.

Alternatively, the indicating the sidelink transmit power control command by the transmission parameter of the PSFCH includes at least one of the following: indicating the sidelink transmit power control command by a signal sequence of the PSFCH; indicating the sidelink transmit power control command by a demodulation reference signal (DMRS) of the PSFCH; indicating the sidelink transmit power control command by an orthogonal cover code (OCC) of the PSFCH; and indicating the sidelink transmit power control command by a resource of the PSFCH.

Alternatively, the indicating the sidelink transmit power control command by the acknowledgment (ACK) or non-acknowledgement (NACK) information carried by the PSFCH includes: when the feedback information carried by the PSFCH is ACK, the sidelink transmit power control command is to reduce the transmit power by a predefined or preconfigured value; and when the feedback information carried by the PSFCH is NACK, the sidelink transmit power control command is to increase the transmit power by a predefined or preconfigured value.

Alternatively, the indicating the sidelink transmit power control command by information bits carried by the PSFCH includes: multiplexing the information bits of the sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the transmitting the sidelink transmit power control command to the first UE includes: transmitting the sidelink transmit power control command through a media access control control element (MAC CE).

Alternatively, the sidelink transmit power control command is applied to the PSCCH and/or PSSCH transmitted by the first UE to the second UE during a preset time.

Alternatively, based on the indication in the sidelink control information (SCI) transmitted by the first UE to the second UE, determining whether to trigger the transmission of the sidelink transmit power control command to the first UE.

The power control method of the above-mentioned embodiments of the present disclosure is comprehensively and thoroughly described through the following embodiments.

In the following embodiments, for convenience of description, a UE that transmits a PSCCH/PSSCH in a sidelink communication system is referred to as a TX UE, and a corresponding UE that receives the PSCCH/PSSCH is referred to as an RX UE.

Alternatively, the first UE is a TX UE, and the second UE is an RX UE.

Alternatively, the unicast transmission between the TX UE and the RX UE is configured with the sidelink pathloss-based closed loop power control, and the TX UE calculates transmit power of unicast PSCCH/PSSCH transmitted to the RX UE based on the transmit power control command (SL TPC Command).

In Mode 2 based on distributed resource allocation, the SL TPC Command used to calculate the power of PSCCH/PSSCH is fed back by the RX UE to the TX UE. In Mode 1 based on localized resource allocation, the TX UE may directly calculate the power of PSCCH/PSSCH based on the SL TPC Command fed back by the RX UE; or, the TX UE cannot calculate the power of PSCCH/PSSCH based on the SL TPC Command fed back by the RX UE, but report the SL TPC Command fed back by the RX UE to the base station, and then receive the SL TPC Command to be used that is indicated by the base station through downlink control information (DCI) for allocating sidelink resources, and then calculate the power of PSCCH/PSSCH based on the SL TPC Command to be used. The SL TPC Command value to be used that is indicated by the base station through DCI and the SL TPC Command value fed back by the RX UE may be the same or different.

Alternatively, seeing from the action of the TX UE side, this embodiment includes the following steps.

Step 1: the TX UE receives configuration information for sidelink pathloss-based power control of a physical sidelink control channel (PSCCH) and/or a physical sidelink shared channel (PSSCH) transmitted by itself; the configuration information indicates closed loop power control.

Step 2: the TX UE receives SL TPC Command of the sidelink pathloss-based closed loop power control.

Step 3: the TX UE calculates the power of the PSCCH/PSSCH transmitted to the RX UE based on the received SL TPC Command.

Alternatively, seeing from the action of the RX UE side, this embodiment includes the following steps.

Step 1: the RX UE receives configuration information for sidelink pathloss-based power control of PSCCH and/or PSSCH received by itself, the configuration information indicates closed loop power control.

Step 2: the RX UE feeds the SL TPC Command of the sidelink pathloss-based closed loop power control back to the TX UE.

Step 3: the RX UE receives the PSCCH/PSSCH transmitted by the TX UE. The transmit power of the PSCCH/PSSCH is calculated based on the SL TPC Command fed back by the RX UE in the step 2; or, the transmit power of the PSCCH/PSSCH is calculated by the serving base station of the TX UE through the SL TPC Command indicated by DCI.

Alternatively, in the sidelink communication system, the sidelink pathloss-based power control method may include two types of open loop and closed loop. In the sidelink pathloss-based open loop power control method, the TX UE calculates the power of PSCCH/PSSCH transmitted to the RX UE based on the sidelink pathloss between it and the RX UE as well as the sidelink pathloss-based power control parameter; in the sidelink pathloss-based closed loop power control method, the TX UE calculates the power of the PSCCH/PSSCH transmitted to the UE based on the sidelink pathloss between it and the RX UE, the sidelink pathloss-based power control parameter, and the SL TPC Command of the sidelink pathloss-based closed loop power control. The purpose of the open loop transmit power is to adjust the signal power received by the RX UE to the desired value. The purpose of the closed loop transmit power is to adjust the signal power received by the RX UE to the target value. The closed loop transmit power differs from the open loop transmit power mainly in that the RX UE feeds back the difference between the received signal power and the target value to the TX UE, then the TX UE may adjust the transmit power of the PSCCH/PSSCH based on the power difference fed back by the RX UE, to make the receiving power of PSCCH/PSSCH as close to the target value as possible.

An aspect: the configuration of sidelink closed loop power control

In the sidelink communication system, the sidelink pathloss-based power control method may be configured as open loop or closed loop. Regardless of open loop or closed loop, the corresponding power control parameter includes the target receiving power $P_{o\_SLPL}$ and the pathloss compensation factor $a_{SLPL}$. The TX UE receives configuration information for sidelink pathloss-based power control of PSCCH/PSSCH transmitted by itself. The configuration information includes not only power control parameters $P_{o\_SLPL}$ and $a_{SLPL}$, but also an indication for applying open loop power control or closed loop power control.

Alternatively, the TX UE may obtain the configuration information in any one of the following ways.

1. The system configures the sidelink pathloss-based power control of PSCCH/PSSCH transmitted on the resource pool for each resource pool. That is, all unicast transmissions on the same resource pool may use the same configuration information for sidelink pathloss-based power control. The TX UE obtains configuration information for sidelink pathloss-based power control based on the configuration information of the transmission resource pool.
2. The system configures sidelink pathloss-based power control for each UE. That is, different UEs on the same resource pool may have different configuration information for sidelink pathloss-based power control. For example, the sidelink pathloss-based closed loop power control is configured for unicast transmission of some UEs, while the sidelink pathloss-based open loop power control is configured for unicast transmission of other UEs.

Alternatively, the closed loop power control indicated in the above configuration information takes effect only when certain conditions are met. For example, the closed loop power control indicated in the configuration information takes effect only when at least one of the following conditions is met.

1. Whether to use the sidelink pathloss-based closed loop power control is depended on CBR. For example, when the CBR on a resource pool is higher than a predefined or preconfigured CBR threshold, the sidelink pathloss-based closed loop power control is used, otherwise, sidelink pathloss-based open loop power control is used. The CBR herein is the CBR measured by the TX UE on the transmission resource pool.
2. Whether to use the sidelink pathloss-based closed loop power control is depended on the SL PHR of the TX UE. For example, when the SL PHR of the TX UE is higher than a pre-defined or preconfigured PHR threshold, the sidelink pathloss-based closed loop power control is used, otherwise, sidelink pathloss-based open loop power control is used. Herein, SL PHR refers to the difference between the transmit power of PSCCH/PSSCH and the maximum sidelink transmit power.

The RX UE receives configuration information for sidelink pathloss-based power control of PSCCH and/or PSSCH received by itself, the configuration information may include power control parameters, such as $P_{o\_SLPL}$ and $a_{SLPL}$, and an indication for applying open loop power control or closed loop power control; or, the configuration information only indicates to apply open loop power control or closed loop power control. If the configuration information received by the RX UE indicates closed loop power control, the RX UE should transmit a sidelink transmit power control command (SL TPC Command) to the TX UE. Alternatively, the system configures sidelink pathloss-based closed loop power control for each resource pool. That is, all unicast transmissions on the same resource pool may use the same configuration information for sidelink pathloss-based power control. The RX UE obtains the configuration information for sidelink pathloss-based closed loop power control according to the configuration information of the receiving resource pool. Herein, for the TX UE, the configuration information for sidelink pathloss-based closed loop power control is obtained according to the configuration information of the transmission resource pool. Alternatively, the configuration information received by the RX UE takes effect only when certain conditions are met. For example, whether to use the sidelink pathloss-based closed loop power control is depended on CBR. When CBR on a resource pool is higher than a pre-defined or preconfigured CBR threshold, the sidelink pathloss-based closed loop power control is used, otherwise, the sidelink pathloss-based open loop power control is used. The CBR herein is the CBR measured by the RX UE on the receiving resource pool.

Alternatively, the TX UE indicates to the RX UE through the radio resource control (RRC) signaling of the PC5 interface the configuration information for sidelink pathloss-based power control of the PSCCH/PSSCH transmitted by the TX UE to the RX UE, that is, the RX UE obtains the configuration information for the sidelink pathloss-based closed loop power control of the PSCCH/PSSCH received by itself according to the received PC5 RRC signaling transmitted by the TX UE.

A second aspect: the TX UE calculates transmit power of the PSCCH/PSSCH based on SL TPC Command.

In the third step of the embodiment, the TX UE calculates the transmit power of the PSCCH/PSSCH based on the received SL TPC Command. Taking the PSSCH as an example, the TX UE may calculate the transmit power of the PSSCH based on the following formula (1):

$$P_{PSSCH}(i) = \min \begin{Bmatrix} P_{CMAX}, \\ P_{MAX\_CBR}, \\ P_{o\_DLPL} + a_{DLPL} \cdot PL_{DL} + 10\log_{10}(2^u \cdot M_{RB}^{PSSCH}(i)), \\ P_{o\_SLPL} + a_{SLPL} \cdot PL_{SL} + 10\log_{10}(2^u \cdot M_{RB}^{PSSCH}(i)) + f_{SL}(i) \end{Bmatrix}$$

Where, the first item $P_{CMAX}$ in formula (1) is the maximum sidelink transmit power of the UE, and the maximum sidelink transmit power is depended on the capability or type of the UE.

The second item $P_{MAX\_CBR}$ in formula (1) is the maximum sidelink transmit power (maxTxpower) configured based on the priority of the data carried by the PSSCH and the CBR range measured on the resource pool. The CBR is an CRB measured most recently before the preparation time of the PSSCH transmission, for example, the CBR measured on the fourth slot before the PSSCH.

The third item $P_{o\_DLPL} + a_{DLPL} \cdot PL_{DL} + 10 \log_{10}(2^u \cdot M_{RB}^{PSSCH}(i))$ in formula (1) is the open loop transmit power calculated based on the downlink pathloss. If the TX UE is in coverage (IC) of the cellular network, when the downlink pathloss-based open loop power control is configured, it may include this item. If the TX UE is out of coverage (OOC) of the cellular network, it does not need to include this item. Herein, $P_{o\_DLPL}$ and $a_{DLPL}$ are the power control parameters configured for the downlink pathloss, which are the target receiving power and the pathloss compensation factor, respectively; $PL_{DL}$ is the downlink pathloss between the TX UE and the serving base station, and $M_{RB}^{PSSCH}(i)$ is the number of resource blocks (RB) included in the bandwidth used for the current PSSCH transmission, u is determined by the configured subcarrier interval, and the calculation relationship between u and the subcarrier interval is shown in Table 2 below.

TABLE 2

| the calculation relationship between u and the subcarrier interval | |
| --- | --- |
| u | $\Delta f = 2^u \cdot 15$ [kHz] |
| 0 | 15 |
| 1 | 30 |
| 2 | 60 |
| 3 | 120 |
| 4 | 240 |

The fourth item $P_{o\_SLPL} + a_{SLPL} \cdot PL_{SL} + 10 \log_{10}(2^u \cdot M_{RB}^{PSSCH}(i)) + f(i)$ in formula (1) is the closed loop transmit power calculated based on the sidelink pathloss. If the sidelink pathloss-based closed loop power control is disabled, this item is $P_{o\_SLPL} + a_{SLPL} \cdot PL_{SL} + 10 \log_{10}(2^u \cdot M_{RB}^{PSSCH}(i))$, that is, the sidelink power control adjustment item f(i) is not included. Herein, $P_{o\_SLPL}$ and $a_{SLPL}$ are the power control parameters configured for the sidelink pathloss, which are the target receiving power and the pathloss compensation factor respectively, $PL_{SL}$ is the downlink pathloss between the TX UE and the RX UE, and $M_{RB}^{PSSCH}(i)$ is the number of resource blocks (RB) included in the bandwidth used for the current PSSCH transmission occasion i, u is determined by the configured subcarrier interval, and $f_{SL}(i)$ is a sidelink power control adjustment item for the current PSSCH transmission occasion i. Alternatively, $f_{SL}(i)=f_{SL}(i-1)+\delta_{SL}(i)$, where $f_{SL}(i-1)$ are the sidelink power control adjustment item of the previous PSSCH transmission occasion i-1, and $\delta_{SL}(i)$ is the SL TPC Command corresponding to the current PSSCH transmission occasion. It can be seen from the formula that the sidelink power control adjustment item of the current PSSCH transmission is an accumulation of the SL TPC Command and the sidelink power control adjustment item of the previous PSSCH transmission, that is, the transmit power of the currently transmitted PSSCH is determined according to the accumulation value of the latest received SL TPC Command and the previous received SL TPC Command. This power adjustment method is referred to as accumulation power adjustment. The SL TPC Command transmitted through PSFCH described below is more suitable for this accumulation power adjustment.

For the PSSCH transmission using the sidelink pathloss-based closed loop power control for the first time, it may set $f_{SL}(i)=\delta_{SL}(i)$, that is, it assumes that the sidelink power control adjustment item $f_{SL}(i-1)$ of the previous PSSCH transmission is 0. After the sidelink pathloss-based closed loop power control is enabled, the sidelink power control adjustment item can also be reset, that is $f_{SL}(i)=\delta_{SL}(i)$, alternatively, when at least one of the following situations occurs, the sidelink power control adjustment item should be reset:

1. the sidelink pathloss-based power control parameters $P_{o\_SLPL}$ or $a_{SLPL}$ are reconfigured;
2. the PC5 RRC connection between the TX UE and the RX UE is re-established;
3. the interval between the PSSCH transmission time of the current transmission occasion i and the PSSCH transmission time of the previous transmission occasion i−1 is greater than a predefined or preconfigured threshold.

Alternatively, $f_{SL}(i)=\delta_{SL}(i)$, where $\delta_{SL}(i)$ is the SL TPC Command corresponding to the current PSSCH transmission occasion. It can be seen from the formula that the sidelink power control adjustment item of the current PSSCH transmission is the corresponding TPC Command, which is independent of the sidelink power control adjustment item of the previous PSSCH transmission, that is, the transmit power of the currently transmitted PSSCH is determined based on the latest received SL TPC Command. The transmit power of the currently transmitted PSSCH is only depended on the latest received SL TPC Command, and it is independent of the previously received SL TPC Command. This power adjustment method is referred to as non-accumulation power adjustment, which is also referred to as one-time power adjustment. The TPC Command transmitted through MAC CE described below is more suitable for this one-time power adjustment.

Alternatively, $f_{SL}(i)=f_{SL}(i-1)+\delta_{SL}(i)$ or $f_{SL}(i)=\delta_{SL}(i)$, of which is used to determine the transmit power of PSSCH depends on the manner in which the received SL TPC Command is indicated. If the received $\delta_{SL}(i)$ is carried by physical layer signaling, for example, $\delta_{SL}(i)$ is indicated by the RX UE through the PSFCH, or it is indicated by the base station through DCI, $f_{SL}(i)=f_{SL}(i-1)+\delta_{SL}(i)$ is used to determine the transmit power of the PSSCH. If the received $\delta_{SL}(i)$ is carried by higher layer signaling, for example, it is indicated by the RX UE through MAC CE, or indicated by the base station through MAC CE, $f_{SL}(i)=\delta_{SL}(i)$ is used to determine the transmit power of the PSSCH. If the PSSCH corresponding to the same transmission occasion receives two SL TPC Commands, which are carried by physical layer signaling and higher layer signaling, respectively, the system specifies that the SL TPC Command carried by higher layer signaling has higher priority, or, SL TPC Command carried by physical layer signaling has higher priority.

Alternatively, the SL TPC command has a validity period, that is, the power adjustment indicated by the SL TPC command can only be applied within the validity period. For example, if the interval between the receiving time of the SL TPC Command and the transmission time of the PSSCH using the SL TPC Command exceeds the validity period of the SL TPC Command, the SL TPC Command should not be used. The validity period of SL TPC command can be predefined or pre-configured.

Alternatively, the sidelink pathloss-based closed loop power control is applicable to both the PSSCH and the PSCCH. Alternatively, the sidelink pathloss-based closed loop power control is only applied to the PSSCH, not to the PSCCH, that is, the PSCCH uses the sidelink pathloss-based open loop power control method, and its associated PSSCH may use the sidelink pathloss-based closed loop power control method.

Alternatively, the PSCCH and the associated PSSCH use the same sidelink power control adjustment item $f_{SL}(i)$ and the same SL TPC Command $\delta_{SL}(i)$. Alternatively, the PSCCH and the associated PSSCH use different sidelink power control adjustment item $f_{SL}(i)$ and different SL TPC Command $\delta_{SL}(i)$, that is, the TX UE needs to respectively determine the corresponding $f_{PSSCH}(i)$ and $f_{PSCCH}(i)$ for the PSSCH and PSCCH, and respectively determine the corresponding $\delta_{PSSCH}(i)$ and $\delta_{PSCCH}(i)$.

A third aspect: the RX UE feeds back SL TPC Command through the PSFCH

Alternatively, in the second step of the embodiment, the RX UE may feed back the SL TPC Command to the TX UE through a physical sidelink feedback channel (PSFCH). That is, the TX UE determines the SL TPC Command of PSCCH/PSSCH through the received PSFCH. In the NR V2X system, the PSFCH is mainly used to feedback the ACK or NACK of the PSSCH. When the ACK/NACK feedback of unicast transmission between the TX UE and the RX UE is enabled, the RX UE should transmit the corresponding PSFCH for the received PSSCH. From the perspective of system, the PSFCH resource and the PSCCH/PSSCH resource have a predefined mapping relationship, and the RX UE may determine the corresponding PSFCH resource according to the PSCCH/PSSCH resource and the Source ID indicated within the SCI.

Alternatively, the SL TPC Command may be implicitly indicated through the transmission parameters of the PSFCH. For example, SL TPC Command may be implicitly indicated by using at least one of the following transmission parameters of the PSFCH.

1. SL TPC Command is implicitly indicated through demodulation reference signal (DMRS) of the PSFCH. For example, SL TPC Command may be implicitly indicated through at least one of DMRS sequence, DMRS pattern, DMRS cyclic shift, ini-tialization seed for generating DMRS sequence, and DMRS antenna port used by the PSFCH. For example, the 2 bits of SL TPC Command information may be implicitly indicated through 4 kinds of different PSFCH DMRS cyclic shift. The TX UE performs blind detection on the DMRS cyclic shift used by the PSFCH to determine the SL TPC Command information carried thereon.
2. SL TPC Command is implicitly indicated through orthogonal cover code (OCC) of the PSFCH. The OCC of the PSFCH may span OFDM symbols, time slots, PRBs, or subchannels. The specific OCC depends on the design of the PSFCH and will not be described in detail herein. For example, the 2 bits of SL TPC Command may be implicitly indicated through 4 kinds of different PSFCH OCCs. The TX UE performs blind detection on the OCCs used by the PSFCH to determine the SL TPC Command information carried thereon.
3. SL TPC Command is implicitly indicated through resources of PSFCH. For example, the 2 bits of SL TPC Command may be implicitly indicated through 4 kinds of different resources of PSFCH. The TX UE performs blind detection on the resources used by the PSFCH to determine the SL TPC Command information carried thereon.
4. SL TPC Command is implicitly indicated through signal sequence of the PSFCH. For example, the 2 bits of SL TPC Command may be implicitly indicated through 4 kinds of different signal sequences of the PSFCH, and the TX UE performs blind detection on the signal sequence used by the PSFCH to determine the SL TPC Command information carried thereon.

Alternatively, the SL TPC Command is explicitly indicated by the information bits carried on the PSFCH. For example, the information bits of the SL TPC Command may be multiplexed with the ACK/NACK bits and transmitted through the PSFCH, that is, the information bits of the SL TPC Command and the ACK/NACK bits are multiplexed together, and then are encoded, modulated, and performed resource mapping. In particular, in order not to affect the use of the HARQ-ACK codebook, the information bits of the SL TPC Command are placed after all ACK/NACK bits.

Alternatively, the SL TPC Command is implicitly indicated through the ACK/NACK information carried on the PSFCH. For example, if the feedback information carried on the PSFCH is ACK, the sidelink transmit power control command is to decrease the predefined or preconfigured power value; if the feedback information carried on the PSFCH is NACK, the sidelink transmit power control command is to increase predefined or preconfigured power value.

Alternatively, the interpretation of the information bits of the SL TPC Command is depended on ACK/NACK. For example, suppose that the information bit of SL TPC Command is 1 bit, the indication value of 0 indicates that the power does not need to be adjusted, the indication value of 1 indicates that the power needs to be adjusted, and the adjustment value is a pre-defined or preconfigured value. The specific power adjustment that is an upward adjustment or downward adjustment is depended on whether the HARQ-ACK transmitted together is ACK or NACK. When the HARQ-ACK transmitted together is ACK, the power adjustment is a downward adjustment. When the HARQ-ACK transmitted together is NACK, the power adjustment is an upward adjustment. In addition, the value of downward adjustment and the value of upward adjustment may be two different values.

The minimum granularity of power adjustment indicated by the SL TPC Command is defined as the step of adjustment. Alternatively, the value of step may be predefined or preconfigured. For example, the step of power adjustment may be specified as 1 dB; or, the step of power adjustment may be specified as n dB, where n is a configurable value.

Alternatively, the step of power adjustment indicated by the SL TPC Command is depended on ACK/NACK. For example, when the HARQ-ACK transmitted together is ACK, the power adjustment is a downward adjustment, and the step of adjustment is 0.5 dB; when the HARQ-ACK transmitted together is NACK, the power adjustment is an upward adjustment, and the step of adjustment is 1 dB.

In the NR V2X system, the unicast transmission between the TX UE and the RX UE may support ACK/NACK feedback-based retransmission, that is, the RX UE needs to transmit the PSFCH, and the TX UE determines whether to retransmit the PSSCH according to the received PSFCH. The unicast transmission between the TX UE and the RX UE may also support blind retransmission, that is, the RX UE does not need to transmit the PSFCH, and the TX UE always blindly retransmits the PSSCH. Whether to support HARQ-ACK feedback may be preconfigured through high layer signaling. After enabling ACK/NACK feedback through high layer signaling, the TX UE may also dynamically indicate through SCI whether the currently transmitted PSSCH needs to feed back ACK/NACK. if the SCI indicates that the currently transmitted PSSCH needs to feed back ACK/NACK, the RX UE needs to transmit the PSFCH to feed back the ACK/NACK of the PSSCH; if the SCI indicates that the currently transmitted PSSCH does not need to feed back ACK/NACK, the RX UE does not need to transmit the PSFCH.

Alternatively, only after the ACK/NACK feedback of the unicast transmission between the TX UE and the RX UE is enabled, when the RX UE needs to feedback the ACK/NACK to transmit the PSFCH, the SL TPC Command is transmitted through the PSFCH, that is, the PSFCH is used for transmission of information including only ACK/NACK, or for transmission of information including ACK/NACK and SL TPC Command, but cannot be used for transmission of information including only SL TPC Command.

Alternatively, even if the ACK/NACK feedback of unicast transmission between the TX UE and the RX UE is disenabled, the adjustment amount of the sidelink power may be transmitted through the PSFCH, that is, the PSFCH may be used for transmission of information including only ACK/NACK information, or for transmission of information including only SL TPC Command, or for transmission of information including ACK/NACK and SL TPC Command. When the PSFCH is used for transmission of information including only SL TPC Command, the method for determining the PSFCH resource is the same as the method for determining the PSFCH used for ACK/NACK feedback. For example, the RX UE determines the corresponding PSFCH resource based on the PSCCH/PSSCH resource and source ID indicated in the SCI.

Alternatively, the sidelink pathloss-based closed loop power control can be enabled through high layer signaling only if ACK/NACK feedback for unicast transmission between TX UE and RX UE is enabled through high layer signaling. If the TX UE indicates in the SCI that the RX UE needs to feed back the ACK/NACK of the currently transmitted PSSCH, the PSFCH transmitted by the RX UE carries the SL TPC Command in addition to the ACK/NACK; if the TX UE indicates in the SCI that the RX UE does not need to feed back the ACK/NACK of the currently transmitted PSSCH, the RX UE does not need to transmit the PSFCH, or not need to feed back the SL TPC Command through other methods other than the PSFCH; that is, the RX UE does not feed back the SL TPC Command to the TX UE for each received PSSCH; the TX UE can assume that SL TPC Command is 0 for the case of PSFCH not being transmitted, that is, the power does not need to be adjusted.

Alternatively, the sidelink pathloss-based closed loop power control can be enabled through high layer signaling only if the ACK/NACK feedback for unicast transmission between TX UE and RX UE has been enabled through high layer signaling. If the TX UE indicates in the SCI that the RX UE needs to feed back the ACK/NACK of the currently transmitted PSSCH, the PSFCH transmitted by the RX UE carries the SL TPC Command in addition to the ACK/NACK; if the TX UE indicates in the SCI that the RX UE does not need to feed back the ACK/NACK of the currently transmitted PSSCH, the RX UE still transmits the PSFCH, which is only used to feed back the SL TPC Command, that is, the RX UE may feed back the SL TPC Command to the TX UE for each received PSSCH.

Alternatively, the enabled/disabled of the sidelink pathloss-based closed loop power control is independent of the enabled/disabled of ACK/NACK feedback of PSSCH. Even if the ACK/NACK feedback of unicast transmission between TX UE and RX UE fails to be enabled through high layer signaling, the sidelink pathloss-based closed loop power control can still be enabled, and as long as the sidelink pathloss-based closed loop power control is enabled, the PSCCH/PSSCH resources should have corresponding PSFCH resources for feedback SL TPC Command.

A fourth aspect: the RX UE feeds back SL TPC Command through MAC CE

Alternatively, in the second step of the embodiment, the TX UE may determine the SL TPC Command used to calculate the transmit power of the PSCCH/PSSCH according to the received MAC CE. For example, the RX UE indicates the SL TPC Command to the TX UE through the MAC CE, that is, the SL TPC Command is transmitted through the PSSCH; or the base station indicates the SL TPC Command to the TX UE through the MAC CE.

Alternatively, the system defines MAC CE including one byte (8 bits) for SL TPC Command, of which 4 bits are used to indicate SL TPC Command, and the other 4 bits are used as reserved bits.

Alternatively, as mentioned above, the SL TPC Command carried by MAC CE may use non-accumulation power adjustment. In addition, the SL TPC Command carried by the MAC CE is not only applied to the PSSCH of one transmission occasion, but also is applied to the PSSCH transmitted during a period of time (preset time). For example, the TX UE applies the received SL TPC Command to all subsequent unicast PSSCHs transmitted to the RX UE until the latest SL TPC Command is received.

Alternatively, the earliest applying time of the MAC CE indicating SL TPC Command is after a predefined or pre-configured time interval. For example, it is supposed that the TX UE receives the MAC CE indicating the SL TPC Command transmitted by the RX UE in the time slot n, then the TX UE may apply the received SL TPC Command to the PSSCH at the earliest in the time slot $n+3 \cdot N_{slot}^{subframe,u}+1$. Herein, $N_{slot}^{subframe,u}$ is the number of time slots contained in a subframe in the case of subcarrier interval used by the current PSSCH; or, the TX UE can apply the received SL TPC Command to the PSSCH at the earliest in the time slot $n+k_1+3 \cdot N_{slot}^{subframe,u}+1$, where $k_1$ is the time for the TX UE performing the HARQ-ACK feedback for the PSSCH supporting the MAC CE indicating the SL TPC Command, that is, the time interval between the PSFCH used to carry the HARQ-ACK and the corresponding PSSCH.

A fifth aspect: under certain conditions, the RX UE does not need to feed back SL TPC Command for the received PSSCH When the sidelink pathloss-based closed loop power control is enabled through higher-layer signaling, the RX UE should feed back the corresponding SL TPC Command based on each received unicast PSSCH transmitted by the TX UE. In order to reduce signaling overhead, under certain conditions, the TX UE may dynamically indicate the RX UE through SCI without feedback of the SL TPC Command based on the currently transmitted PSSCH. When the SCI indicates that the RX UE needs to feed back the SL TPC Command, the RX UE should feed back the SL TPC Command to the TX UE. The TX UE would use the received SL TPC Command for the next PSSCH transmission; otherwise, the RX UE does not need to feed back SL TPC Command to the TX UE. The TX UE assumes that the SL TPC Command of the next PSSCH transmission is 0.

Alternatively, the TX UE may indicate whether the RX UE feeds back the SL TPC Command through the SCI, that is, the TX UE may indicate whether to trigger the RX UE to feed back the SL TPC Command to the TX UE through the SCI. In some cases, the SL TPC Command which is fed back by the RX UE to the TX UE may not make any sense, the SCI may be used to indicate that the RX UE does not need to feed back the SL TPC Command, thereby saving signaling overhead for SL TPC Command transmission.

Alternatively, when at least one of the following conditions is met, the TX UE may indicate through SCI that the RX UE does not need to feed back the SL TPC Command.
1. The actual transmit power of the currently transmitted PSSCH is the maximum sidelink transmit power $P_{CMAX}$, that is, the value of the first item $P_{CMAX}$ of the four items in the calculation formula of the PSSCH power described above is the smallest.
2. The actual transmit power of the currently transmitted PSSCH is the preconfigured sidelink maximum transmit power $P_{MAX\_CBR}$ related to the data priority and CBR range, that is, the value of the second item $P_{MAX\_CBR}$ of the four items in the calculation formula of the PSSCH power described above is the smallest.
3. The actual transmit power of the currently transmitted PSSCH is the open loop transmit power calculated based on the downlink pathloss, that is, the value of the third item $P_{o\_DLPL}+a_{DLPL} \cdot PL_{DL}+10 \log_{10}(2^u \cdot M_{RB}^{PSSCH}(i))$ of the four items in the calculation formula of the PSSCH power described above is the smallest.
4. The difference between the actual transmit power of the currently transmitted PSSCH and the maximum sidelink transmit power $P_{CMAX}$ is less than the predefined or preconfigured value.
5. The actual transmit power of the currently transmitted PSSCH is adjusted due to the overlap between the uplink and the sidelink.

Alternatively, the TX UE explicitly indicates through the SCI whether the RX UE needs to feed back the SL TPC Command based on the currently transmitted PSSCH. For example, the SCI contains a field dedicated to indicate whether the RX UE feeds back SL TPC Command.

Alternatively, the TX UE implicitly indicates through the SCI whether the RX UE needs to feed back the SL TPC Command based on the currently transmitted PSSCH. For example, the indication information of a certain field in the SCI implicitly indicates whether the RX UE feeds back SL TPC Command, that is, this field has a predefined binding relationship with whether to feedback SL TPC Command. This field is specifically used to indicate whether the transmit power of the currently transmitted PSSCH is calculated based on the downlink pathloss or the sidelink pathloss; or, this field is specifically used to indicate the difference between the actual transmit power of the currently transmitted PSSCH and the maximum sidelink transmit power, that is, the power head room (PHR).

A sixth aspect: TX UE reports PHR to RX UE

Alternatively, the TX UE informs the RX UE of the power head room of the PSCCH and/or PSSCH transmitted to the RX UE, that is, the power head room is calculated based on the pathloss between the TX UE and the RX UE. The RX UE may determine the value of the SL TPC Command transmitted to the TX UE based on the power head room of the PSSCH transmitted by the TX UE to the RX UE.

Alternatively, the TX UE informs the RX UE whether the power head room of the PSCCH and/or PSSCH transmitted to the RX UE is greater than or equal to 0, for example, the information may be indicated by SCI or MAC CE.

A seventh aspect: in mode 1, TX UE reports the SL TPC Command fed back by RX UE to the base station Alternatively, in mode 1 based on localized resource allocation, the sidelink resource is allocated by the base station through DCI. Another embodiment of this disclosure provides another power control method, the schematic flowchart of this method is shown in FIG. 22. The method includes the following steps:

Step 2201, when the sidelink pathloss-based closed loop power control is configured through higher layer signaling, the RX UE needs to transmit the SL TPC Command to the TX UE.

Step 2202, after receiving the SL TPC Command transmitted by the RX UE, the TX UE transmits the received SL TPC Command to the base station.

Step 2203, the base station determines the SL TPC Command to be used for the next PSSCH transmission transmitted by the TX UE to the RX UE based on the SL TPC Command transmitted by the TX UE, and indicates the SL TPC Command to be used by the TX UE through DCI that allocates sidelink resources.

Step 2204, the TX UE determines the transmit power of the PSCCH and/or PSSCH transmitted to the RX UE based on the SL TPC command transmitted by the base station.

Alternatively, the base station may indicate the sidelink transmit power control command of the PSCCH and/or PSSCH transmitted by the TX UE to the RX UE through the MAC CE.

Alternatively, in mode 1, the TX UE reports the received SL TPC Command fed back by the RX UE to the base station through the PUCCH, and the TX UE mul-tiplexes the SL TPC Command fed back by the RX UE with the HARQ-ACK of the PSSCH fed back by the RX UE and transmits them through the PUCCH.

Alternatively, in mode 1, the SL TPC Command δ(i) used to determine the sidelink power control adjustment item f(i) in the above PSSCH power calculation formula is indicated by the base station through DCI, that is, the DCI used to allocate sidelink resources indicates corresponding SL TPC Command in addition to the sidelink resources. If multiple PSSCH resources are allocated in the DCI used to allocate sidelink resources, the transmit power of the multiple PSSCHs uses the same sidelink power control adjustment item f(i), that is, which is determined by the sidelink power control adjustment item f(i−1) of the previously transmitted PSSCH and the SL TPC Command δ(i) indicated in the DCI.

Alternatively, in mode 1, whether the DCI used to allocate sidelink resources contains a field indicating SL TPC Command is configurable. If the base station configures that the DCI used to allocate sidelink resources contains a field indicating SL TPC Command, δ(i) used in the above formula for calculating the PSSCH power is the SL TPC Command indicated by the base station through DCI; if the base station configures that the DCI used to allocate sidelink resources does not contain a field indicating SL TPC Command, δ(i) used in the above formula for calculating the PSSCH power is the SL TPC Command fed back by the RX UE.

Alternatively, in mode 1, the TX UE can establish a PC5 RRC connection with multiple RX UEs at the same time, that is, the TX UE can transmit unicast traffics to the multiple RX UEs in a time-division manner, and the TX UE reports IDs of all RX UEs which establish a PC5 RRC connection with it to the base station. In addition, the TX UE can transmit multicast traffics to multiple groups in a time-division manner. The TX UE should report the IDs of all groups that transmit multicast traffics to the base station. The base station may indicate that the sidelink resource allocated by the DCI is used for broadcast, multicast and/or unicast transmission of the TX UE within the DCI allocating the sidelink resource. When the DCI indicates that the allocated sidelink resource is used for the multicast transmission of the TX UE, the DCI also indicates which group's multicast transmission the sidelink resource is used for, that is, indicates the group ID; and/or, when DCI indicates that the allocated sidelink resource is used for unicast transmission of the TX UE, the DCI also indicates which RX UE's unicast transmission the sidelink resource is used for, that is, indicates the ID of the RX UE.

Alternatively, in mode 1, the TX UE reports the TPC Command fed back by the RX UE to the serving base station, and when the TX UE establishes a PC5 RRC connection with multiple RX UEs at the same time, that is, the TX UE transmits unicast traffics to the multiple RX UEs in a time-division manner, the TX UE reports the respective feedback TPC Command for each RX UE. When reporting the SL TPC Command fed back by the RX UE to the base station, the TX UE also indicates the ID of the RX UE associated with the SL TPC Command.

Alternatively, in mode 1, the TX UE reports the difference between the transmit power of the PSCCH/PSSCH and the maximum sidelink transmit power to the serving base station. This difference is also called the SL power head room (SL PHR), when the TX UE establishes PC5 RRC connection with multiple RX UEs at the same time, that is, when the TX UE transmits unicast traffics to the multiple RX UEs in a time-division manner, the TX UE reports SL PHR for each RX UE; that is, the TX UE calculates the corresponding SL PHR for each RX UE based on the respective sidelink pathloss; when the TX UE reports the SL PHR to the serving base station, it also reports the ID of the RX UE associated with the SL PHR, the SL PHR is calculated based on the sidelink pathloss of the associated RX UE.

Alternatively, in mode 1, the TX UE reports the SL PHR to the serving base station. When the TX UE transmits unicast traffics to multiple RX UEs in a time-division manner, the TX UE selects the largest sidelink pathloss among all RX UEs to calculate the sidelink transmit power, and uses the difference between the calculated sidelink transmit power and the maximum sidelink transmit power as the reported SL PHR.

The ID of the above RX UE may be the destination ID indicated in the SCI; or, the ID of the RX UE may be a serial number of the RX UEs which establish the PC5 RRC connection with the TX UE. The TX UE numbers the RX UEs which establish the PC5 RRC connection with the TX UE based on a predefined or preconfigured range, and the specific number value depends on the TX UE implementation. The TX UE should use a different number for each RX UE with which the PC5 RRC connection is established. The system may specify the maximum number of RX UEs which establish the PC5 RRC connection with the same TX UE at the same time. Similarly, the above group ID may be the destination group ID indicated in the SCI; or, the group ID may be the serial number of the receiving groups for the TX UE transmitted multicast transmission.

The technical solution provided by the embodiments of the present disclosure has at least the following beneficial effects: the sidelink pathloss-based closed loop power control is achieved.

Example 2

Based on the same inventive concept of the foregoing embodiments, an embodiment of the present disclosure further provides a first UE. A schematic structural diagram of the first UE is shown in FIG. 25. The first UE 250 includes a first processing module 2501, a second processing module 2502 and a third processing module 2503.

The first processing module 2501 is configured to obtain configuration information for sidelink pathloss-based power control of a physical sidelink control channel (PSCCH) and/or a physical sidelink shared channel (PSSCH) transmitted by the first UE, the configuration information indicates closed loop power control.

The second processing module 2502 is configured to receive sidelink transmit power control command transmitted by a second UE.

The third processing module 2503 is configured to determine transmit power of the PSCCH and/or PSSCH transmitted to the second UE based on the sidelink transmit power control command.

Alternatively, the determining transmit power of the PSCCH and/or PSSCH transmitted to the second UE based on the sidelink transmit power control command includes: transmitting the sidelink transmit power control command to a base station; receiving a sidelink transmit power control command transmitted by the base station for the PSCCH and/or PSSCH transmitted by the first UE to the second UE; and determining transmit power of the PSCCH and/or PSSCH transmitted to the second UE based on the sidelink transmit power control command transmitted by the base station.

Alternatively, the configuration information is included in the configuration information of a resource pool; or the configuration information is configured for each UE.

Alternatively, the closed loop power control indicated by the configuration information takes effect when at least one of the following conditions is met: channel busy ratio (CBR) measured by the first UE on the transmission resource pool is greater than a predefined or preconfigured threshold; and sidelink power head room (SL PHR) of the PSCCH and/or PSSCH transmitted by the first UE to the second UE is lower than a predefined or preconfigured threshold.

Alternatively, the determining the transmit power of the PSCCH and/or PSSCH includes: determining the smallest one of the following as the transmit power of the PSCCH and/or PSSCH: the maximum sidelink transmit power, the maximum sidelink transmit power configured based on the priority of the data carried by the PSSCH and the CBR range measured on the resource pool, the downlink pathloss-based transmit power, and the sidelink pathloss-based transmit power determined based on the sidelink transmit power control command.

Alternatively, determining the sidelink pathloss-based transmit power based on the sidelink transmit power control command includes any one of the following: determining the sidelink pathloss-based transmit power based on accumulated value of the currently received sidelink transmit power control command and the previously received sidelink transmit power control command; and determining the sidelink pathloss-based transmit power based on the currently received sidelink transmit power command.

Alternatively, the receiving the sidelink transmit power control command transmitted by the second UE includes: receiving the sidelink transmit power control command transmitted by the second UE through a physical sidelink feedback channel (PSFCH).

Alternatively, the receiving the sidelink transmit power control command transmitted by the second UE through the physical sidelink feedback channel (PSFCH) includes any one of the following: receiving the sidelink transmit power control command indicated by the transmission parameter of the PSFCH; receiving the sidelink transmit power control command indicated by the acknowledgment (ACK) or non-acknowledgement (NACK) information carried by the PSFCH; and receiving the sidelink transmit power control command indicated by information bits carried by the PSFCH.

Alternatively, the receiving the sidelink transmit power control command indicated by the transmission parameter of the PSFCH includes at least one of the following: receiving the sidelink transmit power control command indicated by a signal sequence of the PSFCH; receiving the sidelink transmit power control command indicated by a demodulation reference signal (DMRS) of the PSFCH; receiving the sidelink transmit power control command indicated by an orthogonal cover code (OCC) of the PSFCH; and receiving the sidelink transmit power control command indicated by a resource of the PSFCH.

Alternatively, the receiving the sidelink transmit power control command indicated by the acknowledgment (ACK) or non-acknowledgement (NACK) information carried by the PSFCH includes: when the received feedback information carried by the PSFCH is ACK, the sidelink transmit power control command is to reduce the transmit power by a predefined or preconfigured value; and when the received feedback information carried by the PSFCH is NACK, the sidelink transmit power control command is to increase the transmit power by a predefined or preconfigured value.

Alternatively, the receiving the sidelink transmit power control command indicated by information bits carried by the PSFCH includes: multiplexing the information bits of the received sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the receiving the sidelink transmit power control command transmitted by the second UE includes: receiving the sidelink transmit power control command transmitted by the second UE through a media access control control element (MAC CE).

Alternatively, the sidelink transmit power control command is applied to the PSCCH and/or PSSCH transmitted by the first UE to the second UE during a preset time.

Alternatively, the sidelink control information (SCI) is used to indicate whether the second UE is triggered to transmit the sidelink transmit power control command to the first UE.

For contents not described in detail in the first UE provided by the embodiment of the present disclosure, reference may be made to the above power control method. The beneficial effects that the first UE provided by the embodiment of the present disclosure can achieve are the same as that achieved by the above power control method, which will not be repeated herein.

The embodiments of the present disclosure have at least the following beneficial effects: the sidelink pathloss-based closed loop power control is achieved.

Based on the same inventive concept of the foregoing embodiment, an embodiment of the present disclosure further provides a second UE. A schematic structural diagram of the second UE is shown in FIG. 26. The second UE 260 includes a fourth processing module 2601, a fifth processing module 2602 and a sixth processing module 2603.

The fourth processing module 2601 is configured to obtain configuration information for sidelink pathloss-based power control of a physical sidelink control channel (PSCCH) and/or a physical sidelink shared channel (PSSCH) received by the second UE.

The fifth processing module 2602 is configured to transmit a sidelink transmit power control command to the first UE.

The sixth processing module 2603 is configured to receive the PSCCH and/or PSSCH transmitted by the first UE, where transmit power of the PSCCH and/or PSSCH is determined based on the sidelink transmit power control command transmitted by the second UE.

Alternatively, the transmit power of the PSCCH and/or PSSCH being determined based on the sidelink transmit power control command transmitted by the second UE includes: transmitting, by the first UE, the received sidelink transmit power control command transmitted by the second UE to a base station; transmitting, by the base station, the sidelink transmit power control command for the PSCCH/PSSCH to the first UE; and the transmit power of the PSCCH and/or PSSCH is determined based on the sidelink transmit power control command transmitted by the base station.

Alternatively, the obtaining configuration information for sidelink pathloss-based power control includes: receiving radio resource control (RRC) signaling of the PC5 interface transmitted by the first UE; and obtaining the configuration information based on the RRC signaling.

Alternatively, the transmitting the sidelink transmit power control command to the first UE includes: transmitting the sidelink transmit power control command through a physical sidelink feedback channel (PSFCH).

Alternatively, the transmitting the sidelink transmit power control command through the PSFCH includes any of the following: indicating the sidelink transmit power control command by the transmission parameter of the PSFCH; indicating the sidelink transmit power control command by the acknowledgment (ACK) or non-acknowledgement (NACK) information carried by the PSFCH; and indicating the sidelink transmit power control command by information bits carried by the PSFCH.

Alternatively, the indicating the sidelink transmit power control command by the transmission parameter of the PSFCH includes at least one of the following: indicating the sidelink transmit power control command by a signal sequence of the PSFCH; indicating the sidelink transmit power control command by a demodulation reference signal (DMRS) of the PSFCH; indicating the sidelink transmit power control command by an orthogonal cover code (OCC) of the PSFCH; and indicating the sidelink transmit power control command by a resource of the PSFCH.

Alternatively, the indicating the sidelink transmit power control command by the acknowledgment (ACK) or non-acknowledgement (NACK) information carried by the PSFCH includes: when the feedback information carried by the PSFCH is ACK, the sidelink transmit power control command is to reduce the transmit power by a predefined or preconfigured value; and when the feedback information carried by the PSFCH is NACK, the sidelink transmit power control command is to increase the transmit power by a predefined or preconfigured value.

Alternatively, the indicating the sidelink transmit power control command by information bits carried by the PSFCH includes: multiplexing the information bits of the sidelink transmit power control command with the information bits of the acknowledgement (ACK) or non-acknowledgement (NACK) together to transmit them through the PSFCH, wherein the information bits of the sidelink transmit power control command are disposed at the end of all information bits.

Alternatively, a step of adjustment of the sidelink transmit power control command is depended on the ACK or NACK fed back by the PSFCH.

Alternatively, the transmitting the sidelink transmit power control command to the first UE includes: transmitting the sidelink transmit power control command through a media access control control element (MAC CE).

Alternatively, the sidelink transmit power control command is applied to the PSCCH and/or PSSCH transmitted by the first UE to the second UE during a preset time.

Alternatively, based on the indication in the sidelink control information (SCI) transmitted by the first UE to the second UE, determining whether to trigger the transmission of the sidelink transmit power control command to the first UE.

For contents not described in detail in the second UE provided by the embodiment of the present disclosure, reference may be made to the above power control method. The beneficial effects that the second UE provided by the embodiment of the present disclosure can achieve are the same as that achieved by the above power control method, which will not be repeated herein.

The embodiments of the present disclosure have at least the following beneficial effects: the sidelink pathloss-based closed loop power control is achieved.

Example 3

Based on the same inventive concept, an embodiment of the present disclosure further provides a first UE. A schematic structural diagram of the first UE is shown in FIG. 27. The receiving device 2700 includes at least one processor 2701, a memory 2702, and a bus 2703. Each of the at least one processor 2701 is electrically connected to the memory 2702; the memory 2702 is configured to store at least one computer-executable instruction, and the processor 2701 is configured to execute the at least one computer-executable instruction, so as to execute the steps of any one of the power control methods provided in any one of the embodiments or any one of the optional embodiments the present disclosure.

Further, the processor 2701 may be a field-programmable gate array (FPGA) or other devices with logic processing capabilities, such as a microcontroller unit (MCU) and a central process unit (CPU).

The embodiments of the present disclosure have at least the following beneficial effects: the sidelink pathloss-based closed loop power control is achieved.

In the embodiments of the present disclosure, the RX UE feeds back the SL TPC Command to the TX UE, which may also be referred to as: the RX UE transmits the SL TPC Command to the TX UE; or, the RX UE reports the SL TPC Command to the TX UE. The feedback of SL TPC Command has the same meaning as the transmitting or reporting of SL TPC Command.

Based on the same inventive concept, an embodiment of the present disclosure also provides a second UE. A schematic structural diagram of the second UE is shown in FIG. 28. The second UE 2800 includes at least one processor 2801, a memory 2802, and a bus 2803. Each of the at least one processor 2801 is electrically connected to the memory 2802; the memory 2802 is configured to store at least one computer-executable instruction, and the processor 2801 is configured to execute the at least one computer-executable instruction, so as to execute the steps of any one of the power control methods provided in any one of the embodiments or any one of the optional embodiments of the present disclosure.

Further, the processor 2801 may be a field-programmable gate array (FPGA) or other devices with logic processing capabilities, such as a microcontroller unit (MCU) and a central process unit (CPU).

The embodiments of the present disclosure have at least the following beneficial effects: the sidelink pathloss-based closed loop power control is achieved.

Those skilled in the art may understand that the present disclosure includes devices related to performing one or more of the operations described in this application. These devices may be specially designed and manufactured for the required purpose, or may also include known devices in general-purpose computers. These devices have computer programs stored therein that are selectively activated or reconstructed. Such computer programs may be stored in a device (e.g., a computer) readable medium or in any type of medium suitable for storing electronic instructions and coupled to a bus respectively. The computer readable medium includes but not limited to any types of disks (including floppy disks, hard disks, optical disks, CD-ROMs and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or optical card. That is, a readable medium includes any medium that information is stored or transferred in a readable form by a device (e.g., a computer).

Those skilled in the art may understand that computer program instructions can be used to implement each block in these structural diagrams and/or block diagrams and/or flow diagrams and a combination of blocks in these structural diagrams and/or block diagrams and/or flow diagrams. Those skilled in the art may understand that these computer program instructions may be provided to a general-purpose computer, a pro-fessional computer or a processor of other programmable data processing methods to implement, so that the schemes specified in the block or blocks of the structural diagram and/or block diagrams and/or flow diagrams disclosed in the disclosure are performed by the computer or the processor of other programmable data processing methods.

Those skilled in the art may understand that steps, measures and schemes in various operations, methods, processes that have been discussed in the present disclosure can be alternated, modified, combined or deleted. Further, technical solutions having other steps, measures and schemes in various operations, methods, processes that have been discussed in the present disclosure can also be alternated, modified, rearranged, segmented, combined or deleted. Further, technical solutions in the prior art that have steps, measures and schemes in various operations, methods, processes having been discussed in or are relevant to the present disclosure can also be alternated, modified, rearranged, segmented, combined or deleted.

The above described is only part of the embodiments of the present disclosure. It should be noted that, for those of ordinary skill in the art, without departing from the principles of the present disclosure, several improvements and retouches can also be made. These improvements and retouches should be regarded as the protection scope of the present disclosure.

The invention claimed is:

1. A method performed by a first user equipment (UE) in a wireless communication system, the method comprising:
   receiving information on whether pre-emption is enabled, wherein the information on whether pre-emption is enabled is configured for each resource pool;
   receiving, from a second UE, sidelink control information (SCI) including information associated with a resource reservation and information associated with a priority value; and
   identifying a resource for the pre-emption based on a reference signal received power (RSRP) measured based on the SCI,
   the information on whether the pre-emption is enabled, a priority value associated with the first UE, and the priority value identified based on the SCI.

2. The method of claim 1, wherein identifying the resource is triggered at a timing, the timing being no later than a pre-configured timing value before a time point corresponding to a first located resource in a time domain.

3. The method of claim 2, wherein a value of the timing is less than or equal to a value obtained by subtracting the pre-configured timing value from the time point corresponding to the first located resource.

4. The method of claim 1, further comprising transmitting a physical sidelink control channel (PSCCH) or a physical sidelink shared channel (PSSCH) on a first resource other than the resource for the pre-emption.

5. The method of claim 1, wherein the RSRP measured based on the SCI is higher than a preconfigured threshold, the information on whether the pre-emption is enabled indicates that the pre-emption is enabled, and the priority value associated with the first UE is higher than the priority value identified based on the SCI, for identifying the resource for the pre-emption.

6. The method of claim 1, wherein the information on whether the pre-emption is enabled is configured based on a resource pool.

7. The method of claim 1, wherein the information on whether the pre-emption is enabled is associated with the priority value associated with the first UE.

8. The method of claim 1, wherein the resource for the pre-emption overlaps with a first resource corresponding to the information associated with the resource reservation, and
   wherein the resource for the pre-emption is identified, in case that the resource is announced by the first UE and the SCI is received before transmitting data based on the resource.

9. A first user equipment (UE) in a wireless communication system, the first UE comprising:
   at least one processor; and
   a memory storing at least one instruction, which when executed by the at least one processor, controls the at least one processor to:
      receive information on whether pre-emption is enabled, wherein the information on whether pre-emption is enabled is configured for each resource pool,
      receive, from a second UE, sidelink control information (SCI) including information associated with a resource reservation and information associated with a priority value, and
      identify a resource for the pre-emption based on a reference signal received power (RSRP) measured based on the SCI, the information on whether the pre-emption is enabled, a priority value associated with the first UE, and the priority value identified based on the SCI.

10. The first UE of claim 9, wherein the at least one instruction, when executed by the at least one processor, controls the at least one processor to identify that the resource is triggered at a timing, the timing being no later than a pre-configured timing value before a time point corresponding to a first located resource in a time domain.

11. The first UE of claim 10, wherein a value of the timing is less than or equal to a value obtained by subtracting the pre-configured timing value from the time point corresponding to the first located resource.

12. The first UE of claim 9, wherein the at least one instruction, when executed by the at least one processor, controls the at least one processor to transmit a physical sidelink control channel (PSCCH) or a physical sidelink shared channel (PSSCH) on a first resource other than the resource for the pre-emption.

13. The first UE of claim 9, wherein the RSRP measured based on the SCI is higher than a preconfigured threshold, the information on whether the pre-emption is enabled indicates that the pre-emption is enabled, and the priority value associated with the first UE is higher than the priority value identified based on the SCI, for identifying the resource for the pre-emption.

14. The first UE of claim 9, wherein the information on whether the pre-emption is enabled is configured based on a resource pool.

15. The first UE of claim 9, wherein the information on whether the pre-emption is enabled is associated with the priority value associated with the first UE.

16. The first UE of claim 9, wherein the resource for the pre-emption overlaps with a first resource corresponding to the information associated with the resource reservation, and
   wherein the resource for the pre-emption is identified, in case that the resource is announced by the first UE and the SCI is received before transmitting data based on the resource.

* * * * *